United States Patent
Avetisov et al.

(10) Patent No.: US 12,170,662 B2
(45) Date of Patent: Dec. 17, 2024

(54) DOMAIN UNRESTRICTED MOBILE INITIATED LOGIN

(71) Applicant: HYPR Corp., New York, NY (US)

(72) Inventors: George Avetisov, New York, NY (US); Roman Kadinsky, New York, NY (US); Bojan Simic, New York, NY (US)

(73) Assignee: HYPR Corp., New York, NY (US)

( * ) Notice: Subject to any disclaimer, the term of this patent is extended or adjusted under 35 U.S.C. 154(b) by 344 days.

(21) Appl. No.: 17/558,414

(22) Filed: Dec. 21, 2021

(65) Prior Publication Data

US 2022/0255931 A1 Aug. 11, 2022

Related U.S. Application Data

(63) Continuation-in-part of application No. 17/066,280, filed on Oct. 8, 2020, now Pat. No. 10,939,295.
(Continued)

(51) Int. Cl.
*H04L 9/40* (2022.01)

(52) U.S. Cl.
CPC ...... *H04L 63/0876* (2013.01); *H04L 63/0442* (2013.01); *H04L 63/062* (2013.01); *H04L 63/083* (2013.01)

(58) Field of Classification Search
CPC ............. H04L 63/0876; H04L 63/0442; H04L 63/062; H04L 63/083; H04L 2209/80;
(Continued)

(56) References Cited

U.S. PATENT DOCUMENTS

| | | |
|---|---|---|
| 10,313,881 B2 | 6/2019 | Liu |
| 10,764,043 B2 | 9/2020 | Traynor |

(Continued)

OTHER PUBLICATIONS

International Search Report and Written Opinion in related international application PCT/US2021/064731 dated May 18, 2022, pp. 1-11.
(Continued)

*Primary Examiner* — Kambiz Zand
*Assistant Examiner* — Aubrey H Wyszynski
(74) *Attorney, Agent, or Firm* — Pillsbury Winthrop Shaw Pittman LLP

(57) ABSTRACT

Provided is a process for mobile-initiated authentications to web services. Credential values of the user are established within a trusted execution environment of the mobile device and representations are transmitted to a server. The user of the mobile device may authenticate with the mobile device to the server, which may convey access to a web-based service from a relying device that executes a client authentication component to report user sessions to the server. The user may select the relying device from the mobile device to cause the relying device to present credentials to the web-service to login, authenticate, or otherwise obtain user-level permission for the user on the relying device. The user of the mobile device may authenticate with the mobile device to the server, and may initiate the authentication process from the mobile device, without inputting credentials corresponding to the web-service on the relying device.

20 Claims, 10 Drawing Sheets

Related U.S. Application Data

(60) Provisional application No. 63/128,830, filed on Dec. 21, 2020.

(58) Field of Classification Search
CPC ..... H04L 9/0897; H04L 9/321; H04L 9/3218; H04L 9/3239; H04L 9/3247; H04L 9/3263; H04L 9/50; H04L 63/0815; H04L 63/0884; G06F 21/64; G06F 21/33; H04W 12/069; H04W 12/108; H04W 12/37; H04W 12/60
USPC .......................................................... 713/159
See application file for complete search history.

(56) References Cited

U.S. PATENT DOCUMENTS

| | | | |
|---|---|---|---|
| 10,939,295 B1 * | 3/2021 | Avetisov | ............... H04L 9/3247 |
| 2020/0068399 A1 | 2/2020 | Brown et al. | |
| 2020/0205002 A1 | 6/2020 | Talwar | |
| 2020/0287901 A1 * | 9/2020 | Avetisov | ................ H04L 9/088 |

OTHER PUBLICATIONS

International Preliminary Report on Patentability for related International Patent Application PCT/US2021/064731 issued on Jun. 29, 2023, 7 pages.

* cited by examiner

DOMAIN UNRESTRICTED MOBILE INITIATED LOGIN

RELATED APPLICATIONS

The present application claims the benefit of U.S. Provisional Patent App. 63/128,830, filed on 21 Dec. 2020, and titled "Domain Unrestricted Mobile Initiated Login," and is a continuation-in-part U.S. patent application Ser. No. 17/066,280, titled "Secure Mobile Initiated Authentications to Web-Services," filed on 8 Oct. 2020. The entire contents of each aforementioned filing is incorporated herein by reference in entirety.

BACKGROUND

1. Field

The present disclosure relates generally to cybersecurity and, more specifically, to identity management techniques leveraging mobile devices of users to initiate authentication.

2. Description of the Related Art

Many computer systems and resources thereon are protected with identity management systems. These systems are designed to ensure that access to computer systems and resources is granted only to the appropriate entities and denied to others. Examples include computer program code in a client/server architecture that verifies that a user submitted password corresponds to an identifier supplied by the user before granting access to resources associated with that user identifier. Other approaches apply federated identity management, such as arrangements between multiple enterprises or another third-party to allow users to use identification data from one platform to obtain access on another platform. For example, an existing user of platform A may use identification data from platform A to obtain access to platform B, and platform A performs the verification. Techniques like those in OAuth 2.0, and related approaches by which a delegated third-party may verify identity on behalf of a constellation of other entities for a given user, may allow the given user to sign into an online forum or native application by logging in via their email provider. In turn, the email provider supplies an authentication token to the server hosting the online forum or exposing an application program interface (API) of the native application for authenticating user access without that server having access to the user's identification data (e.g., the identification data verified by the email provider).

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources.

These and other existing techniques impose friction on users and are potentially subject to vulnerabilities. For example, in single computing session, a user may be asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Examples include attacks that compromise the client computing device by which the user supplies the supplemental confirmation of an access attempt in the out-of-band channel. Some existing systems are potentially vulnerable to malicious code executing on the user's mobile device or other device to which the user inputs credentials that, for example, capture user supplied credentials from system memory.

SUMMARY

The following is a non-exhaustive listing of some aspects of the present techniques. These and other aspects are described in the following disclosure.

Some aspects include a process performed by a computing device for authentication of a user to access a web-service from a computing device different from a computing device upon which the user authenticates. In some aspects, a process includes storing a user account record indicative of a first computing device and first credentials by which a user authenticates on the first computing device; receiving an indication of a user selection on the first computing device to register the first computing device to authenticate access to a webservice from other computing devices; associating, with the record, second credentials by which the user authenticates with the web-service; identifying, based on user account or first device identifying information received from a second computing device different from the first computing device, the record and updating an indication of availability of the second computing device in association with the record; receiving, from the first computing device, an authentication request to access the webservice from a selected available computing device and, in association with the authentication request, authentication data; verifying the authentication data based on the first credentials to determine the user authenticated on the first computing device; and transmitting, to the selected available computing device, based on the verifying, second authentication data by which the second computing device is permissioned to access the web-service.

Some aspects include a process performed by a server for supporting authentication of a user of a computing device to access web-service from another computing device. In some aspects, a process is executed by a server-side computing system configured to support user initiated authentication on a mobile computing device to a web-service to be accessed from another computing device different from the mobile computing device. Some aspects of a process or computer implemented method include: receiving, from a mobile device executing a user authentication component, a request to establish a user account record, the user account record indicative of the mobile device and credentials by which a user authenticates on the mobile device; receiving, from the mobile device executing the user authentication component, an indication of a user selection to register the mobile device to authenticate access to a webservice from other computing devices; associating, with the record, an identifier corresponding to an account of the user on the webservice;

receiving, from a computing device executing a client authentication component, user account or device identifying information; identifying, based on the received user account or device identifying information, the record and the mobile device; transmitting, to the mobile device, an indication of availability of the computing device; receiving, from the mobile device, an authentication request to access the webservice from the computing device and, in association with the authentication request, authentication data; verifying the authentication data based on the credentials to determine whether the user authenticated on the first computing device; and transmitting, to the computing device, based on the verifying, an authentication token indicative the computing device being permissioned to access the webservice under the account of the user on the webservice.

Some aspects include a tangible, non-transitory, machine-readable medium storing instructions that when executed by a data processing apparatus cause the data processing apparatus to perform operations of one or more of the above-mentioned processes and computer-implemented methods.

Some aspects include a system, including: one or more processors; and memory storing instructions that when executed by the processors cause the processors to effectuate operations of one or more of the above-mentioned processes and computer-implemented methods.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
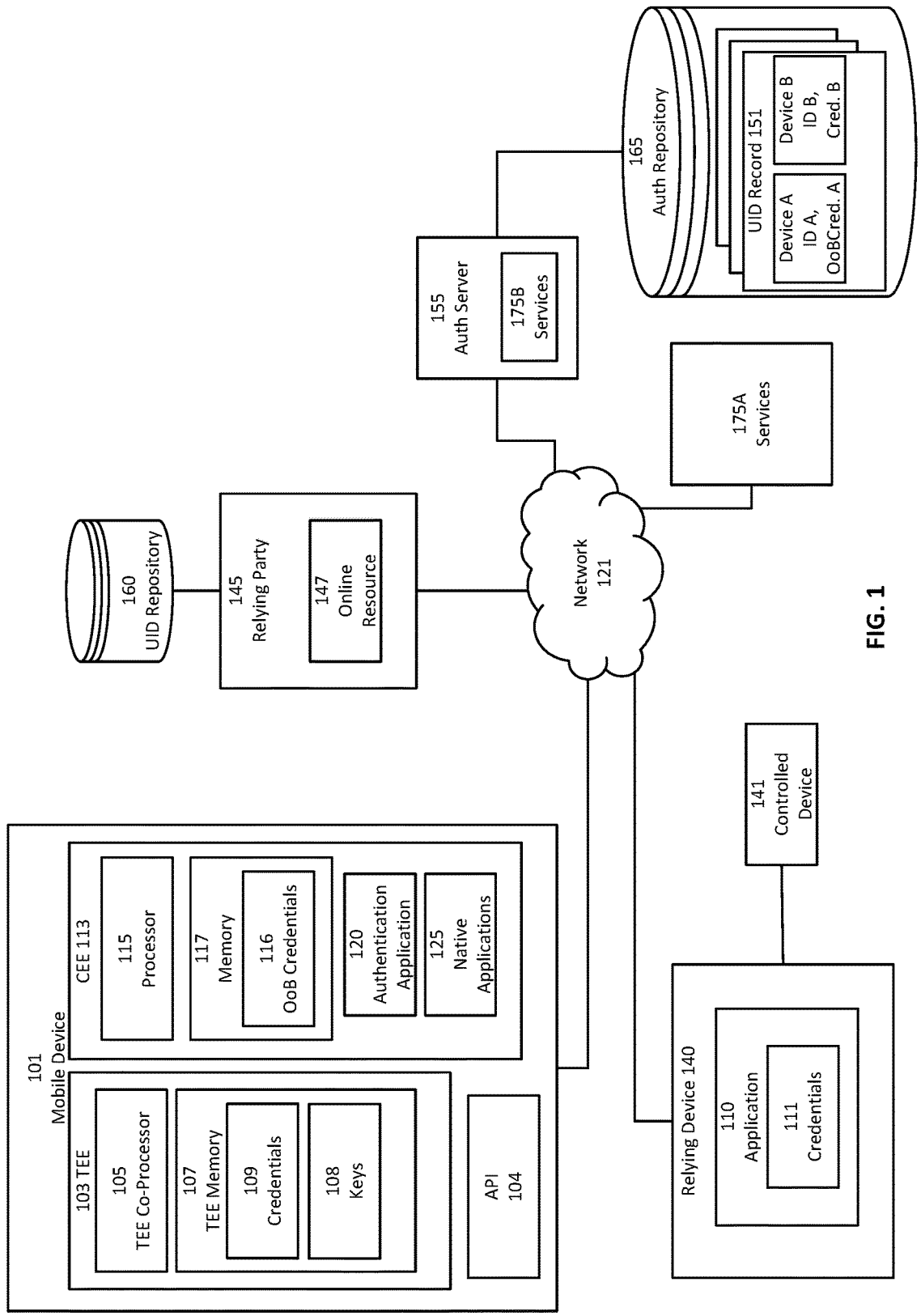
FIG. 1 is a block diagram showing an example of a computing environment by which the present techniques for user authentication may be implemented.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing federated identity management techniques impose more friction on users and require more trust of developers than is desirable. Often, in single computing session, a user is asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Accordingly, various embodiments described herein mitigate such login events through secure access to workstations, or other managed devices, by which users may be conferred access to a variety of services according to policy. In other words, provided a user successfully authenticates a session to access to a workstation or other managed device, access to other services or resources may be conferred.

Further, enterprises hosting federated identity management systems may be un-trusted by other enterprises wishing to authenticate users on such systems. In some cases, the enterprises hosting identity management systems may be competitors of the other enterprises wishing to authenticate users with those types of systems, or developers may be concerned that even if an enterprise is currently trusted, subsequent management may be less reliable. In addition, an enterprise using such systems for authentication services may be unable to receive authentication tokens for authenticating user access in the event of a federated identify management system outage of the hosting enterprise. As a result, user experience associated with an enterprise may be affected by the reliance on third-party user authentication. None of which is to suggest that any technique is disclaimed, merely that there are tradeoffs to keep in mind in view of the following disclosure.

Some approaches include authentication of a user via a different channel from that by which the user seeks to access resources requiring authentication. Examples include out-of-band authentication following a user's attempt to access a website by supplying a username and password to that website. Some authentication systems respond to a user's attempt to submit credentials in this manner by sending a push notification to a previously registered mobile device of the user, like a cell phone (distinct from the device upon which they seek access), and that push notification may prompt the mobile device to confirm the access attempt from the user. In this manner, such systems may supply additional factors by which additional confidence may be obtained regarding a user's identity, as merely compromising a user's username and password would not by itself afford access to secured resources.

These and other existing techniques impose friction on users and are potentially subject to vulnerabilities. For example, in single computing session, a user may be asked to login to several different online services within a short duration of time, for instance, when accessing multiple different accounts hosted by different enterprises. In the aggregate, these repeated requests can be frustrating and, in some cases, expand the attack surface of a user's identity with an excess of authentication sessions that could be potentially compromised. Examples include attacks that compromise the client computing device by which the user supplies the supplemental conformation of an access attempt in the out-of-band channel. Some existing systems are potentially vulnerable to malicious code executing on the user's mobile device or other device to which the user inputs credentials that, for example, capture user supplied credentials from system memory.

Oftentimes, out-of-band authentication is incorporated within federated identity systems. The result being that federated identity systems are further susceptible to those attacks described above that are applicable to out-of-band authentication, and the rewards of a successful attack for attackers are far greater than on an individual account basis. For example, a compromised federated identity may afford an attacker access to a wide range of different entities, accounts, protected assets, or any other information accessible under the umbrella of that federated identity. Thus, there exists a need to reduce friction on users while maintaining security. Again, none of which is to suggest that any technique is disclaimed, merely that there are tradeoffs to keep in mind in view of the following disclosure Disclosed embodiments may provide a mobile initiated login process by which users may access devices or controlled areas or controlled devices. For example, a user may initiate an authentication process via a mobile device to access a relying device (e.g., to which the mobile device is registered). Additionally, embodiments may provide a mobile initiated login process by which user may access one or more web-based services, which may include services and online resources, such as from a relying device to which the user also authenticated.

In some embodiments, the mobile initiated login may confer privileges consistent with traditional techniques that impose more friction on users. For example, a user that performs a mobile initiated login to access a workstation or other relying device (which may include a controller configured to actuate another device or cause a device to perform a function) may be afforded the same privileges as if that user physically provided credentials to the relying device (e.g., user name and password) or possessed a key-fob, or code, or key by which the user could access a relying device or controller (e.g., of another device or a door or valve and the like).

In some embodiments, a user registers a mobile device (e.g., a personal or work issued mobile device) to a relying device. For example, a user may register the mobile device to a relying device which the user frequently uses, or infrequently uses, while the user is in physical proximity to the relying device (though this need not always be the case). Once the mobile device is registered to the relying device, the user may authenticate with the mobile device to access the relying device, such as prior to, and temporally proximate to, physically reaching the relying device. Thus, a user may access a relying device based on an authentication result of an authentication process which the user initiated on a mobile phone that was registered to the relying device. In other words, a user may initiate an out-of-band authentication process to access a relying device based on an authentication result of that process.

Additionally, embodiments may also permit the user to authenticate with the mobile device to one or more web-based services accessible via the relying device, such as where those web-based services are accessed via credentials other than those conferred by virtue of access to the relying device, or which those which may be subject to additional security measures. Example embodiments may implement various access controls to implement security measures that enhance security of such systems while also reducing user friction by enabling a user to initiate an authentication within some threshold time or proximity (or both of a relying device) instead of inconveniently respond to authentication requests, carry around various credentialing or access control devices, and the like.

Authentication of a user that initiates an authentication process on a mobile device may be subject to compliance with one or more policies. A policy may specify one or more rules which users attempting to authenticate must satisfy (e.g., via their mobile device) to successfully authenticate. For example, the mobile device may receive a policy specifying one or more rules with which the user must comply to authenticate and enforce those rules to obtain or generate data for determination of an authentication result (e.g., by the mobile device or other entity, like a server or a relying device). Different relying devices and different web-based service to which a user may authenticate via the mobile device may be subject to different policies. For example, one or more policies may be those of web-based services, which may be governed under a same or different policy than a relying device which may access those web-based services. In some embodiments, policies (e.g., as specified by an administrator for a relying device(s) or web-service(s)) for user authentication may be obtained by a server and provided to one or more other devices or servers for enforcement.

Embodiments may ensure user compliance with a policy in one or more ways, which may include compliance enforcement at one or more of a mobile device level, server level, and relying device level. The different levels may verify compliance with same or different ones of the rules specified by the policy prior to determining an authentication result. In some embodiments, one or more of the rules may be conditioned based, such as to account for different scenarios in which one or more participants are unavailable to participate in a portion of the authentication process. In some cases, meeting such conditions indicates verification to one or more participants of the unavailability of another participant (e.g., if wireless internet access enabled but a server response cannot be obtained) to permit authentication via one or more rules corresponding to the condition (e.g., offline login permitted if the server is unavailable). For example, authentication via the mobile device to a given relying device may be subject to obtaining a signal from a beacon (such as a Bluetooth, NFC, optical, sound wave (which need not be audible), or other beacon technology capable of emitting a signal which may be obtained by a mobile device within a given proximity of the beacon) positioned within proximity of the relying device, or GPS coordinates with a given geofence within proximity of the relying device, or connection to a WiFi network within proximity of the relying device, and the like. Some examples, such as those for authentication to web-based services may rely on availability of the service, such as those providing online-only services (e.g., to a relying device). In some other examples, such as those reliant on some forms of digital rights management (DRM) and where the relying device has access to client-side content, some privileges may be afforded (e.g., like a threshold number of accesses or cumulative access time) prior to a requirement to refresh compliance online. In some cases, the beacon may be operable to receive communications from the mobile device, such as to receive a login request, although the mobile device may transmit such login requests on another protocol. These techniques may incorporate various other technologies, which may include but are not limited to single or reduced sign on and federated identify management techniques to enable seamless access to a variety of relying devices, assets, or services by virtue of authentication via mobile initiated logins.

Disclosed embodiments also improve on deficiencies in prior systems, such as loss of availability of single or reduced sign on or federated identify authenticators. For example, in various disclosed embodiments the mobile device may store user credentials within a trusted execution environment, and causing the trusted execution environment to divulge such credentials may be particularly difficult. Along with those credentials, the TEE may store policies, which may include offline policies, specifying rules by which offline access to a relying device may be granted in instances where the relying device or mobile device or both are without network access or one or more authenticator services are otherwise unreachable. An offline policy may be similar to an online policy, although an online policy may be enforced at an authenticator service level in addition to or instead of a mobile device side. Offline policies may be configured for enforcement mobile device side in instances when one or more authenticator services are unavailable (e.g., to one or both of the relying device and mobile device). In some cases, policies may be stored within a client execution environment but may be verified by the TEE (e.g., by signature verification) or encrypted with a protocol for which the TEE, but not the CEE, includes a key operable to decrypt the policy according to the protocol. Thus, policies may be strongly enforced on a user mobile device-side, such as to permit user access to a relying device subject to authentication in compliance with an offline policy when an authenticator service is unavailable. An online policy (which may be the same or different from an offline policy) may also function as a request filter to ensure authentication requests generated by a mobile device comply with rules implemented by an authenticator service (e.g., a prompt may instruct the user to enable WiFi or Bluetooth connections). Additionally, the TEE may store offline values, which may be single use credentials, by which a user may access a relying device. For example, the TEE may store a limited number of single use offline values that may be used before an online login process is required, and the offline values may be refreshed upon success of an online login process. An offline value may be returned by the TEE subject to authentication of the user based on credentials and rules in accordance with the policy. Authentication results may be determined within the TEE and thus may convey a high degree of security even in offline login processes. Mobile initiated login may incorporate, be incorporated in, or otherwise function in association with other improvements on credential security and federated identity management systems disclosed herein (which is not to suggest that mobile initiated login processes are not compatible with other identity management and credentialing systems).

Some of the above-described issues with out-of-band authentication techniques are mitigated by various embodiments described herein. Some embodiments described herein provide improvements in computer security that mitigate the capture of user supplied credentials from system memory allocated to client-side authentication applications, even in cases where the capture of such credentials is attempted by intercepting inter-process communication on the client device between the client-side authentication application and security infrastructure on the client device. Some embodiments described herein provide improvements in computer security that mitigate highly sophisticated methods for the capture of user supplied credentials, and some of embodiments incorporate use of and improve upon trusted execution environments, like Secure Enclave, ARM Trust-Zone, or various other trusted platform modules, like those compliant with ISO/IEC 11889 (the contents of which are hereby incorporated by reference), to provide enhanced client-side security. The techniques described in relation to some of those embodiments for mitigating capture of user supplied credentials on client devices may be implemented in connection with various embodiments described herein to configure robust out-of-band authentication systems apt to prevent unauthorized access to secure assets, like protected data, programs, etc., even in instances where a malicious party has access to a device (or multiple devices) of an authorized party.

Embodiments may confer one or more of the aforementioned benefits or other benefits, some of which will be self-evident to those of ordinary skill in the art and may remain unstated. Some embodiments may protect the credentials a user supplies in an out-of-band authentication exchange with zero knowledge techniques. Moreover, the zero knowledge techniques may support configurations by which a user can assert credentials for authentication in various ways. For example, some embodiments may keep the out-of-band credentials on a mobile computing device, without those credentials leaving the mobile computing device (e.g., in plain-text or ciphertext form). In some embodiments, the credential, and cryptographic hash values based thereon, or various private cryptographic keys of asymmetric encryption protocols may be stored, for example exclusively, within a trusted execution environment, for instance, in a secure memory of a trusted execution environment implemented with a secure co-processor that is separate (e.g., on different silicon, or implemented by different logical blocks connected to different physical memory address spaces) from a central processing unit of the mobile computing device by which an operating system and native applications of the mobile computing device are executed. In some embodiments, the zero knowledge techniques may be applied to prevent even the central processing unit of the mobile computing device from accessing such credentials and keys. In some embodiments, a secure channel (or session) may be established between an application executing on that central processing unit and the trusted execution environment. In some cases, the secure channel may impede attempts by threat actors to extract cryptographic keys or other credentials by impersonating the trusted execution environment or the authentication application in communications with one or the other of these computational entities. In addition, the secure channel may be implemented with a secure session, in that it may be closed (e.g., expire), such as after a predetermined number of communications between the trusted execution environment and the authentication application.

In some embodiments, the mobile computing device is a portable device (e.g., having a battery or other integrated power source) that a user frequently carries on or near their person throughout the course of their daily activities. Example mobile computing devices may be a smartphone or smartphone-like devices such as phablets, wearable computing devices, on-board computing devices of automobiles, or tablets with wireless data access. Accordingly, embodiments provide out-of-band authentication methods which are apt to authenticate a user, such as via the mobile device of the user, to confer access to a resource by another computing device, like a laptop or desktop, or a virtualized instance of a desktop, like a virtual machine. In some example cases, authentication values or results generated by a mobile computing device may be determined within a trusted execution environment of the mobile device and thus may convey a high degree of security. However, applications of the disclosed embodiments are not so limited. For example, disclosed out-of-band authentication methods may be incorporated in, or otherwise function in association with other improvements on credential security and federated identity management systems disclosed herein (which is not to suggest that disclosed out-of-band authentication processes are not compatible with other identity management and credentialing systems).

Some embodiments may be implemented in a distributed physical architecture that includes client computing devices controlled by diverse entities (e.g., more than 10,000, or more than 100,000 different end users, each using a different pair of devices). In some embodiments, users may operate client computing devices, like a laptop or desktop computer, which a user may use to log into an online account to access online resources. Other devices may also be suitable for this purpose, such as tablets, netbooks, and the like. These may be referred to as "primary" devices to distinguish them from the secondary device (e.g., like a mobile device, like a smartphone) by which out-of-band authentication is implemented during an authentication session.

In some embodiments, a computing device may transmit credentials to an authentication server. The authentication server may authenticate the credentials, and provide the authentication result (e.g., verified or not verified), such as to the remote server or other entity. The remote server may then grant the client computing device or mobile computing device access to the online resources or restrict access to the online resources based on the result. In some embodiments, the remote server may receive a result from an authentication service prior to an access attempt and authenticate the access attempt based on the prior received result, such as based on a token value presented in association with the access attempt. For example, a user may pre-authenticate on their mobile computing device with the authentication service. The result may be received by the remote server subsequent to the user authenticating with the authentication service (e.g., with the mobile computing device). Results, like a token, presented by a mobile device or other computing device may include additional data, signatures of the result, public keys and the like, such as in a given schema for authentication.

An authentication system may verify whether the user inputs valid credentials, if those credentials are authenticated (i.e., verified as corresponding to the user-account of the user seeking access) the client computing device may be granted access to the online resources provided by the remote server, such as granting the client computing device access to a user account of a website, services utilized by a native application or by the client computing device, other various web-based services (web services), and the like. Conversely, if the user inputs invalid credentials, authentication fails (i.e., not verified) and the client computing device may be restricted from accessing the online resources provided by the remote service (e.g., denying access to a user account of a website or denying access to services utilized by a native application or by the client device, or other web services).

In some example embodiments that include configurations where a device requesting authentication, like a mobile computing device engages the authentication server, that device may receive the results from the authentication server, which may be signed by the authentication server. In turn, the mobile computing device may present that results to access a secured asset, whether in an out-of-band authentication process, in-band authentication process, or for other unique applications. For example, the result may be presented by the mobile computing device via a native application, which may be a trusted application within the trusted execution environment, like a wallet-type application configured to provide the result and corresponding identity to which the result pertains to other devices. Examples of those other devices may be door locks, payment terminals, and the like configured for near-field-communications over protocols like Bluetooth, Zigbee, WiFi, etc., and which may be coupled to a network or include a processor, by which such a result received from a mobile computing device may be verified prior to effecting an operation (e.g., unlocking a door, confirming a payment, etc.). In some embodiments, such as those including payment terminals, the results may be structured in a standardized format accepted by those terminals on a given payment service. For example, a user may be authenticated to an account and a result, like a token, corresponding to that account may be provided to the mobile device. Indication of which payment service and the token (an optionally other credentials) may be submitted to the terminal which transmits the data to the payment service for authorization of payment. In some embodiments, token generation may be predicated on account information (e.g., like a credit limit or balance) and confer authorization of payment. Standardized formats for payments include various fields for encrypted data or tokens, such as for one-time-payment authorization, to prevent another transaction being authorized on the same data. In some embodiments, such as those including physical access, the results may be structured in a standardized format for activation of a given mechanism, like an electro-mechanical device, which may include an electromagnet, an electrical motor, a solenoid or other circuit to cause a change in an electromagnetic field to actuate a lock, like driving a pin into or out of a hole, changing a state of an electromagnet adjacent a ferromagnetic plate attached to a door, or the like, (e.g., to access or secure access to an area or receptacle or otherwise interact with a secure asset—like a switch to turn on some device). The electro-mechanical device may include one or more hardware elements like a processor, memory, receiver, transmitter, and the like to receive results for authentication. Some electro-mechanical devices may process the results directly by verification of signature, or transmit the result and receive a response, such as from a server. In either instance, the electro-mechanical device may actuate a mechanism based on a received result.

In some embodiments, an authentication process may occur when (or before in the case of mobile initiated authentications) a user attempts to access a native application, or more generally, a software asset. In other words, such assets may be secured, and access to those assets may be granted conditionally upon authentication of the user attempting to access the asset. A recent development in an era where network access, such as to the Internet, is prolific, digital rights management (DRM) techniques have been implemented to protect native applications, software assets, and other media from unauthorized access. DRM can include authentication checks that occur at time of access of an asset, periodically (e.g., every few minutes or hours while the asset is being accessed (e.g., read or executed), or continuously such as over a connection with a server while the asset is being accessed, sometime referred to as always-online. Authentication may protect an asset like a native application or feature thereof rather than (or in addition to) a specific online resource. Another example of an asset may be a media file. By way of example, a native application, like a native application for creating 3D models, may require user authentication upon launch (e.g., for a license) to access the application itself (which may require periodic re-authentication), or user authentication may be required for the native application to access an online resource (e.g., a repository of data), like a repository of 3D models. Sometimes both instances of authentication may be required. In either instance, a user may supply credentials (which may differ for each instance) and a remote server (or servers) may determine or receive an authentication result. In the case of the native application requiring user authentication (e.g., upon launch), a remote server may provide the result or data indicative of the result to the native application. In the case where user authentication is required for the native application to access an online resource, a remote server may grant the native application to access the online resource based on the result.

In some embodiments, the authentication process includes one or more authentication steps in addition to verifying the credentials received from the client computing device. Moreover, in some embodiments, the credentials received from the client computing device need only identify a particular user, identity, account, or other entity. As such, an authentication process may not require any verifying of user credentials received from a specific client computing device. Rather, another client device like a mobile computing device may provide credentials (e.g., a zero-knowledge proof). In either instance, based on the received credentials, a server may identify account or user identity information of a user associated with those credentials. In some embodiments, the received credentials include an identifier operable to identify associated user account information or records.

User account information or records may include information about different computing devices used by the user (e.g., including a mobile computing device different from the client computing device attempting to access an online resource). The information about the different computing devices may include one or more identifiers for the respective computing devices. Example of identifiers may include a network address identifier or a monitored address identifier. Example network address identifiers may include one or more of an IMEI number, telephone number, MAC and IP address, or other identifiers suitable to uniquely reference a given computing device. An example of a monitored address identifier may be a location (e.g., on a network) which a given computing device monitors for data published to that location or a key-value pair like a location and an identifier which a given computing device monitors for at that location. In some example embodiments, the monitored address identifier may be an address of a given computing device on a notification network or service, like a push notification network, to which the computing device has registered. In turn, the given computing device may receive data published to that address on the notification service. In some embodiments, a monitored address identifier may be a network address identifier of the computing device.

One or more of the different computing devices may register with a server via an authentication application. In some embodiments, such a registration process may include the establishment or association of an identity of a user of the computing device within an identity management system. For example, a computing device may register with the server via an authentication application by downloading the application from the server or an application repository (or application store), executing the application, and performing one or more steps in a registration process (e.g., to establish zero-knowledge proofs, report an active user session on a user account, etc.). The server may determine which ones of the different computing devices, such as those including an authentication application, may authenticate a user to access a secure asset, and permit a computing device, which may be different than the one the user authenticated on, to access the secure asset.

In some examples, the server may transmit a notification, such as a push notification, to a computing device permitted to access a secure asset, which in some examples may include a token or token value to be presented to an entity hosting or governing the secure asset. For example, the server may send a notification such as a push notification over a service like via Firebase Cloud Messaging service, Apple's push notification service, Google Cloud Messaging, or another push notification service. An example of another notification service may be a notification service subscribed to by the authentication application on the different computing device, such as a feed or monitored address, on which the server may push, publish, or otherwise transmit such information, like a pending token authorization. In some embodiments, an authentication service of an identity management system, such as for federated identities, performs one or more of the above steps, and results of the authentication permitting access to a given secure asset may be applicable to afford access to a variety of other secure assets of different parties (e.g., for a configurable amount of time) to which that user is also permitted to access while authenticated.

In some embodiments, a computing device may execute an application, like an authentication, that includes an event handler configured to respond to such a push notification received from a server, such as an authentication server of an authentication system. The event handler of the authentication application may interface with the computing device to present, on the display, one or more user interface elements responsive to the notification.

Thus, for example, access to online resources (or other asset like a native application) from a device may be granted by virtue of a different computing device authenticating with the additional credentials. In practice, for non-nefarious access requests, the user of the computing device is typically the same user as the one requesting access to the online resource with the different computing device, and the supplying of the additional credentials verifies both the user's intent and identity to access the online resources (e.g., such as where access to the online resources is controlled on a per-individual user basis). Other or additional factors may also be considered, examples of which are explained in detail below.

Before or after user input to supply a credential via a mobile device (or other device different from a client computing device requesting access to an online resource), an authentication application may establish a secure channel with a trusted execution environment on the mobile computing device using the techniques described below. The secure channel may be established during a lifetime of a secure session between the authentication application and the trusted execution environment. Should the session expire, such as after a predetermined number of requests or response, a new session may be established to permit communication by secure channel. Supplied credential values, or a cryptographic hash value based thereon, may be obtained within the trusted execution environment. Representations of those credentials may be generated within the trusted execution environment and may be passed through the secure channel to the authentication application. In some embodiments, the trusted execution environment may determine whether supplied credential values match previously obtained credential values stored within the trusted execution environment. For example, the trusted execution environment may determine whether supplied credentials values or a cryptographic hash value corresponding to supplied credential values match a valid credential stored within the trusted execution environment. The valid credentials stored within the trusted execution environment may have been generated during a prior registration process by the authentication application, and representations of the valid credentials may have been provided to the authentication application for transmission to an authentication service or identity management system for establishing an identity during a prior registration process. Representations of valid credentials may be a cryptographic hash or encrypted version of valid credentials or valid credentials and some other value, even though valid credentials may also be cryptographically hashed or encrypted themselves. Only representations may be passed outside of the trusted execution environment such that valid credentials need not be altered to generate new representations (e.g., by changing an encryption key or changing a value operable to alter cryptographic hash output values).

Results may be cryptographically signed with a private encryption key held within the trusted execution environment (e.g., not accessible in the memory address space of the operating system of the mobile computing device in which the authentication and native applications execute, and in some cases not accessible on a memory bus of the central processing unit of the mobile computing device). For example, some embodiments may cryptographically sign (e.g., in the trusted execution environment) various outputs of the trusted execution environment used for authentication (e.g., verification and matching by an authentication system or identity management system). Example outputs may be one or more of a verification results as determined by the mobile device, a representation of a credential value, or other information described herein. For signed data (e.g., a signature of the data using a key, like a private key), the signature may be verified based on the input data and a corresponding key (e.g., the public key corresponding to the private key).

In some embodiments, a server is configured to receive the cryptographically signed data, verify that the cryptographically signed data was signed by an entity (e.g., a specific mobile computing device of a user) with access to a private cryptographic key corresponding to a public cryptographic key associated with the user's account or established identity of the user, and then, determine whether the signed data indicates that the user-supplied credential values match those previously supplied during registration. The server may verify that user-supplied credentials match those previously supplied during registration where the data is a representation of the user-supplied credential (e.g., by virtue of verifying a signature indicative of receipt and processing of credential values corresponding to the representation within the trusted execution environment). In some embodiments, a different cryptographic key pair in an asymmetric encryption protocol, may be applied for each of a plurality of different credentials to generate representations, such as a plurality of different biometric measurements, required by a policy applied in a given authentication process. Alternatively, different representations may be generated using different inputs to a cryptographic hashing function to obfuscate the credential values. In configurations that use credential-specific keys, embodiments may mitigate key distribution issues that arise when an entity (e.g., a company) disables a particular type of credential for accessing an online resource or asset while leaving the others in place. Representations may also be generated in different ways for different ones of parties utilizing an authentication system. Thus, for example, a set of credentials used for a company A may have different representative values than when that same set of credentials are used for a company B. Additionally, in some embodiments, different keys may be used for the different companies. In some embodiments, a server of an authentication system performs one or more of these steps in response to receiving credentials from a remote server or device of a user to authenticate a same or different device access to a secure asset. In some embodiments, a server of an identity management system performs one or more of these steps in response to receiving credentials from a remote server or device of a user to authenticate a user to an established identity, whereby that identity may be permitted access to a secure asset.

In some embodiments, some of authentication credentials may be supplied with zero knowledge techniques, for instance, by which the credential value itself, such as a password or biometric measurement, remains resident on the computing device of the user (i.e., does not leave that computing device) upon being supplied by the user. Some embodiments may input such a credential or value based thereon into a one-way cryptographic function, like a cryptographic hash function, such use SHA 256, and embodiments may supply the output or a value based thereon via a network to a remote computing device that determines whether the user is to be authenticated based on a comparison between the cryptographic hash value and a previously stored cryptographic hash value, for instance, supplied during registration or credential creation based on the same input and hash function. Upon determining that the cryptographic hash values match, the corresponding security criterion may be determined to be have been satisfied by the remote computing device.

FIG. 1 illustrates an example computing environment 100 within which mobile initiated authentication techniques may be implemented. In some embodiments, the computing environment 100 may include a mobile device 101, a relying device 140, a relying party 145, an authentication server 155, and example services 175, such as various webservices which may include but are not limited to authentication server services 175B and other services 175A which may correspond to those of one or more relying parties or other entities. These components may communicate with one another via a network 121, such as the Internet and various other local area networks. These components may communicate with one another via a network 121, such as the Internet and various other local area networks.

An example relying device 140, like a client device different from a mobile device of the user on which the user authenticates, is illustrated in FIG. 1 and may include access to the network 121. In many instances the network 121 includes the public or private networks and may include the Internet, telephonic data communications, etc., and the example relying device 140 is a computing device like a laptop, desktop, or workstation operated with network access in a home, office, or field environment. In some embodiments, an example relying device 140 may be a terminal device or otherwise configured to provide a user interface for terminal access to one or more computing devices or virtual machines that may include or provide access to a secure asset or be a secure asset themselves. In some cases, the relying device 140 may operate on an internal network (not shown) and may or may not have public network access (e.g., network 121) but include a connection on the internal network to one or more of servers 145, 155 or other server that may have or afford public network access. Some configurations may allow tunneling into an internal network from another network (e.g., a public network) via secure connection such as VPN or other encrypted communication protocol.

In some cases, an example internal network may be wholly internal, such as a private network within a corporation, and supports communications between the relying device 140 and server 145 or server 155. Example implementations of the relying device 140 in such instances may be a terminal or workstation within a secure environment (e.g., a server room). In such cases, the mobile device 101 may only gain access to that example network while on site (e.g., within range of a wireless connection or while coupled to a wired connection of the internal network) and notifications may be forced to flow through the internal network to afford enhanced security.

Different example relying devices 140 may be configured to access different secured assets in a variety of different ways. For example, a relying device 140 may attempt to access a secured asset such as an online resource 147 on or via one or more servers 145. In some embodiments, the relying device 140 may attempt to access the online resource 147 on or via one or more servers 145 using an application 110 installed to the relying device 140. In another example, a relying device 140 may attempt to access a secured asset such as an application 110 executed on the relying device. In some embodiments, the application 110 may also be configured to access an online resource 147 on or via one or more servers 145.

In association with a given access attempt of a secure asset, a user of the relying device 140 may supply credentials 111 for accessing the secured asset. Those credentials 111 may be supplied in different ways, several examples of which are outlined below. In one example, the secure asset is an online resource 147 on or accessible via one or more servers 145. The online resource 147 may be a server hosted application, application programming interface, user account, virtual machine, or other data or interface accessible by the relying device 140 via the server 145. In some embodiments, the relying device 140 may include an application 110 configured to access the online resource 147. For example, the application 110 may be a web browser configured to request data on and receive data from the server 145 for presentation on a display of the relying device 140. Accordingly, the application 110 may be configured to retrieve data from the server 145 and present the data received from the server to the user. In some cases, the server 145 may redirect the application 110 to retrieve some or all data from one or more other servers, like server 155. The retrieved data, when executed or processed, may cause the application 110 to present on the display of the relying device 140 a log-in page or other user interface including one or more fields or other user interface elements configured to receive user credential 111 input for accessing the online resource 147. In turn, the application 110 may transmit data corresponding to the credentials 111 input by the user, which may be a user name, password, or selection of one of more user interface elements, to a given server (e.g., at least one of server 145 or server 155) specified in the retrieved data for authentication. In some embodiments, the application 110 may transmit data corresponding to the credentials 111 without direct user input of the credentials, such as where the user has configured the application 110 to populate fields with or automatically submit stored credentials. In some embodiments, when executed or processed, the retrieved data may cause the application 110 to automatically collect or transmit other identifying data corresponding to the user or relying device 140 with the credentials 111. For example, the application 110 may collect or generate identifying data about the user-relying device 140 combination in the form of cookie, log, token, or other data. In addition, or alternatively, the application 110 may collect identifying data about the user-relying device combination, such as by querying the runtime environment on the relying device. All or a subset of the above information may be transmitted to one or more of servers 145 or 155.

In another example, the secure asset may be an application 110 executed by the relying device 140 and configured to prompt the user to supply credentials 111 when the user attempts to use the application or a feature thereof. Similarly, in another example, the secure asset may be an online resource 147 accessible by the application 110 and the application may be configured to prompt the user to supply credentials 111 in response to the user attempting to use the application 110 to access the protected asset via the server 145. The application 110 may transmit received credentials to the server 145 or server 155 for authentication. In some embodiments, the application 110 and online resource 147 may both be secure assets, and the user may be prompted to provide same or different credentials when attempting to access different secure assets. In some embodiments, the application 110 may be configured to automatically collect or store previously supplied credentials and automatically transmit the collected or previously supplied credentials to the server 145 or server 155 without prompting the user. The application 110 may similarly collect identifying data about the user-relying device combination as described previously for transmission to a server.

In some embodiments, a secure session is established between the relying device 140 and one or more of server 145 or 155 for the transmitting of credentials or the exchange of user-relying device data. The secure session may be HTTP over TLS/SSL, SSH or other secure connection type by which the relying device 140 (or applications thereon) can exchange data with a server (or application applications thereon). The secure session may be held open by the server for a pre-configured amount of time (e.g., 1-180 seconds) before timing out to allow enough time for a user to authenticate with the authentication server 155. Once authenticated, the relying device 140 may be permitted to access the secure asset. In some embodiments, based on the credentials 111 or user-client information, a server may generate a token tied to that information and transmit that token to the relying device 140. In turn, the relying device

140 may present the token within a set period of time (e.g., 10-9999 ms or 1-180 seconds) after authentication to access the secure asset.

Tokening of the relying device 140 may occur in addition to or separate from the secure session. For example, when attempting to access a secure asset on server 145, the client may 140 may be redirected (e.g., via HTTP request) to establish a secure session with server 155 and provide credentials 111 or user-relying device information to the server 155. When the server 155 authenticates the relying device 140, it may pass a token in a redirect (e.g., via HTTP request) that directs the relying device 140 back to the server 145 to access the asset.

Some embodiments may include a relying party server 145, which may host or otherwise include a secure asset, like an online resource 147, accessible by devices over a network, such as by the relying device 140 over the network 121. Examples of online resources 147 may include a user account, web applications, and other data as described herein. The relying party server 145 is configured to provide access to such resources 147 for authenticated users of relying devices 140.

In some embodiments of the relying party 145 may include a user identification repository 160, which may store information about user accounts or clients. For example, the UID repository 160 may store identifying information including one or more of user identifiers, device identifiers, identifying tokens for user or devices, locations of devices on a network, and the like. The UID repository 160 may also store associations between one or more identifiers, for example, a user identifier may be associated with one or more device identifiers to which that user is permitted access or otherwise uses to access the server. In some embodiments, the UID repository 160 may further store credentials associated with the identifying information for users and clients, though it need not be required to.

In response to an attempt by a relying device 140 to access the relying party server 145 and thus the example online resource 147, the relying party sever 145 may respond in variety of ways. For example, the server 145 may request credential information from the relying device 140, such as by directing an application 110 on the relying device 140 to a log-in page or other interface for the submission of credentials, requesting the application direct the user to input credentials, requesting the application provide credential information already input by the user, or requesting the application provide identifying information about the relying device or user (e.g., cookies, logs, tokens, etc. or values thereof). In some embodiments, the relying party server 145 may collect information about the user or relying device 140, such as a network address, location associated with the network address, information about the application 110 or relying device such as version, runtime environment, etc. or other information. Credential information may include a user identifier, such as an email, employee ID, active user account, username, etc., hash thereof or other identifying information about the user and optionally a password. Information about the relying device 140 or application 110 may include a device identifier, which may be a combination or hash of information determined about the relying device or application. An example device identifier may account for information such as a MAC address, IMEI number, identifiers of one or more other hardware components of the device, etc., or may include information indicative of the runtime environment like operating system version and type, application version, screen size or resolution, or other factor or combination of factors relatively unique to a given device. Accordingly, the device identifier may serve to accurately identify a given relying device from other relying devices at least for a relatively long period of time (e.g., hours, days, months, or even the lifetime of the device).

In some embodiments, the relying party server 145 may compare information about or received from the relying device 140 with information stored in the UID repository 160 to determine which user or device is attempting to access a given secure asset, such as the online resource 147, and whether that user or device has been authenticated. For example, the relying party server 145 may identify a user identifier or a device identifier stored within the UID repository 160 corresponding to the access attempt. In response to determining which user or device is attempting to access the secure asset, such as by determining one or more identifiers stored within the UID repository 160 corresponding to the access attempt, the relying party server 145 may transmit information about the access attempt to the authentication server 155, or determine whether information about the access attempt was already received by the authentication server (e.g., like a token and identifying information by which an authentication result received from the authentication server may be correlated with an access attempt and the access attempt verified based on information presented by the relying device). Examples of such information may include the one or more identifiers determined from the UID repository 160 to correspond to the access attempt, in addition to information received from, or determined about, the relying device 140. The relying party server 145 may receive authentication results in relation to users or devices from the authentication server 155, in some examples prior to receipt of an access attempt by a relying device. However, in other examples, the relying party server 145 may forward information to an authentication server or service to receive an authentication result (which, in some examples, may be determined by the authentication server prior to receipt of indication of an access attempt from a relying party server). The authentication result indicates whether the user of the relying device 140 has successfully authenticated with the authentication server 155 (e.g., via the mobile device 101). Based on the authentication result received from the authentication server 155, the relying party server 145 grants (in response to successful authentication) or denies (in response to unsuccessful authentication) the access attempt by the relying device 140. In some examples, the authentication server 155 may transmit identifying information and information (e.g., like a token value) by which the relying party 145 may permit access to a specific user or device presenting corresponding information. If a token is not received within a threshold period of time, the server 145 may deny the access attempt (e.g., by timing out a connection). Additional examples are provided herein.

In some embodiments, the relying party server 145 performs one or more preliminary verification tasks prior to passing information about the access attempt to the authentication server 155. For example, the server 145 may determine whether the user or relying device is permitted to access the given secure asset. In such cases, the UID repository 160 may store associations between user or device identifiers and different assets to which a user or device is permitted access. In some embodiments, the relying party server 1345 may also determine whether a password or other credential received from the relying device 140 matches a corresponding credential stored in association with a user identifier or device identifier within the UID repository 160.

As described above, in response to an attempt by a relying device 140 to access the relying party server 145 and thus the example online resource 147, the relying party sever 145 may respond in variety of ways. For example, in some embodiments, the server 145 may pass information received from the relying device 140 to the authorization server 155 without performing some or all of the previously described operations within the UID repository 160. In turn, the server 145 may receive an authentication result from the authentication server 155 and grant or deny the relying device access based on the received result or time out the access attempt if not result is received within a threshold amount of time. Or, in other examples, the server 145 may receive authentication results (e.g., identifying information or credentials for access attempts to be permitted) from the authentication server 155 for access attempts to be expected by the server 145 (e.g., within a threshold period of time), and the server 145 may use the received information to verify permitted access attempts. In some embodiments, the server 145 may redirect a relying device 140 to the authentication server 155. In turn, the server 145 may wait for an authentication result from the authentication server 155 and grant or deny the relying device access based on the received result or time out the access attempt if not result is received within a threshold amount of time.

In some embodiments, an authentication result may be a token for one or more associated identifiers, and the server 145 may store the token within the UID repository 160 in association with one or more identifiers. One example might be a token and a device identifier for a given device and optionally a user account to which that device identifier corresponds. The token may include an associated timestamp or time-stamps that indicate when the token was created or when it expires. In either instance, the server 145 may determine from a time stamp whether a token associated with a given identifier is inactive or active. In accordance with the above example, the server 145 may receive, from the relying device 140 during an access attempt, a token in addition to information previously described. The server 145 may determine, from information stored within the UID repository 160 in response to receiving a token from the relying device 140, whether the received token matches a valid token received from the authentication server 155. The server 145 may also determine, from an association between the valid token and an identifier within the UID repository 160, whether information received from or determined about the relying device corresponds to the identifier stored within the UID repository 160. For example, the authentication server 155 may be configured to cryptographically hash a specific set (and optionally order) of determinable information received from or about the relying device 140 to create an identifier. Similarly, the relying party server 145 may be configured to execute a process in a similar manner to determine an identifier for a relying device attempting to access a secured asset. As the identifier can uniquely identify the relying device 140 from other relying devices, the relying party server 145 can determine to grant the relying device 140 access if the token presented by the relying device matches a valid token in the repository 160 and an identifier determined for the relying device matches the identifier associated with the valid token in the repository 160.

The set of determinable data and order of the determinable data used to create an identifier may be held secret by the relying party 145 and the authentication server 155 and optionally may change over time or be based on a function dependent on one or more determinable factors. Accordingly, the authorization server 155 may push information about valid tokens and associated identifiers to the relying party server 145 for authenticated clients such that the relying party server 145 may quickly determine whether a relying device is permitted to access a given secure asset. For example, a function in a process for creating an identifier may use one or more token values as input to determine the set and order of data of determinable data to cryptographically hash for an identifier.

Thus, as described above, the relying party 145 relies on the authentication server 155 to perform one or more operations in the authentication process, and permits or denies a relying device 140 access to a secure asset, such as online resource 147, in response to authentication results received from the authentication server 155.

The authentication server 155 performs operations to authenticate users and provides authentication results that indicate whether a user was authenticated. The authentication results may be used by other parties, such as a relying party 145, to determine whether a given relying device 140 should be granted or denied access to a secure asset. User authentication operations performed by the authentication server 155 may be performed out-of-band from attempts by relying devices 140 to access secure assets. Namely, user authentication operations may involve a device different from the relying device 140, such as a mobile device 101.

The authentication server 155 may store data for authentication operations in an authorization repository 165. The authorization repository 165 may include a vast number of UID Records 151. A UID Record 151 may include information associated with a particular user and the devices associated with that user. Some or all of the information stored within the UID repository 160 or representations thereof may be stored within the authorization repository 165 in UID Records 151. In some embodiments, the auth repository 165 is also configured to store data to perform one or more of the functions ascribed the UID repository 160. For example, rather than the relying party server 145 use the UID repository 160, it may instead use the auth repository 165. In such a configuration, the auth repository 165 may be configured to respond to queries to return, store, or otherwise provide data in a similar fashion as the UID repository 160. The data structure of the auth repository 165 may differ from that of the UID repository 160, but one or more queries received at the auth repository 165 from the relying party server 145 may be operable to return and store similar data from the data structure of the auth repository 165. Benefits of such configurations may reduce overhead for relying parties 145 as they can significantly offload authentication burden and reduce storage of user specific data in addition to increasing security.

The mobile device 101, as described previously, is typically a device under control of the user the authentication server 155 seeks to authenticate and is operable to store credentials specific to that user in a secure fashion. For example, the mobile device 101 may include a TEE 103 to store credentials 109 in a secure fashion. Further, the TEE 103 may be operable to generate representations of credential values such that those representations can be passed by the TEE to the CEE 113, and by the CEE 113 to the authentication server 155 without divulging actual credential values. In some embodiments, the representations of credential values may be refreshed or updated within the TEE 103 without requiring a change in credential values. For example, representations of credential values may be dependent on one or more key values or function values used as input in a cryptographic hashing function or encryption algorithm to generate the representations. In turn, the key values or function values may be updated within the TEE 103 to generated refreshed representations, rather than requiring a user to provide a new credential values, which is particularly beneficial in instances where a user may be unable to change a credential value (e.g., for a specific biometric input). As a result, the authentication server 155 may receive and store only the representations of credential values and any data breach cannot disclose user specific credential values. Moreover, in response to any data breach, divulged representations of credential values may simply be discarded and replaced with refreshed or updated representations of credential values. Thus, attackers are limited to targeting individual users. However, in order to ascertain credential values for an individual user, an attacker would need to breach the TEE 103 of the mobile device 101 storing those values. Such a process is time consuming, rarely successful, and would require physical access to a device of the individual storing credential values. Furthermore, because representations are used for user authentication, even if an attacker was successful in obtaining credential values from the TEE of a device, they would only be operable if the attacker knew the current schema for generating a representation thereof after a user reports the device missing or stolen. The end result in view of these mounting difficulties for would be attackers is a highly secure authentication system that mitigates the effectiveness of both specific user targeted and wide scale attacks.

Disclosed embodiments may provide a mobile initiated login process by which users authenticate to access devices or resources, which may be various computing devices like workstations or servers or clients or controllers that govern access to controlled areas or controlled devices. Thus, in some cases, a relying device 140 may be a device managed by a relying party 145, like a workstation or terminal for accessing a server of a relying party (which is not to suggest that a relying device 140 cannot function as a client in some instances, a workstation in some instances, a server in some instances, a terminal in some instances, provide a service in some instances, or one or more at once). Additionally, a relying device 140 may be configured to control another device 141, such as an electrically controlled mechanism, like a relay or motor or servo or other mechanism which may distribute or cause the distribution of an electrical signal or electrical power, such as to engage a lock, a valve, or the like.

A common request-access context might include an employee using a work or personal computer (e.g., a laptop or desktop computer), represented by the relying device 140, to request access to online resources (e.g., a web application) hosted on a server by their employer, and using a work or personal mobile device (e.g., a smartphone or tablet), represented by mobile device 101, to provide data used to authenticate a request to access the online resources. In some cases, an employee enters a username and password on the relying device 140 to gain primary access to the relying device 140 (e.g., login to a user account on the relying device). Examples of such access may include login to an operating system of the relying device 140, login to some other user, administrative, or system level account of a server, or login to a terminal by which other devices may be accessed.

In such systems, access to a device or other asset is often governed by an attempt-authentication-result approach whereby users provide input, like a username and password, to a device, which is authenticated by the device and authentication thereof permits user access. Similarly, for networked devices or user accounts or online resources, a user attempts access with a device by providing credentials in association with the attempt via that same device. Various techniques improve upon security of such approaches, such as with out-of-band authentication approaches discussed herein. Additionally, various techniques improve upon the breadth of services to which an authentication result may confer access, such as with federated identity approaches discussed herein.

Mobile initiated authentication may provide additional or alternative functionality in association with, instead of, or over such techniques, such as by enabling users to initiate and complete authentication on a device different from a relying device the user is attempting to access or on a device different from the relying device by which the user is attempting to access an online resources or other asset of a relying party. In some embodiments, such as by federated identify management techniques discussed herein, authentication of user access to a relying device as disclosed herein may confer additional access to an online resource of a relying party. For example, authentication of the user via a device, like via a mobile device, may permit the user to access to the relying device which may also be authenticated to access an online resource of a relying party. Not all online resources may be afforded this benefit. Some online resources may be provided by other (e.g., $3^{rd}$) parties or access thereto subject to authentication via other services or subject to addition authentication. Additionally, various embodiments may purge (e.g., user) credentials from relying devices such as to minimize attack surface to those credentials, and various embodiments may not permit relying devices (or images utilized thereon) to retain credentials for online resources. Relying devices may also utilize various additional services beyond those which authenticated access of a user to the relying device may initially grant, and authentication to such additional resources may be treated in a similar to those online resources which relying devices are not granted (or cannot be granted) access to by virtue of user authentication to access the relying device alone. In some embodiments, a user may initiate and complete and authentication, for a relying device to access an online resource (or utilize a service), with a device that is different from the relying device. In some embodiments, such authentication steps may coincide with, or occur after, an authentication with the device to the relying device. By virtue of knowing the relying device to which the user is authenticated, additional authentications may be initiated for various online resources (or services) and credentials by which the relying device is permitted to access those online resources (or services) may be passed to the relying device. In some embodiments, the relying device may automatically obtain access an online resource (or service) in response to receiving those credentials. In some cases, such access may be obtained prior to the user physically accessing the relying device. These techniques may incorporate various other technologies, which may include but are not limited to single or reduced sign on and federated identify management techniques to enable seamless access to a variety of assets by virtue of authentication via mobile initiated authentication.

In various example out-of-band authentication techniques, a user may authenticate on an out-of-band device, like a mobile device (or other device), in response to a notification received in response to an attempt to access a relying device or resources. In contrast to a reactive authentication process, in a mobile initiated authentication process a user may initiate an authentication via a mobile device prior to an attempt to access a relying device or a resource (e.g., from a relying device). In turn, the user may be authenticated to access the relying device or resource (e.g., from a relying device), such as prior to the user attempting to access the relying device or resource (e.g., from a relying device), as is described in greater detail in the example embodiments below.

In various example embodiments, a mobile initiated authentication may occur prior to an access attempt by a user. Specifically, a user may pre-authenticate to a given relying device 140 prior to accessing the given relying device or pre-authenticate to an authentication server 115 or a given relying party 145 prior to accessing an online resource 147 provided by the relying party 145 from a relying device (which may be the given relying device, in some cases prior to access, or a relying device which the user has accessed).

In some embodiments, pre-authentication to a given relying device 140 may include one or more authentication processes by which the user having pre-authenticated to the relying device 140 is further authenticated to a web-service, like an online resource 147 of a relying party 145 (or one or more services 175), which may include authentication of the relying device 140 to access to the online resource or services (e.g., via an application 110, for which credentials 111 may differ from those to access the relying device 140). For example, a user may pre-authenticate in a mobile initiated authentication via the mobile device 101 prior to accessing a relying device 140, optionally pre-authenticate to one or more web-services, and access the relying device 140 which may be permitted access to those web-services to which the user authenticated to via the mobile device 101. In another example, a user may pre-authenticate to a web-service, like a relying party or service 175, in a mobile initiated authentication via the mobile device 101 after accessing (or authenticating to access) a relying device 140 (e.g., whether by traditional login (e.g., username and password, out of band login techniques, or mobile initiated login). In either case, the user may engage in the authentication process via their mobile device 101 and the relying device 140 (e.g., like a relying device) may be conferred privileges to the web-service based on the result.

In one illustrative example, a user may arrive at their office building, initiate and complete authentication to their workstation (e.g., a relying device 140) on their mobile device (such as prior to arriving at the workstation), and subsequently access the relying device without additional credential input. Further, in some embodiments, authentication of user access to the relying device 140, may including additional credentialing, which may occur over the same or a different service, such as to permit the relying device 140 (e.g., via an application 110) to access other resources such as web-services, like an online resource 147 (which may optionally rely on different credentials 111 that may be passed to the relying device 140). In some cases, one or more of the additional credentialing processes may be initiated via the mobile device 101 to those web-services, and specifically in cases where authentication to a web-service relies on credentials other than those conferred to the relying device 140 by user access (e.g., under an account of the user on the relying device 140 which the user utilizes on the relying device).

Extending upon examples like those above for a user physically accessing a device, user access to a lab may be governed in a similar fashion in instances where a lock of a door to the lab, like a controlled device 141, may be electro-mechanically actuated by a controller (e.g., a relying device 140) coupled to a network 121. In some cases, a grouping of relying devices may be configured, and a mobile initiated authentication to the group may permit sequential access, or collective access. For example, a workstation A may be in a lab A and both placed in a group A, and a mobile initiated authentication to group A may confer user access to lab A and workstation A, or one or more workstations within lab A. For example, some embodiments may include a UID repository 160 or auth repository 165 within which records about relying devices and which users may access which relying devices may be stored, among other data described herein. Various policy rules may be implemented to regulate security parameters, some of which may be based on obtained data or responsive to feedback, and may be enforced on the mobile device (and in some cases via other devices, such as by authentication servers and relying devices).

In some examples, a mobile initiated authentication may occur proximate to an access attempt by a user, such as for online resources 147 accessed by a relying device 140, in accordance with the principles disclosed herein. In some example embodiments, an online resource 147 may be a virtual desktop, and the relying party 145 may provide virtual desktop infrastructure. Additionally, in some example embodiments, an online resource 147 may be a container or virtualized application, and the relying party 145 may provide virtualized application infrastructure— which may be provided separate from or in association with other virtualization infrastructure. For example, the relying party 145 may be a server or collection of servers on which virtual machines are provisioned. The server or collection of servers may provision numerous instances of a virtual machine (which is not to suggest that all virtual machines are the same, as resources allocated and other aspects may differ). The virtual machines may execute operating systems, applications, or other programs. For example, a virtual machine may execute a desktop image, which may contain an operation system and one or more applications, like virtualized desktop environment, which a user relying device may access over a network to view the desktop and perform tasks (e.g., much like the user would within a traditional, local OS, but over a network). In another example, a virtual machine may execute a container or other file to virtualize an application without providing a desktop environment, which a user relying device may access over a network to view the application (such as via a browser window or other terminal window) or to receive application data (such as via an application which displays or updates data within one or more panes of an interface based on the received data).

In some examples, an instance of a virtual machine may provide a virtual desktop to a relying device 140 (e.g., via a session facilitated by the relying party 145), such as based on an image of an operating system which the virtual machine executes. Thus, for example, the relying party 145 server, which may be a cloud-based distributed computing system within which virtual machines are provisioned, may provide (e.g., as an OS of) a relying device 140 a session to a virtual desktop executed by a virtual machine. A virtual desktop may be persistent (e.g., a user is allocated a desktop image within which user preferences, files, applications, and the like configured during a session are retained—like a traditional OS) or non-persistent (e.g., a desktop image is selected from a pool and user preferences, files, etc. generated during a session are not retained). Additionally, an instance of a virtual machine may provide application virtualization to a relying device 140 (e.g., via a session facilitated by the relying party 145), such as based on a container or other image or executable, which the virtual machine executes. Thus, for example, the relying party 145 server may provide an application of a relying device 140 or the relying device 140 with a session to a virtualized application executed by a virtual machine.

In some examples, such as in cases where a user utilizes their mobile device 101 to authenticate to one or more web-services, there may exist multiple different relying parties 145, which are respectively associated with different online resources 147, and similarly, different services 175. Accordingly, in some cases, a user may utilize one or more mobile initiated logins via the mobile device 101, e.g., to access a relying device 140, which may include accessing a virtual desktop as described above via the relying device 140, and may also include authenticating to one or more other web-services which may be accessed via the virtual desktop—similar to examples where the relying device 140 utilizes a local desktop image. Thus, in either case, mobile initiated authentication to a web-service may authenticate a user to access one or more online resources 147 or services 175 via a relying device 140 (e.g., which the user is authenticated on, which may be an authentication to a virtual desktop access by the relying device 140).

The mobile device 101 may be a mobile computing relying device to which a user has access to and may use to authenticate a request to access a relying device 140, and authentication may occur prior to physical user access of the relying device 140. In some cases, the relying device 140 may be configured to access one or more secure assets like online resources, or other assets, which may be local to the relying device or which the relying device may interface with, like one or more controlled devices 141, and access to the relying device 140, such as via a user account or other access control measure, may confer access to the relying device and, optionally, other assets. Additionally, in some examples of use cases, a user may further use their mobile device to authenticate a request to access a remote resource, like a web service, and authentication of the user may occur prior to an attempt to access the resource by a relying device 140 to which that authentication result is conferred. Accordingly, in some embodiments, the mobile device may authenticate a request to access an online resource 147, and authentication may occur prior to another device requesting to access the online resource. In some embodiments, subsequent to authentication of a request to access a relying device 140, the mobile device 101 may authenticate one or more requests to access web-services, and in some cases the requests may be user initiated via the mobile device 101 and transpire prior to user access to a relying device 140 or attempt to access the web-service with a relying device. In other words, in both instances, a mobile initiated authentication may occur by which access is conferred to a relying device or web-service (e.g., from a relying device) prior to the user attempting access directly (e.g., via login to the relying device 140 or via login to the web-service from the relying device).

Example embodiments of a mobile device 101 include, but are not limited to, portable smartphones and tablet type devices carried by users during their day-to-day activities, among other example mobile devices described herein. Accordingly, while the mobile device 101 may be any client device, the mobile device may optionally include a trusted execution environment which, in some cases, may be an external, portable device capable of being coupled via a bus, like USB, to any client device including a suitable interface. Example devices including highly portable smartphones and tablet type devices carried by users during their day-to-day activities are common representative embodiments. Moreover, smartphone and tablet type devices, given their portability, are more likely to include integration of trusted execution environments for purposes beyond out-of-band authentication, such as for secure payments, digital currency wallets, and the like.

The above should not be construed to rule out other portable mobile computing devices, such as wearables, like watches or bracelets, that as they become more prevalent may be as equally suited as a smartphone or tablet device to collect credentials from users as well as perform other options disclosed with reference to mobile devices. For example, various smart watches may include trusted execution environments or other secure hardware elements, execute applications, such as an authentication application or other native applications, and collect user credentials and other data described herein. For example, various wearable devices are operable to collect at least some user credential inputs which may be used for authentication processes. In fact, devices such as wearables, may be suitable to reduce intrusion on users while meeting robust authentication policies like those disclosed herein. Additionally, embodiments contemplate wearable devices as companion devices to other types of mobile devices 101, and may collectively participate in some disclosed authentication processes (e.g., a wearable device may provide user input or other credentials to a mobile device of the user which may authenticate the user based on the credentials received from the wearable device rather than require the user to input same or different credentials via the mobile device). Further, disclosed examples contemplate wearable devices as standalone devices which may operate a subset of mobile device functionality suitable for user authentication in at least some embodiments.

Embodiments of a trusted execution environment 103 may include any isolated execution environment, which may run in parallel (e.g., concurrently with) with a client execution environment 113 (CEE), e.g., a process executed in the context of the OS and having a distinct virtual address space assigned within the physical address space of the memory to which the CPU is connected via a memory bus. Compared to a user-facing client execution environment 113, which may execute the mobile device operating system and most user-facing applications, the trusted execution environment 103 is expected to be more secure and may execute a subset of specific applications (e.g., applications, services, and/or software modules) on the mobile device, like trusted applications or modules for authentication operations, which may include user authentication, payments, digital rights management, and the like. Some of those authentication operations may be performed in an out-of-band (e.g., external to a channel by which access occurs) authentication process, such as for granting user access to online resources and other assets, payments, digital rights management, and the like. Additionally, the trusted execution environment 103 may store within and/or cryptographically sign data associated with those applications or modules within the trusted execution environment, such as to protect the data from being tampered with, read, and/or modified by an unauthorized entity.

In some embodiments, the trusted execution environment 103 may perform one or more operations responsive to requests received at an interface by which one or more applications within a user-facing client execution environment 113 may request data from or provide data to the trusted execution environment, such as to utilize one or more of the modules within the trusted execution environment 103 for authentication operations. Thus, in some embodiments, a client execution environment 113 may include an application programming interface (API) by which those requests are communicated from the CEE 113 to the TEE 103, and responses thereto are communicated from the TEE 103 to the CEE 113. In some embodiments, the TEE 103 may include an API like that above for facilitating the above communication of data, or may additionally include another API (e.g., in addition to either aforementioned API) or secure operating system for facilitating communication of data between elements within the TEE 103. Thus, for example, once the TEE 103 receives a request or other data for processing, that data can be processed exclusively within (or securely by) the TEE (e.g., without revealing secure data to the CEE). The structure of the trusted execution environment 103 may be logical, implemented in hardware, or a mix of both.

Some embodiments of the trusted execution environment 103 may include a TEE co-processor 105 and TEE memory 107, which may be physically separate from the processor 115 and memory 117 of the client execution environment. For example, some implementation of the TEE memory 107 may include a physically distinct memory address bus from the main processor 115, but which is coupled to the TEE co-processor 105 to support secure communications between them. This is not to suggest that both the co-processor 105/processor 115 or TEE memory 107/memory 117 may not be incorporated in a same package or die or that the co-processor 105 or TEE memory 107 cannot make use of at least some or all of the capabilities of the processor 115 or memory 117 in a secure fashion. In some examples, embodiments of the trusted execution environment 103 may include a TEE co-processor 105 or TEE memory 107 which can be physically separate from but have available the full processing power of the processor 115 or memory 117 of the client execution environment 113. In some embodiments, the TEE co-processor 105 or TEE memory 107 are partially or wholly logically separate, such as by way of a reserved or additional processing core or reserved address space. For example, embodiments of the trusted execution environment 103 may include a TEE co-processor 105 or TEE memory 107, which are logically separated from the processor 115 and memory 117 of the client execution environment, such as by cryptographic isolation of one or more processes, threads, processing cores, or address space, or as secure elements within respective components. Within the trusted execution environment 103, the different trusted applications or modules may also be isolated from one another, such as by cryptographic isolation or other software isolation techniques.

Oftentimes, the trusted execution environment 103 includes at least one keyed hardware component. Keyed hardware components can include a unique cryptographic key or keys for isolating trusted applications or data within the trusted execution environment or to otherwise prevent tampering from the client execution environment 113 or other entity. Keyed hardware components can be substantially tamperproof. For example, the design of the keyed hardware component can be immune to software attacks, and an attacker might have to go to exceptional lengths in physically examining the keyed hardware component (e.g., with highly specialized tools) to even possibly be able to read the key. In some cases, the key may even be stored in a memory configured such that attempts to read the key of the hardware component is destructive to the memory (e.g., causes stored values to change or the memory to change stored values). Thus, under even the most extreme of circumstances, the keyed hardware components can be configured to prevent divulging of their key or keys.

In some embodiments, one or more components operable to solicit credentials from a user may be configured to communicate with the TEE co-processor 105 or memory 117 in ways similar to those described above to provide enhanced security. For example, one or more of the components operable to solicit credentials may be logically or physically isolated from the CEE 113 to support secure communications with the TEE 103. For example, one or more of those components may be physically isolated by couplings through a system bus different from a main system bus. The isolation may also be logical, such as by cryptographic isolation, which may use keys associated with those hardware components operable to solicit credentials. Accordingly, data communications by one or more of those components that is secured by one or more cryptographic keys may, in some configurations, logically flow through or be accessible from the CEE 113 and still be considered isolated as the TEE 103 securely stores a key operable to decrypt the data and that key is not accessible by the CEE 113. As an example, the memory 117 of the TEE 103 may securely store one or more keys operable to decrypt information received from the respective components. In some cases, isolation of one or more components may only be partial, such as where the component also serves a function with the CEE 113. For example, a given component may communicate securely via a separate system bus, cryptographic isolation, or in another secure way (e.g., on a request/response path between the TEE and component) described herein for communications pertaining to the TEE 103 and in an unsecured fashion via a main system bus or without encryption for communications pertaining to the CEE 113.

In some embodiments, the trusted execution environment 103, with the TEE co-processor 105, may execute a process to generate or otherwise store one or more encryption keys 108, which may include one or more keys from a key-pair, such as a pairing of a private encryption key and a public encryption key. One or more generated keys 108, such as generated private keys, may be protected within the trusted execution environment, such as within the TEE memory 107. For example, generated private keys may be isolated from trusted applications within the trusted execution environment by cryptographic isolation. In some embodiments, generated private keys may be encrypted (e.g., for storage) based a cryptographic key of a hardware component, such as a key of one of the TEE co-processor 105 or component associated with the TEE co-processor 104, so that only the TEE co-processor 105 can use a generated private key. For example, a process of the TEE co-processor 105 may access an encrypted version of the generated private key stored within the TEE memory 107 and then decrypt the encrypted version of the generated private key based on a cryptographic key of the hardware component prior to another process utilizing the private key). In this way, a generated private key may be afforded a substantially similar degree of security as that of a cryptograph key of the hardware component. In other words, a malicious actor must cause the hardware component to divulge a key for decrypting an encrypted version of the generated private key prior to being able to use the generated private key (e.g., for a signature). Similarly, the TEE co-processor 105 may encrypt other data stored within the trusted execution environment, either with a generated key, received key, a cryptographic key of a hardware component, or combination thereof. Likewise, the TEE co-processor 105 may decrypt other data, such by decrypting that data with a generated key, received key, a cryptographic key of a hardware component, or combination thereof (such as in instances where some data is encrypted based on a generated private key and stored subsequent to further encryption based on a cryptographic key of a hardware component).

In some embodiments, the TEE 103 may be configured to isolate different data within the TEE 103. For example, some embodiments of the TEE 103 may encrypt different data (e.g., different keys or other data associated with different applications or modules) based on a function that takes as input a cryptographic key, such as a key 108 in TEE memory 107, (which may be a generated key, hardware key, or other stored key) and a value that is altered for the different data. Alternatively, the cryptographic key itself may differ for different data, for example, a function may take as input a cryptographic key of a hardware component and a value that is altered to generate different cryptographic keys for different data. In turn, a function may use different cryptographic keys to encrypt different data within the TEE 103. The value that is altered may be altered deterministically, selected deterministically, generated randomly, output from a linear shift register, or by other method, and the alteration of the value ensures that one module or application within the TEE 103 cannot use a key or data stored within the TEE memory 107 to which it is not authorized.

In contrast to a generated private key of a key pair, which may be maintained solely within the trusted execution environment 103, a public key of the key pair may be shared by the trusted execution environment 103 with the client execution environment 113. Elements outside the trusted execution environment 103 may use the public key of the key pair to encrypt data, which can then only be decrypted with the private key stored within the TEE 103. Similarly, the TEE may sign results or other data output with a function utilizing a private key of a key pair, stored within the TEE 103, and an element outside the TEE 103 may use a disseminated public key of the key pair to verify the signature, and thus verify that the result or other data output was generated by the TEE 103. Thus, for example, the trusted execution environment 103 may execute a process to sign some data with a private encryption key, and a disseminated public encryption key can used to verify that the trusted execution environment 103 signed the data. In the context of authentication, the data may be a credential value or a cryptographic hash value of the credential value and representative of a user authenticating a request to access online resources.

In some embodiments, the TEE 103 and CEE 113 communicate information by way of one or more application programming interfaces, such as an API 104. Some embodiments of the API 104 are implemented in or by firmware stored to non-volatile memory of the mobile device 101, which can sometimes be a memory space separate from the TEE Memory 107 or Memory 117 and specify underlying functions available to the CEE 113 for communicating with the TEE 103 (e.g., like a Basic Input/Output System "BIOS"). Some embodiments of the API 104 may include one or more drivers to facilitate communications with hardware components, such as of the CEE 113 or TEE 103. In some embodiments, the API 104 and drivers may be considered separate, but may be layered, like in a stack, whereby the API 104 provides higher level functions and the drivers facilitate operations associated with those functions. Different configurations may include the example API 104 or other elements supporting API functionality, like drivers, in different locations. Some embodiments may include the API 104 within the CEE 113, within the TEE 103, within an element having a physical interface with the TEE 103 or CEE 113, in firmware of the mobile device 101 (e.g., in a BIOS), or combination thereof. Some embodiments of the TEE 103 may include a monitor to monitor a system bus for requests from an API 104 (or driver). Oftentimes, the location of the API 104, drivers, or other elements depends on the physical or logical structure of the TEE and CEE, which can vary between different implementations. However, regardless of the specific implementation, an API 104 may be configured to provide an interface by which at least some data or results determined within the TEE 103 may be passed to the CEE 113 and by which at least some functions performed within the TEE 103 may be requested by the CEE 113. Further, requests for at least some of those functions may include data or arguments for performing at least some of those functions on the data.

An example API, such as API 104, may be configured to receive requests from elements (e.g., a given application, module or interface) within the CEE 113 and communicate those requests to an appropriate element (e.g., a given application, module, or interface) within the TEE 103. In some embodiments, the API 104 translates a received request from a schema compatible with the CEE 113 to a schema compatible with the TEE 103. In some cases, that may include translating a request in one schema into multiple lower-level requests in another schema. In some embodiments, the API 104 may communicate one or more requests in a schema compatible with the TEE 103 over a system bus, which the TEE 103 may include an interface or monitor to detect those requests for processing within the TEE 103. Example requests may include a request to generate a cryptographic key or key pair, solicit credentials, verify credentials, or otherwise perform a function provided within the TEE 103, such as the various operations of the TEE described herein. In turn, one or more elements within the TEE 103 may process a request and optionally return a result of processing the request to the API 104. In some embodiments, the TEE 103 processes a received request in a schema compatible with the TEE 103 and returns result according to that schema. For example, the TEE 103 may include an interface or monitor to provide results back to the API 104, such as over a system bus. The API 104 may translate results received from the TEE 103 into a schema compatible with the CEE 113. In some cases, that may include receiving multiple results from the TEE 103, some of which may be used in subsequent requests to the TEE 103, prior to returning a result in a schema compatible with the CEE 113 in response to a request received from the CEE. The API 104, in turn, may communicate a result to an element having initiated a request or other specified element.

In some embodiments, one or more elements within the TEE 103 may communicate with one or more elements within the CEE 113 via the API 104 over a secure channel. In some embodiments, the secure channel substantially protects communication sessions between the authentication application 120 and the TEE 103. More specifically, a secure channel prevents other applications, like native applications 125, from accessing data communicated between the authentication application 120 and the TEE 103 in a communication session. In some embodiments, different ones of the native applications 125 may also communication with the TEE 103 over a secure channel such that other applications cannot access the communicated data. In some embodiments, the secure channel extends to communication sessions within the TEE 103. For example, the secure channel may protect communications between a trusted application or module within the TEE 103 and the API 104 such that other trusted applications or modules within the TEE 103 are prevented from accessing data communicated between the authentication application 120 and the trusted application or module which the communication session was established via the API 104.

Cryptographic systems (like those discussed above for encrypting data) generally rely on cryptographic algorithms based on mathematic problems for which there currently exist no efficient solution. The use of asymmetric encryption algorithms, like those utilizing key exchanges, can afford secure communications without requiring a secure channel. One example of such an asymmetric encryption algorithm generates a key-pair for an entity, where a first key of the key-pair is a private key (e.g., held securely by the entity) operable to decrypt data encrypted with a second key of the key-pair and the second key is a public key made available to other entities for encrypting data to be transmitted to the entity having the private key. However, such asymmetric encryption algorithms are computationally intensive and inefficient for high frequency communications or communications of increasing data size. Thus, in many instances, it is preferable to communicate securely, but also efficiently, such as over a secure channel, using symmetric encryption algorithms that are less computationally intensive than asymmetric ones. The secure channel may be initiated utilizing asymmetric encryption to encrypt and pass an identifier or session key that may subsequently be used as a symmetric key or basis therefor in asymmetric encryption algorithms. In some embodiments, an asymmetric key, like a public key, may be used to encrypt an identifier (e.g., by a first entity). The encrypted identifier, in turn, can be decrypted with a private key (e.g., by a second entity) corresponding to the public key and the second entity may return a secure channel to the first entity for a communication session utilizing a shared (e.g., symmetric) encryption key. Additionally, the secure channel may be bound to the identifier such that keys or data created in sessions over the secure channel are not accessible from other application sessions.

In addition to the trusted execution environment 103, the mobile device 101 includes a client execution environment 113. The client execution environment 113 may include a processer 115 and memory 117 configured to perform operations within the client execution environment. For example, the client execution environment 113 may include an operating system (not shown) and one or more applications. Some of the applications may be native applications 125, which generally, are developed for use on a particular platform or device, such as the mobile device 101. Thus, for example, a native application 125 may be loaded into memory 117 and executed by the processer 115 within the client execution environment 113.

One or more of these native applications 125 may be configured to provide services such as notification services, and optionally generate elements within a user interface on the mobile device 101 in response to the receipt of a notification. In addition, some of these native applications 125 may detect, collect, or otherwise support user inputs, such as a selection of a user interface element, and cause an operation corresponding to the selection. In some cases, a native application 125 may prompt the user to provide a specific input in response to the receipt of a notification. In other cases, a native application 125 may evaluate continuously provided inputs (such as from a biometric sensor) in response to the receipt of a notification. In some example embodiments, a native application 125 may evaluate, prompt, or otherwise obtain multiple different user inputs. In either case, example native applications 125 may interface with (or provide an interface on) one or more different components of the mobile device 101 or communicatively coupled devices, such as fingerprint sensors, image sensors, display of software or interface with hardware keyboards, etc. as well as other types of components or biometric sensor devices operable to obtain corresponding user input types. In some embodiments, the TEE 103 may interface via an API with such native applications 140 to securely collect input credentials.

Examples of user input can include selection of one or more characters or digits on a keyboard (e.g., displayed within an interface on a screen of the device or coupled to the device) and receipt of selected characters or digits, which may correspond to a personal identification number, password, or other keyed input. Other similar examples may include input/selection of a pattern or other combination of user interface elements on a screen. Further examples of user input can include selection of a user interface element to capture an external input indicated by the element, such as inputs pertaining to the user, which may include image data from an image sensor or other sensor, like a fingerprint sensor, or other biometric sensor operable to collect biometric input pertaining to the user when the user interacts with the sensor. User input may not be explicit, but rather involve detection of and capturing the input, such as by requesting the user position their face or component performing facial recognition in a position that enables capture of the input. In some embodiments, a native application 125 may communicate with one or more external devices to capture external input, like a wearable device comprising one or more biometric sensors operable to collect biometric input pertaining to the user when the user interacts with the sensor. In some embodiments, some types of biometric input (e.g., heart rhythm, blood pressure, body temperature, etc.) may be evaluated on a continual basis or for a trailing duration of time from a current time of notification where those biometric inputs may be individually or a collection thereof indicative of a particular user after a sufficient period of time; and other types of biometric input (e.g., facial image, fingerprint, eyeprint, etc.) may be evaluated upon receiving particular sensor input requested from the user that are indicative of a particular user at time of collection.

Some example native applications 125 may interface, via the API 104, with the TEE 103 to securely collect and subsequently store, in the TEE 103, various ones of valid representations of user credentials 109 for authenticating user input received from the various ones of the native applications. In some embodiments, the secure collection includes one or more secure communications between the TEE 103 and a component operable to collect the credential, and that process may be initiated by a native application 125 through a request to the API 104. In turn, a user may establish valid representations of different user credentials 109 when setting up their mobile device 101 upon purchase, activation, or update thereof, such as by inputting a password, setting up a faceprint, fingerprint, eyeprint, etc. or otherwise setting up or permitting different types of credentials for protecting data on the mobile device 101. In many cases, an operating system of the mobile device 101 or various ones of the native applications 125 request that a user input various credentials during set-up the device or upon installation or use of the application. Accordingly, one or more valid representations of user credentials 109 may be established or updated within the TEE 103. As described above, the user credentials 109 as they pertain to different applications may be isolated within the TEE 103. Thus, storage of a valid credential may be specific to a given application (e.g., by encryption with a key different from other keys for other applications), even where the credential itself may be the same for some other applications.

Similarly, a native application 125 or operating system of the mobile device 101 may interface, via the API 104, with the TEE 103 to securely authenticate a user based on the user providing input that matches a valid representation of a corresponding credential 109. In some embodiments, the authentication includes one or more secure communications between the TEE 103 and a component operable to collect the credential to receive user input for the credential within the TEE, and that process may be initiated by a native application 125 through a request to the API 104. The received user input may be processed within the TEE 103 for a comparison to a valid representation of the corresponding credential 109 and the native application 125, via the API 104, may receive a result indicating whether the user was authenticated based on the user input. As described above, the user credentials 109 as they pertain to different applications may be isolated within the TEE 103. Thus, authentication of user input with a valid credential may be specific to a given application (e.g., by encryption with a key different from other keys for other applications), even where the credential itself may be the same for some other applications.

In some embodiments, use of one or more of those credentials may be subject to policies implemented by an authorization server 155 providing authentication services or relying party 145 providing access to secured assets, such as online resources, subject to authentication by the authentication service. For example, the authentication server 155 or relying party 145 may accept or deny use of the different ones of the user credentials 109 or specify requirements for acceptance of different ones of the user credentials 109 for authentication for different secure assets. As an example, passwords not meeting certain criteria (e.g., length, randomness, number of unique characters, etc.) specified by a policy to access a given secure asset may be denied. As a result, the user may choose to establish new credentials 109 meeting the policy or a different credential 109 (e.g., of a different type) that meets criteria of the policy may be used. In another specific example, a policy for accessing a given secure asset may dictate that facial recognition credentials may be denied for a subset of mobile device 101 models, brands, or operating systems that are determined to provide insufficient results in securing the device against attack methods (e.g., are easily thwarted by a printed picture or model of a user's face). As a result, for users of devices belonging to that subset of mobile devices, different credentials 109 that meet criteria of the policy may be used.

In some embodiments, an example native application 125 (or application 110 of a relying device) provides a native notification service configured to post or store received notifications (e.g., to a location in device memory) such that other applications may detect receipt of a notification to which that application pertains. For example, an application may post a received notification (e.g., in a location in memory) such that an authentication application 120 (or other application, which in some examples may be a client authentication component on a relying device) may automatically detect and subsequently access the notification. The native application may generate a user interface element alerting the user of receipt of the notification. In turn, selection of the user interface element may call or launch the authentication application 120, which may then access the notification. Alternatively, the authentication application 120 may detect or otherwise receive the notification and generate a user interface element alerting the user of receipt of the notification. Specific implementation may vary depending on mobile device 101 capabilities, such as by operating system version or type, available notification services, and the like.

One or more of the user interface elements may be operable to solicit credentials from the user of the mobile computing device, or otherwise execute a process to solicit credentials. For example, the event handler/authentication application may request one or more native applications of the mobile computing device to present user interface elements configured to solicit the additional credentials via one or more interfaces of the mobile computing devices configured to obtain a corresponding credential input from the user. In some embodiments, the native applications selected to solicit credentials are configured to interface with a trusted execution environment of the client computing device, such that those credentials are obtained within the trusted execution environment. Alternatively, or in addition to interfacing with native applications, the authentication application may interface with the trusted execution environment of the mobile computing device to request solicitation of the additional credentials. In either instance, the user may be prompted to provide solicited credentials (or confirm a providing of the credentials) via one or more user interface elements or components and provided credentials may be obtained within the trusted execution environment when supplied by the user. For example, the user may then supply the additional credentials, like a password, pin code, or biometric "print" measurement (like a fingerprint sensor reading, image sensor reading such as a faceprint, an iris reading such as an eyeprint, a voiceprint, or the like). The authentication application may obtain representations of the supplied credentials. Additionally, one or more key-pairs may be generated within the trusted execution environment, private keys generated within the trusted execution environment may be retained securely within the environment while corresponding public keys may be provided as credentials for verification of data signed with the private keys. Additionally, the trusted execution environment or one or more components within the environment may be configured to sign output data (e.g., results) with a private key to indicate that the data was securely collected or processed within the environment. In such instances, corresponding public keys operable to verify those signatures may be provided as credentials. Thus, generally, credentials may include representations of credential values, signatures of data, or public keys operable to verify signatures. Credentials may be output in a data string containing the various signed data, signed data strings, public keys, representations of input credential values, etc. for input into one or more signature verification functions. In turn, the authentication application may transmit the additional credentials obtained from the user to the authentication server of the authentication system.

In some embodiments, a native application 125 providing a notification service, such as Firebase Cloud Messaging service, Apple's push notification service, Google Cloud Messaging, etc., may receive a notification on the service, such as push notification, and post the notification to a location in memory 117. One or more other applications (either within the client execution environment 113 or the trusted execution environment 103) may monitor that location in memory 117 for posted notifications. The one or more applications may be configured to identify posted notification to which they pertain, and in turn, perform one or more actions in response to the notification and any data which the notification includes. In some embodiments, a notification service posts notifications for different ones of the applications to different locations in memory 117, such as to different locations specified for the different ones of the applications or different locations specified by the different ones of the applications. In some embodiments, a notification service, in response to receiving a notification, passes the notification or a location in memory 117 of the notification to the application to which the notification pertains.

In some embodiments, a native application 125, like an authentication application 120, may include a module, like an event handler, configured to provide notification service capability when executed on the mobile device 101. In some embodiments, the module may be provided separately, such as in a lightweight companion application to the authentication application 120, depending on the configuration on the client execution environment 113. In either instance, the module may be configured to provide notification service capability when loaded into memory 117 and executed by the processor 115 as a background service or process within the client execution environment 113. In turn, the module configured to provide notification service capability may receive notifications from the network 121 by subscription of the module or mobile device 101 to a notification service. For example, the module may monitor a port of the mobile device 101 configured to receive data from the network 121 and identify notifications received at the port, such as based on header information (e.g., sender/recipient information) of one or more data packets containing notification data. In response to identifying a notification, the module may post the notification to a location in memory 117 or otherwise provide the notification to the authentication application 120 by a process like one of the processes described above in terms of a native notification service. Similarly, a native notification service may monitor a port of the mobile device 101 to identify notifications received at the port from the network in a fashion similar to that described above.

Different embodiments may rely on one or more of the different example notification service implementations described herein. For example, in some embodiments, a native notification service executing on the mobile device 101 may receive a push notification pertaining to the authentication application 120 on a notification service to which the mobile device 101 or notification service are subscribed and post the push notification to a location in memory 117. The authentication application 120 may monitor the location in memory 117 for posted notifications that pertain to the authentication application and, in turn, access the push notification posted by the notification service. In some embodiments, the authentication application 120 includes a module configured to monitor for posted notifications. In some embodiments, the module may be provided separately, such as in a lightweight companion application to the authentication application 120, depending on the configuration on the client execution environment 113. In either instance, the module may be configured to monitor for posted notifications pertaining to the authentication application 120 when the module is loaded into memory 117 and executed by the processor 115 as a background service or process within the client execution environment 113. In another example, in some embodiments, the native notification service may receive a push notification pertaining to the authentication application 120 on a notification service to which the mobile device 101 or notification service are subscribed and pass the notification, or information indicative of a location in memory 117 thereof, to the authentication application 120. The authentication application 120, in turn, may receive the notification or retrieve the notification.

Depending on the embodiment, the mobile device 101 may receive push notifications pertaining to an authentication application 120 following one or more of a user's attempt to access a secure asset. For example, a user may attempt to access (e.g., log on to) an internal website by supplying a username (and optionally a password) to that website, access an online or installed application with another device, make a payment with a credit card or other means, attempt a firmware/software update (e.g., code signing), access other accounts and resources (e.g., consumer across banking, finance, shared credential use, etc.), access shared employee solutions like payment portals, stock or other market trading, etc., download a secured file or other data, open a secured program or file therewith, and the like. More generally, a push notification pertaining to the authentication application 120 may be received by the mobile device 101 following a user's attempt to access or modify a secured asset (e.g., an online resource) via a client computing device. Often, such access attempts are performed with a client computing device other than the mobile device 101 and, as such, the notification causes authentication application 120 to prompt the user of the mobile device 101 to provide credentials for out-of-band authentication of the access attempt. Notably, the secured asset need not be an online resource or necessarily correspond to an access attempt from a client computing device different from the mobile device 101. For example, the secured asset may be a secured program or file on either another client computing device or the mobile computing device. In implementations where the secured asset is a resource that may be accessed offline, there may exist a reasonable expectation that devices that typically access the asset include or can obtain network 121 access such that an authenticating entity may be notified of a user's attempt to access the asset, like a secured program of file stored on the device. In some cases, the secured asset may not require authentication upon every access attempt, but rather require authentication when a network connection 121 exists or require authentication after a period of time, like 1-30 days. In the case of a device accessing secured assets that correspond to online resources, e.g., over a network 121, such access is inherent.

In some embodiments, the mobile device 101 may receive push notifications pertaining to an authentication application 120 following an active session of the user on a relying device 140. For example, a relying device 140 executing a client-side authentication component, like an example application 110 (or service), may report active user sessions to the authentication server 155. In some embodiments, for example, a user may provide a user account identifier or other identifying information to the authentication component, or the authentication component may detect identifying information based on which user account was accessed on the relying device, and the authentication component may report the identifying user account (and associated device information for the relying device 140) to the authentication server 155. The authentication server 155 may match the identifying information received from the relying device 140 with that of one or more records, like UID Records. In some examples, the authentication server 155 may store the indication of an active user sessions corresponding to the record of the user for use during a mobile initiated authentication request. For example, the authentication server 155 may provide an indication of which active user sessions on which relying devices a user may select for a mobile initiated authentication to a webservice or other online resource. In some examples, the authentication server 155 may transmit a push notification to a mobile device 101 to indicate that an active session of the user is available for mobile initiated authentications to webservices.

The authentication application 120 may be an application, like a native application 125, configured to execute within the CEE 113. The authentication application 120, like other native application applications 125, may be downloaded to the mobile device 101 and subsequently installed, such as by a user of the mobile device 101. Alternatively, the authentication application and one or more other applications, like some other native applications 125, may be preloaded on the mobile device 101 or included in an operating system of the mobile device.

Once installed on the mobile device 101, the authentication application 120 may be loaded into memory 117 and executed by the processer 115 within the client execution environment 113 to perform one or more of the operations described herein. In some embodiments, the authentication application 120, when executed by the processor 115, includes a registration process that is executed to register the authentication application 120 with a server (e.g., server 145 or server 155). During the registration process, the authentication application 120 may communicate or otherwise establish identifying information about the user and the mobile device 101 with the server. Example communicated information and data may include one or more keys 108, a digital signature of data based on a key 108, cryptographic hashes of credentials 109 or other user or device 101 specific information and data stored within the TEE 103. Example communicated information may also include information about notification services available to the authentication application 120 for receiving notifications pertaining to requests for authentication of a user through the authentication application. Example communicated information may further include one or more preferences or setting pertaining to credentials the mobile device 101 is operable to or configured to obtain (e.g., directly or from a wearable or other device) or credentials the user is willing to use (e.g., password, faceprint, fingerprint, etc.). Example communicated information may further include policy information governing use of different credentials and properties thereof. Policy information may be stored on the mobile device 101 or the server. Policy information may be updated for different secured assets.

In some embodiments the authentication application 120 includes one or more modules, such as an event handler, which may be loaded into memory 117 and executed by the processor 115 as a background service. In some embodiments one or more of those modules, such as the event handler, or other functions ascribed to the authentication application 120, may be included in or as separate companion applications that are executed (e.g., as background services) to provide similar functionality.

The authentication application 120, as described above, may be configured to detect or otherwise receive notifications pertaining to a user's attempt to access a secured asset, such as an online resource. In many cases, the access attempt is initiated from a device different from the mobile device 101, such as via a relying device 140.

In response to such a notification, the authentication application 120 may be configured to interface with the TEE 103, such as via the API 104. The authentication application 120 may also be configured to interface with one or more native applications 125. For example, the authentication application 120 may query the API 104 or a native application 125 to solicit or otherwise collect a credential input from a user. In turn, the authentication application 120 interfaces with the TEE 103 to obtain a result for the credential input by the user. The credential input, whether biometric, pin, alphanumeric password or other, is processed within the TEE 103 to determine a result. The TEE 103 may process the credential input responsive to one or more requests or commands received from the authentication application 120 via the API 104. to the TEE of the mobile device. In some cases, the result may include an indication of whether the input credential matches a stored valid representation of the credential 109 or does not match the stored credential. If the input credential matches the valid representation within the TEE 103, the result may be cryptographically signed within the TEE 103 and transmitted to the server. In turn, the server may verify the result responsive to the signature indicating the user authenticated with the device 101. In some cases, the result may include a cryptographically signed input credential or hash (which may be a cryptographic hash) thereof for remote matching and verification by the server. For example, the TEE 103 may sign a cryptographic hash of the input credential within the TEE 103. The TEE 103 may output data, such as a representation of the input credential and identifying data for the notification for which the credential was collected, and signed data, where the signed data may be a signature of a data string comprising the input credential and the identifying information for the notification. The server may receive the result and may compare a cryptographically hashed input credential from the output data to a valid representation of the credential, where the valid representation of the credential was hashed with a same cryptographic hash function, in addition to verifying a signature, such as with a public key received in a prior registration process. Thus, the authentication application 120 may transmit a given result received from the TEE 103 to a server in accordance with the different implementations described herein. In cases where the input credential does not match the stored credential, solicitation or collection of credential input may be performed again, as described above. In the case of remote verification failure, a subsequent notification may be received and processed by the authentication application 120.

The authentication application 120 may be configured to establish a session defining a secure channel with the TEE 103 to protect data communications between the authentication application and the TEE. For example, the authentication application 120 may be configured to generate an identifier and provide the identifier to the TEE 103, such as via the API 104. The identifier may be tied to the authentication application 120, determined at random, selected deterministically (e.g., based on a register value, system time, etc.), or a combination thereof, such as concatenation of an identifier tied to the authentication application 120 and a current system time. Further, the identifier may be determined by a processing of the data described above, such as by input of the data into a cryptographic hashing function or key generation algorithm to generate the identifier. In turn, the TEE 103 may return a session bound to the identifier such that other applications cannot access data transmitted between the authentication application 120 and the TEE 103, which can include data created during the session. The data created and transmitted during the session may include one or more keys, results, or other requests and responses generated during the session. For example, during a session, the user may establish one or more credentials 109 in TEE memory 107 for use with the authentication application 120.

The established credentials 109 may include cryptographic hashes or other ciphertext of credential values whether biometric or alphanumeric, such that those representations may be passed to a sever, like authentication server 155, for authentication operations without divulging actual credential values. In addition, or alternatively, the established credentials 109 may include unique signature information from the TEE 103 (such as a public key) that is passed to the authentication server 155 such that signed data (with a corresponding private key) output by the TEE can be verified as originating from the TEE.

The authentication application 120 may receive credentials 116 (e.g., public keys and representations of credentials) like those described above from the TEE 103 for out-of-band authentication operations. Those credentials 116 received by the authentication application 120 may be stored in memory 117 within the CEE 113 and transmitted to a server without divulging actual credential values, as they are representative of credential values protected within the TEE. The authentication application 120 may verify they originated from the TEE (e.g., verification of signed data output by the TEE), and pass the credentials to a server, like the authentication server 155. One or more of the credentials may be passed in a registration process with a server, like authentication server 155, or in response to a received notification. For example, in a registration process, the authentication application 120 may be configured to pass signature information to the server such that received data can be verified as originating from the TEE 103 and one or more representations of credentials for different credential input options may also be passed. During an authentication process, such as in response to receipt of a notification requesting the user to authenticate via one or more different credential input options, the authentication application 120 may pass data and signed data received from the TEE 103 to the server for verification. In some embodiments, the authentication application 120 may request the TEE 103 output signed data with a timestamp or include identifying information associated with a particular notification such that signed data may be considered valid for a particular notification or at a particular point in time to prohibit reuse. In other words, the server may check that 1) a timestamp or other identifying information associated with a notification matches a transmitted notification, 2) a representation of a credential in output data matches a stored representation (e.g., one stored by the server during a registration process), and 3) signed data, which may be a signature of an output data string of (1) and (2), e.g., {representation, notification ID or timestamp}, is verifiable by a public key provided by the TEE during a registration process. The verification process indicating that (1) and (2) were provided by the TEE 103 as only the TEE stores the private key operable to generate signed data verifiable by the data, organized into the string, and the corresponding public key. In some embodiments, the identifying information for a particular notification may include a particular location or address (e.g., IP address and port number, identifier on a notification service, etc.) to which the authentication application 120 should transmit output data and signed data. In some embodiments, the location or address may be specific to the notification and the authentication application 120 may request signed output data including the location or address specified by the notification to further inhibit possible reuse.

In some embodiments, a session received by the authentication application 120 from the TEE 103 may be in a state that requires registration, such as upon initially executing the authentication application as described above, or a state to continue communications. In the state to continue communications, establishment of the secure channel may be predicated upon the user (and optionally the authentication application itself) successfully authenticating based upon past credentials or deterministic values.

In the registration state, the authentication application 120 may be configured to execute a key exchange process with the TEE 103 to initialize a session. For example, the authentication application 120 may provide an identifier to the TEE 103, and the TEE may return a shared key by which the authentication application 120 and TEE 103 can securely exchange data over a channel for the duration of the session. In some embodiments, the shared key generated by the TEE 103 is based on the identifier. The authentication application 120 may be configured to verify that the shared key was generated within the TEE 103, such as by verifying a signature of the TEE. In another example, the authentication application 120 may request a public key of a key pair from the TEE 103. The authentication application 120 may be configured to verify that the public key was generated within the TEE 103, such as by verifying a signature provided by the TEE. In turn, the authentication application 120 may encrypt information with the public key for transmission to the TEE 103. For example, the authentication application 120 may provide the identifier encrypted with the public key in a transmission to the TEE 103, and the identifier may serve as a shared key for encrypted data transmitted during the session. In some embodiments, the identifier may be a public key of a key pair, and the TEE 103 may return a shared key to the authentication application 120, encrypted with the identifier (public key), and the authentication application may decrypt the shared key with the corresponding private key of the key pair to determine the shared key value. The authentication application 120 may determine that any keys or other data received from the TEE 103 were generated within the TEE by the verification of a signature of the data received from the TEE 103. With a shared key established, the authentication application 120 may transmit data to the TEE 103 either by encryption with a public key provided by the TEE 103 or by a shared key.

In some embodiments, the authentication application 120 is configured to interface with the TEE 103 to establish one or more valid credentials 109 for the user within the TEE. The process may occur subsequent to the establishment of a secure channel with the TEE. Some of those credentials 109 may already exist within the TEE 103, such as those previously established by the user, and which the TEE may store for authentication of the user when utilizing the authentication application 120. Those credentials stored for utilization with the authentication application 120 may be encrypted or cryptographically hashed to produce representative values. The representations may even differ for different relying parties utilizing the authentication system. For example, the authentication application 120 may be configured to register for different ones of the relying parties by a process similar to the registration process described above, such as by using different identifiers, and notifications may indicate to which relying party they pertain such that corresponding representations may be requested from the TEE 103 as output. A user may authenticate via input of one or more of the credentials to configure those credentials for use with the authentication application 120. As described previously, the TEE 103 may encrypt representations of those credentials 109 for use in association with the authentication application 120. In some embodiments, different ones of the credentials selected for use in association with the authentication application 120 may be checked against a policy.

Credentials not conforming to the policy, whether by strength, length, or security, may be rejected and the use optionally permitted to resubmit credentials for storage within the TEE as applicable. In addition, with a secure channel established with the TEE 103, a user may update one or more credentials. In some embodiments, any updating or establishing of credentials is subject to authentication of the user, such by the user providing one or more input credentials that match valid representations of credentials 109 stored within the TEE 103. For example, in order for the authentication application 120 to instruct the TEE co-processor 105 to execute one or more tasks within the TEE, such as read/write operations within the TEE memory 107, via the API 104, authentication of the user may be required.

In some embodiments, the authentication application 120 is configured to increment a counter associated with communications received from the TEE 103. Specifically, the TEE 103 may provide a counter value that the authentication application 120 must increment and include in a response to or a next communication with the TEE 103 for the TEE to consider the response valid. The TEE 103 may consider the response valid when the incremented count value returned by the authentication application 120 matches an expected value. In addition, for each valid response, the TEE 103 may compare the counter value to a threshold. If the counter value (or a tracked number of increments) exceeds a threshold, the TEE 103 may request the authentication application 120 repeat the previously described key-exchange process to refresh the secure channel and reset the count. In some embodiments, the TEE 103 may refresh the secure channel dependent on whether the user can provide a requested credential that matches a valid representation of credential 109 stored within the TEE, as described above.

The counter value (or values) may be a numerical value or alphanumerical value, like a hash of a numerical value, or some other value. Examples of other values may be a value output by a linear shift register, an identifier of a linear shift register to increment, a location in memory, or other value that may be incremented by the authentication application 120 for a comparison to an expected value, and by which the TEE 103 can track a number of increments performed (e.g., a count). In some embodiments, the incrementing is performed deterministically, for example, the authentication application 120 may increment a counter value provided by the TEE 103 based on a value output from incrementing a given linear shift register or from a provided location in memory. TEE 103 may determine a count from a number of increments (e.g., inputs) provided to a liner shift register or to another functional component (or function) and verify the output value provided by the authentication application 120. Regardless of the specific implementation, verification of the incremented value with an expected value within the TEE 103 ensures that the communication from the authentication application 120 is legitimate and without any attempted injection by an outside actor.

In various disclosed embodiments the mobile device 101 may store user credentials within a TEE 103, and causing the TEE to divulge such credentials may be particularly difficult. In addition to the above-mentioned credentials, other credentials, like authenticators for relying devices may be established during registration of a mobile device 101 of a user to a given relying device 140 in accordance with one or more protocols governing access to the relying device. For example, certificates may be established, and may be protected by other credentials. In turn, the authentication server 155 may verify such information provided by the mobile device 101 in a mobile initiated authentication process and, in response, issue a session to a relying device by which some or all of the information may be passed to the relying device. In turn, the relying device 140 utilize some or all of the information to log the user into the relying device via one or more services which may also convey user access to online resources 147 of other relying parties 145.

In addition to the above-mentioned authenticators for relying devices, other authenticators for web-services may be established during (or after) registration of a mobile device 101 of a user to a given relying device 140 in accordance with one or more protocols governing access to the web-services. Specifically, authenticators for web-service which a user may desire to access via a relying device 140 may be established, and the user may utilize their mobile device 101 to authenticate the relying device to access those web-services. For example, certificates may be established, and may be protected by other credentials for mobile devices 101 and relying devices 140. Additionally, in the context of some web-services, the authentication server 155 may establish one or more certificates with a web-service provider (e.g., a relying party 145 or services 175A provider), and the authentication server 155 may provide an identity service 175B trusted by the web-service provider. In turn, the authentication server 155 may verify information provided by the mobile device 101 in a mobile initiated authentication process and a web-service may trust an authentication result (e.g., by signature verification). Some embodiments may issue a session to a relying device 140 by which some or all of the information may be passed to the relying device. The relying device 140 may utilize information received via the session to access a given web-service which a user authenticated to on their mobile device 101. For example, the relying device 140 utilize some or all of the information to log the user into the web-service on the relying device, whether automatically (and optionally launching an application associated with access to the web-service) or upon the user launching an application and attempting to access the web-service (e.g., without requiring at least some credential input by user that would otherwise be required).

Along with credentials like those outlined above and elsewhere herein, the TEE 103 may store other data. In some embodiments, this may include a policy, rules of a policy, or other instructions by which a policy may be enforced. For example, the TEE 103 may store one or more policies by which a user authenticates with an authentication server 155 to access a relying device 140 or web-service. Alternatively, the TEE 103 may store data, like a cryptographic hash, of a policy or rule or instruction by which corresponding data within the CEE 113 may be verified based on processing performed within the TEE 103. Other configurations may also be implemented to verify a policy and compliance therewith. In the case of online authentications, verification of compliance with policy may ensure an access request generated by a mobile device 101 includes the required authentication information by which an authentication server 155 verifies the request to permit user access. In some embodiments, compliance may alternatively comprise a request-response structure, such as by the mobile device 101 transmitting a request with some initial information, like an identifier, such as of a given relying device, or a web-service to which the user of the mobile device is requesting to authenticate to and the authentication server 155 may transmit a response including, or based on a policy, instructing the mobile device 101 to provide indicated authentication information. An online policy may function as a request filter to ensure authentication requests generated by a mobile device 101 comply with rules enforced by an authenticator service (e.g., a prompt may instruct the user to enable WiFi or Bluetooth connections, such as to obtain one or more signals) prior to transmission of an access request.

For offline authentication, a mobile device 101 may store an offline policy specifying rules by which offline access to a relying device may be granted in instances where online authentication is unavailable. For example, the relying device or mobile device or both may experience a loss of network access or one or more authentication services, like an authentication server 155 or one or more services 175 may by otherwise unreachable. An offline policy may be similar to an online policy, although an online policy may be enforced at an authenticator service level in addition to or instead of a mobile device 101 side. Offline policies may be configured for enforcement at the mobile device 101 side in instances when one or more authenticator services are unavailable (e.g., to one or both of the relying device and mobile device). The offline policy may enforce compliance with rules beyond user authentication on the mobile device 101 in instances where networked services are unavailable. In some cases, the rules may specify compliant configurations for wireless interfaces of the mobile device 101 such as to prevent users from bypassing online authentication processes. In some cases, policies may be stored within a CEE 113 but may be verified by the TEE 103 (e.g., by signature verification) or encrypted with a protocol for which the TEE, but not the CEE, includes a key operable to decrypt the policy according to the protocol. Thus, offline policies may be strongly enforced on a mobile device-side, such as to permit user access to a relying device subject to authentication in compliance with an offline policy when an authentication service is unavailable.

The TEE 103 may store offline values, which may be single use credentials, by which a user may access a relying device. Additionally, in some embodiments, offline values may be utilized to permit access DRM protected content or applications local to a relying device 140. For example, the TEE 103 may store a limited number of single use offline values that may be used before an online login process is required, and the offline values may be refreshed upon success of an online login process. The TEE 103 may provide (e.g., to the CEE 113) an offline value for display or transmission. For example, the TEE 103 may decrypt, access, or otherwise return a result to the CEE 113 indicative of the offline value. For example, the TEE 103 may decrypt, access, or otherwise return a result to the CEE 113 indicative of the offline value (which could be or include the offline value itself, e.g., in plaintext form). In some cases, the TEE 103 may receive data corresponding to an offline value or set of offline values in encrypted form from the CEE 113, such as where an application, like an authentication application executed by the mobile device 101, stores data corresponding to one or more offline values in encrypted form within the CEE, but for which the TEE (and not the CEE) maintains a key by which data in the encrypted form can be decrypted. In turn, the TEE 103 may decrypt received data corresponding to an offline value, and may return a result to the CEE 113 indicative of the offline value. In some cases, the TEE 103 may cause the display of or provide results, values, or data indicative of a result or value to another interface. An offline value may be displayed, returned, or provided by the TEE 103 subject to authentication of the user based on one or more credentials and compliance with rules of a policy governing use of the offline values. The TEE 103, as previously described, may store within or cryptographically sign data associated with applications, or modules within the trusted execution environment, such as to protect data from being tampered with, read, or modified by an unauthorized entity, and the TEE 103 may release only representations or certain credentials (e.g., offline values or certificates) or decrypt certain data (e.g., offline values or certificates) or sign certain data (e.g., certificates or representations of credentials) subject to user authentication results determined within the TEE 103 and, in some cases, verification of compliance with policy. In some cases, some data, such as one or more certificates or offline values or policies may be stored (e.g., by an application, like an authentication application) within the CEE 113, but in encrypted form, as such data may be updated more frequently than other data, such as credentials established within the TEE 103. Additionally, because certificates, offline values, policies, or other data may be received (e.g., in encrypted form) by the CEE 113 (which is not to suggest that embodiments preclude the TEE 103 from receiving such data without it flowing through the CEE) prior to being passed to the TEE 103, storage of the encrypted data within the CEE may pose minimal risk (e.g., when a key by which the encrypted data may be decrypted is maintained with the secure memory of the TEE and not a memory of the CEE). In other words, in some cases, embodiments may store some data within the CEE in encrypted form (e.g., as received from another entity, such as encrypted by a public key for which the TEE maintains a private key of the key-pair) and request the TEE process the encrypted data for which the TEE (and not the CEE) maintains the key or keys by which the encrypted data may be decrypted when processing of the data is required. Accordingly, authentication results may be determined within the TEE 103 and thus may convey a high degree of security even in offline authentication processes. Mobile initiated authentications may incorporate, be incorporated in, or otherwise function in association with other improvements on credential security and federated identity management systems disclosed herein (which is not to suggest that mobile initiated login processes are not compatible with other identity management and credentialing systems).

Embodiments of an authentication application 120 may be configured to receive an indication to initiate authentication of the user with the mobile device 101 of the user. Prior to such a request, the authentication application 120 may be configured to establish credentials and receive relying device information in association with a process by which the mobile device is registered with a relying device. In turn, an authentication result provided by the authentication application 120, and which may be verified by an authentication server 155, may permit user access to the relying device 140 based on that authentication result and verification.

In some embodiments, an authentication application 120 may be configured to receive an indication to initiate authentication of the user with the mobile device 101 of the user to a web-service. Prior to such a request, the authentication application 120 may be configured to establish credentials and receive web-service information in association with a process by which the mobile device 101 resisters for mobile initiated authentication with the web-service. In some cases, a web-service access may be authorized for some relying devices but not others, or depend on relying device information (e.g., the device from which the web-service will be accessed). In such cases, prior to such a request, the authentication application 120 may be configured to establish credentials and receive relying device information in association with a process by which the mobile device is registered with a relying device from which the user accesses the web-service. In turn, the authentication application 120 may be configured to indicate to which web-services the user may establish credentials for mobile initiated authentication. In turn, an authentication result provided by the authentication application 120, and which may be verified by an authentication server 155, may permit user access to a given web-service from the relying device 140 based on that authentication result and verification.

In some embodiments, the authentication application 120 may receive policy information governing access to a relying device 140 (or web-service like a server providing online resources 147 or services 175A or other assets). Policy information may include one or more rules by which an access request must comply for authentication. In some embodiments, policy information may be processed by the mobile device 101. For example, one or more rules specified by a policy may be processed to obtain data for constructing a valid access request. Some embodiments may process one or more rules and associated data within a TEE 103 of the mobile device 101. Some embodiments may process one or more rules and associated data within a CEE 113 of the mobile device 101. Some embodiments may process some rules and associated data within the TEE 103 and other rules and associated data within the CEE 113, and some embodiments may process some data within the CEE 113 and the TEE 103 may verify the processing or a result of the processing. For example, the TEE 103 may cryptographically sign a result or other data indicative of a result of processed data with a key of the TEE 103. In some embodiments, the authentication application 120 may obtain data in compliance with the policy, such as by generating one or more requests to the TEE 103 to securely obtain a portion of data in compliance with the policy. For example, the authentication application 120 may request the TEE 103 prompt the user to securely provide one or more credentials for authentication. The TEE 103 may provide an authentication result to the authentication application 120. In turn, the authentication application 120 may cause the mobile device 101 to transmit an access request including authentication results (e.g., those determined at the mobile device 101) to a server or service for verification (e.g., such as authentication server 155). The server or service may verify the received authentication results (e.g., based on policy) and permit or deny the access request. Embodiments may also perform a similar process in a request-response (e.g., like a challenge) framework by which the authentication application 120 transmits a request to the authentication server 155 which issues ones or more challenges (e.g., in accordance with a policy), the authentication application 120 process the challenge(s), which may include obtaining user credentials or other information which may be processed and signed (e.g., within the TEE 103) and transmitted to the authentication server by which the authentication result is determined. Thus, in some cases, one or both of the authentication application 120 and authentication server 155 may enforce policy in addition to verifying data for authentication based on policy. In other words, here, when network 121 connectivity is available to the various participants, an authority (e.g., like an authentication server or service) may permit or deny user access based on information included in an access request (or provided in response to one or more issued challenges), and an authentication application 120 may generate the access request (or provide challenge responses) in compliance with the policy.

In some cases, however, one or more networked services or servers may be unavailable to a mobile device 101 or relying device 140 (or a relying party) by which access (e.g., in accordance with an online authentication process) is granted. Accordingly, in some embodiments, upon registration, or upon (e.g., each) online authentication, in which a user of a mobile device 101 is permitted to access a relying device 140, the mobile device 101 may receive data by which the user may access the relying device in accordance with an offline authentication process. For example, the mobile device 101 may receive data corresponding to one or more offline values, instructions for determining one or more offline values, or a combination thereof. An offline value may permit user access to a relying device 140 in instances when one or more networked services or servers are unavailable. The data (e.g., an offline value) obtained by the mobile device 101 for offline authentication, in response an online authentication (or registration) to access a given relying device 140, may correspond to data obtained by the relying device 140 by which the data obtained by the mobile device 101 can be verified for offline authentication. For example, one or more authentication values, or instructions for authenticating one or more offline values, or a combination thereof by which an offline value or other data received from a user or mobile device may be authenticated in an offline authentication process may be provided to (or determined by) a relying device 140 upon registration or upon an online authentication. In some embodiments, a server or service may push data for offline authentication to the mobile device 101. In some embodiments, a server or service may generate data for offline authentication and push first data to the mobile device 101 and second data (e.g., by which the first data may be verified) to the relying device 140. In some embodiments, the relying device 140 may generate all or some of the first data or the second data, the first data may be pushed to the mobile device 101.

Some embodiments may establish offline values for DRM protected content or applications, such as those local to a relying device 140, but for which access thereto is permitted responsive to online authentication. Such content and application may be distinguished from non-local content and web-services for which networked services are required for operation, like where local data is not retained by the relying device 140 or within an internal (e.g., private network) that the relying device 140 is connected. As an example, a user may utilize an offline value to launch a photo-editing application locally installed to the relying device 140 or virtual desktop accessed by the relying device where external network access is unavailable, and locally cached (or stored) data may be accessed, but other online services or assets may be unavailable. Another example might be a game with a local component which a user may access and utilize without a network connection, but which may still be governed by online-DRM checks. Refreshed offline values, which may be generated in association which an online-authentication may be passed to the authentication application 120 for storage as offline values, and these values may be generated by the relying device 140 as permitted by a policy governing the content (or obtained by the relying device 140 from a relying party 145 or service 175 upon authenticated access in association with DRM compliance) and passed to the mobile device. In turn, those offline values may permit a limited number of offline-authentications, such as by inputting an offline value to the relying device 140 when attempting to access DRM protected content in the absence of networked access to perform an online-DRM check.

Accordingly, in some embodiments, policy verification, or verification of authentication results in accordance with a policy, may be performed on the mobile device 101 (e.g., with or by the TEE 103) in association with determination of an authentication result. For example, an offline policy may govern access to a relying device 140 or other resource in instances when an authentication server or service is unavailable (e.g., due to a loss of connection to a network 121 or other type of outage affecting one or more devices, servers, or services). In some embodiments, verification of compliance with an offline access policy may permit the release of an offline value by which a relying device 140 or other resource may be accessed during an outage. For example, based on the verification of compliance with the offline access policy, the TEE 103 may release (e.g., from a secure memory 107 of the TEE 103) an offline value by which a relying device 140 or other resource may be accessed during an outage. In another example, based on verification of compliance with the offline access policy, the TEE 103 may decrypt (e.g., within the TEE 103 by a key stored within the secure memory 107) an offline value (e.g., which may be encrypted and stored within memory 117 or the secure memory 107) by which a relying device 140 or other resource may be accessed during an outage.

In some embodiments, a mobile device 101 may be provided with a limited number of offline values, such as single use offline values, like a set of offline values (e.g., to which a corresponding relying device 140 is responsive) that are accepted (e.g., by the corresponding relying device 140) once each, and optionally must be presented sequentially. In some embodiments, a mobile device 101 may be provided with an offline value which must be concatenated with some other value (e.g., value corresponding to number of uses, or a value indicative of a count) to obtain an offline value in the set or a next offline value in the set. In some embodiments, after obtaining an offline value, the user may input a modifying value (e.g., displayed to the user by a relying device 140 based on a processing of the offline value) by which a next offline value may be obtained. In some embodiments, a mobile device 101 may be provided with an offline value (e.g., to which a corresponding relying device 140 is responsive) which may only be accepted a limited number of times. For example, a relying device 140 or other party accepting the offline value may increment a counter or value indicative of a use count for the offline value to accept the offline value only a limited number of times.

Thus, authentication may be subject to one or more policies, which may specify one or more rules by which users may successfully authenticate, whether online or offline (and where offline authentication rules may differ based on various factors). For example, a policy may specify one or more rules by which a mobile device 101 obtains one or more signals for authentication. An online policy component may specify one or more rules by which a mobile device may be authenticated, and authentication may be subject to verification of one or more signals from a set of signals obtained by the mobile device. An offline policy component may specify one or more rules by which a mobile device may be authenticated if one or more of the signals from a set of signals cannot be obtained (e.g., a network 121 connection via one or more wireless interfaces). For example, the offline policy may include one or more rules pertaining to wireless signal receiving interfaces of the mobile device 101 to prevent a user from bypassing an online policy by disabling such interfaces or routing communications on an interface through a proxy or other filter configured to prevent communications associated with authentication (e.g., to prevent collection of a signal or attempt to cause an offline authentication process). In some embodiments, policy rules may permit the mobile device 101 to utilize either an online authentication mode or offline authentication mode (e.g., based on locally stored policy rules) in normal use. In other words, a user may be permitted to elect to authenticate in accordance with an offline policy when online authentication is otherwise available. Thus, for example, the user may access a workstation or server (e.g., based on offline values released based on authentication in accordance with offline policy) which does not have network access. Additional configurations are disclosed herein which may implement detection and force utilization of one or more online authentication processes when available to the mobile device 101 based on an offline policy. These different policy configurations need not be mutually exclusive with respect to other disclosed aspects herein as access to different relying devices, like different workstations or servers or an issued workstation for a given user, by different users, may be governed by one or more policies (e.g., per relying device, per collection of relying devices, per user, per groups of users, or one or more combinations thereof). In various ones of the cases, the offline policy to which a given user (and in some embodiments the mobile device) is subject to for authentication to access a given relying device may be stored, e.g., cached, on the mobile device 101 of the given user and applied when the user elects to authenticate to the given relying device in an offline, or partial offline, authentication. For online authentication, in some cases, the mobile device 101 of the user may also store, e.g., cache, a policy for an online authentication process, which may indicate to which authentication rules or criteria the user (and in some embodiments the mobile device) is subject to for accessing a given relying device, such that a request to authenticate may be generated and include information (e.g., credentials) for authentication. In another online authentication example, the mobile device 101 may request a policy for a relying device in an online authentication process, such as by indicating in or by the request which relying device the user is attempting to access to obtain the policy for the relying device and sub Information for authentication may in turn be provided in response to one or more challenges, an indication of which policy rules or criteria the user or mobile device must meet to authenticate, or in accordance with one or more of the techniques described above and herein in combination.

In some example embodiments, authentication initiated via the mobile device 101 to permit user access to a given relying device 140 may be subject to obtaining a signal from a beacon (such as a Bluetooth, NFC, optical, sound wave (which need not be audible), or other beacon technology capable of emitting a signal which may be obtained by a mobile device within a given proximity of the beacon) positioned within proximity of (or otherwise associated with) the relying device, or GPS coordinates with a given geofence within proximity of the relying device, or connection to a WiFi network available within proximity of the relying device, and the like. In some embodiments, the mobile device 101 may obtain data conveyed by a signal, like a value or data encoded via the signal, or which the signal itself is indicative. For example, a signal may convey an identifier, like an alphanumeric identifier, a sequence of identifiers, or the like that is indicative of the relying device 140 or user being proximate to a relying device 140. In some cases, a wireless protocol utilized by a relying device or beacon associated with a relying device may be operable to receive communications from the mobile device, such as to receive a value pertaining to an access request, such as an offline value in an offline authentication process, although the relying device may receive such values via other interfaces, such as by user input.

In another example, a signal may comprise wireless connectivity, such as whether the mobile device 101 is connected to a wireless network, such as a WiFi network, like an internal WiFi network or other access point provided within proximity of the relying device 140. Connection information may indicate an access point, such as by an identifier of a networking device through which communications of the mobile device 101 are passing, like a particular router, or server, or other networking device which is proximate to the relying device 140. In some cases, access requests may be transmitted over such a wireless connection, such as to indicate that the mobile device 101 obtained wireless connectivity (e.g., to a network 121) within proximity of the relying device 140 to which the user is requesting access. Alternatively, the mobile device 101 may collect information about which wireless access points are available within the proximity of the mobile device 101 and communicate information about those access points in association with an access request over another communication channel. For example, the mobile device 101 may determine information about one or more WiFi access point(s) and communicate that information in association with an access request transmitted over a wireless connection (e.g., 3G, 4G, 5G, etc.) through a wireless service provider. In either case, a mobile device 101 may obtain other signals conveying other information for transmission in association with an access request over a WiFi, wireless provider, or other wireless network. For example, the mobile device 101 may obtain GPS co-ordinates from a global positioning satellite or via triangulation based on other signal sources, or a value from a beacon (e.g., as described above).

As noted above, a policy may include one or more rules, and those rules may specify which signals should be obtained, which communication interfaces should be active to obtain one or more signals, and also by which communication interface(s) a mobile device 101 may be permitted to transmit an access request. For example, the communication interface(s) a mobile device 101 may be permitted to transmit an access request in accordance with online authentication policy (e.g., to a server) may generally include those communication interfaces which are configured to exchange data over a network 121, like via WiFi access points or via wireless providers, but these examples should not be read to exclude other bi-direction wireless communication protocols or non-wireless communication interfaces like Ethernet. In an offline authentication process, a relying device 140, as noted previously, may be configured to receive an offline value via user input, but disclosed embodiments are not so limited. For example, in accordance with an offline authentication policy, a mobile device 101 may be permitted to transmit an access request (e.g., by conveying an offline value or other data) to a relying device or device associated with the relying device via one or more communication interface(s) in instances where those devices include a corresponding interface (e.g., instead of the user inputting the data). Example communication interfaces applicable to offline access policy may generally include those communication interfaces which are configured to exchange data between devices proximate to each other (e.g., directly in some cases), like via Bluetooth, NFC, and other near-field wireless communication protocols, such as to facilitate the conveyance of an offline value or other data pertaining to offline access.

In the context of prior processes discussed herein, the relying device 140 may be permitted to access resources of a relying party, such as various web-based applications or DRM protected applications and the like, and user access of the workstation under an account of the user (such as a federated account) may permit access to a suite of those online applications based on credentials (such as various certificates) associated with the federated account. For example, various single login/sign on techniques may be utilized to confer authentication results on credentials by which the user was permitted access to the workstation to online applications and other resources, or a company network, and the like. In some cases, accessing the relying device 140 may not automatically confer access to one or more web-services (or web-serviced applications and other controlled content via DRM) like those described above. For example, once a user access the relying device 140 the user may be required to authenticate to one or more web-services or relying parties 145 to access web-services like online resources 147, services 175A, such as via an application 110. As noted above, a user may utilize a mobile device 101 in a mobile initiated authentication to confer access to the relying device 140 on one or more of the web-services, which may including the passing of credentials 111 to the relying device 140 for, or by which, an application 110 may access web-services of a relying party 145 or services 175A. In some embodiments, policies (or frameworks) may prohibit the relying device 140 from retaining at least some credentials, such as the case with various virtual desktop applications or other polies that govern the retaining of credentials in a persistent cache or disabling of options to retain such credentials (e.g., a user may be required to provide credentials to a single login/sign on service after accessing a relying device or otherwise to access one or more applications 110, online resources 147, or other services 175A). Accordingly, in some embodiments, a relying device 140 may be a device of a relying party 145, such as within a corporate environment, though not need be limited to such configurations. For example, a relying device 140 may a user client device with a persistent or wake-able wireless connection to a network 121, such as within a home, and which may periodically report to the authentication server 155 in response to obtaining network connectivity or in response to a change in network conditions such that the authentication server may issue a session to the relying device 140 (e.g., which may include waking the relying device via a network interface of the relying device).

In some embodiments, a relying device 140 may be a controller or communicatively coupled to a controller which governs physical user access to areas or functions (e.g., valves or machinery or panels) via electrical signals. Such relying devices may thus control physical access or a function by activation of a given mechanism, like an electro-mechanical device, which may include an electromagnet, an electrical motor, a solenoid or other circuit to cause a change in an electromagnetic field to actuate a lock, like driving a pin into or out of a hole, changing a state of an electromagnet adjacent a ferromagnetic plate attached to a door, or the like (e.g., to access or secure access to an area or receptacle or otherwise interact with a secure asset—like a switch to turn on some device). The electro-mechanical device may include one or more hardware elements like a processor, memory, receiver, transmitter, and the like to receive results for authentication. Some electro-mechanical devices may process the results directly by verification of signature, or transmit the result and receive a response, such as from a server. In either instance, the electro-mechanical device may actuate a mechanism based on a received result. In other words, a relying device 140 may be a device within a relatively diverse set of devices, but may generally be a device which users physically access (e.g., in person) or controls physical access of the user (e.g., to a room, area, etc.).

The relying device 140 may have a connection to a network by which data may be transmitted to and received from various online entities, such as authentication server 155 and other services 175, in addition to relying parties 145 to access online resources 147. In some cases, an authentication server 155 may provide one or more additional services 175 (e.g., like a set of services 175B and other services 175A may be provided by other entities) discussed herein, though there exists no requirement thereof. Additionally, in some cases, the relying device 140 may control or facilitate control of other devices on a network, which may include the internet or be a local network or physical access infrastructure. For example, in some cases, the relying device 140 may be communicatively coupled to various controllers, or include such functionality, configured to generate electrical signals by which solenoids or other actuators (e.g., controlled device 141) are controlled, such as to unlock or lock a door or valve or other mechanical elements.

Thus, in some example embodiments, a relying device 140, may be a client-like device, or other device which a user physically accesses (e.g., like a terminal by which a server is accessed) or controls physical user access via a controlled device 141. In some embodiments, a user that performs a mobile initiated authentication to access a relying device 140 (which may include a controller configured to actuate another device like a controlled device 141 or cause a device to perform a function) may be afforded the same privileges as if that user physically provided credentials to the relying device or possessed a key-fob, or code, or key by which the user could access controller (e.g., of another device or a door or valve and the like). The relying device 140 may rely on one or more services 175, like authentication services, and user access to the relying device and other resources (e.g., via the relying device or controlled by the relying device) may be permitted in accordance with protocols of one or more of those services.

In some embodiments, the relying device 140 may communicate with one or more of the services 175 in response to information received via a session, such as a session initiated by a computing device performing example operations described with reference to the authentication server 155. For example, the relying device 140 may receive one or more authenticators from the authentication sever 155, which in some cases may be provided to the authentication server by a mobile device 101 in a mobile initiated authentication process. For example, a mobile device 101 may store the authenticators by which user access is granted to the relying device 140, thereby limiting consolidation of authenticators stored by an authentication server 155. Additionally, a mobile device 101 may store the authenticators by which the relying device 140 is granted access (or authenticated) to one or more web-services likes online resources 147 provided by a relying party 145, or services 175A which may include DRM permissions for applications 110 or content local to the relying device 140 or identity management services (e.g., those not managed by the authentication server 155), thereby limiting consolidation of authenticators stored by an authentication server 155. Further—at least in some cases—such techniques may limit consolidation of authenticators stored on a relying device 140 (e.g., to increase security) and permit storage of authenticators on a mobile device 101 for reducing user friction when authenticators are not retained on a relying device (e.g., to increase security).

In other words, like the authenticators by which a user accesses a relying device 140, authenticators for web-services may be stored on the mobile device for mobile initiated authentication operations to enable the user to authenticate the relying device 140 to access web-services via the mobile device 101 without waiting for a prompt. For example, credentials 111 for an application 110 or by which the application or relying device 140 may otherwise access online resources 147 or services 175A may be pushed to the relying device, such as over a session with authentication server 155 (which may receive and verify authenticators received from a mobile device 101). As the mobile device 101 may be registered to a relying device 140 (or otherwise known to the authentication server 155 by registration of an authentication application 120), and the authentication server 155 issues sessions to a relying device 140 to which the mobile device is registered (and receives indication of active user sessions with relying devices), the authentication server 155 can identify which relying device to push authenticators for web-services to which a user authenticates via the mobile device (e.g., by virtue of a request to mobile initiate an authentication to the relying device or by the user otherwise accessing the relying device which reports a user session for the user).

In some embodiments, such as where the user is authenticated to access the relying device 140 via mobile initiated authentication, relying device 140 may be authenticated to access one or more web-services to which the user also authenticates to access via the mobile device 101 with the authentication application 120, and the authenticators may be pushed to the relying device by the authentication server prior to the user physically accessing the relying device. The user, alternatively, may initiate an authentication to a web-service with the mobile device 101 after having accessed the relying device 140. In either case, in some embodiments, the authentication server 155 may push instructions, like a script, in association with one or more authenticators, which may cause the relying device 140 to launch an application 110 based on, or which may utilize, an authenticator to access (or authenticate to) a relying party 145 or service 175A. For example, the instructions may cause the relying device 140 to launch an application 110, like a web browser, navigate to a web portal via the web browser, and submit one or more authenticators as credentials 111 to access the web portal, which may be displayed within a browser window or tab. In another example, the instructions may cause the relying device 140 to launch an application requiring a user login and provide the authenticators as credentials 111 for performing the user login to the application (e.g., which may be transmitted to a relying party 145 providing online resources to the application 147 or service 175A utilized by the application). In another example, the instructions may cause the relying device 140 to authenticate on a service 175A with the authenticators, like a federated identity or single login/sign on provider which may confer access to online resources 147 of one or more relying parties 145, other services 175A, and the like.

In various embodiments, an authentication server 155 may verify access requests received from a mobile device 101, such as by verifying whether the access request complies with a policy, and which may include verification of representations of credentials stored by the user device, or other data, like certificates, such as by signature verification, where data is signed by a private key, or signature key, maintained within a TEE 103 of the mobile device 101 of the user. The authenticators, like representations, certificates, public key or signature verification key by which data signed with a corresponding private key stored within a TEE 103 may be verified, and the like, may be established during a registration process and may comply with techniques implemented by the authentication server to protect such authenticators in addition to compliance with one or more other services corresponding to the relying device.

In some embodiments, an authentication server 155 may be configured to perform operations like those discussed with reference to FIGS. 7-11, among others (e.g., one or more operations disclosed in FIG. 3 or 5-6). Additionally, the authentication server 155 or other server may provide one or more services 175 which may be utilized in connection with the disclosed techniques. In some cases, services 175B include those services provided by the authentication server 155, but may also include third party services 175A, such as to facilitate integration of mobile initiated sign on processes across different platforms. Embodiments of relying party servers 147 and services 175A may incorporate the functionality of the authentication server 155 or vice versa, which is to say functions disclosed herein may be consolidated or distributed among one or more computing devices in a variety of ways. Example services 175 may include services like those discussed below, which may be implemented by the authentication server 155 or other server in a first party or third-party capacity.

Some embodiments may include a ticketing service by which devices communicating over a network exchange identify proofs (e.g., credentials) in a secure manner. An example of a ticketing service may include a Kerberos based service. Example embodiments may include a mobile device 101 executing an authentication application 120 configured to cause the mobile device to establish and supply credentials to a server or service, which may be representations of credentials as discussed herein, and may include a certificate or representation of a certificate for issuance of a session to a relying device 140. Authentication of those credentials by a server or service may be subject to a policy including one or more rules. The authentication application 120 may be configured to generate, based on the policy, an access request which the mobile device 101 transmits to a server or service in a mobile initiated authentication process for authentication. The server or service may verify credential information provided by the mobile device 101 and verify compliance with a policy, and issue a session to a relying device 140 if the user is deemed authenticated based on the verification. In example embodiments of a ticketing service, a ticket, like a token, may be obtained by a relying device 140, like a workstation, responsive to a determination to issue a session by a server or service. In some embodiments, a session may be issued to the relying device 140 by an authentication server 155 for an authenticated user, like the user of a mobile device 101 having successfully authenticated with the server. The ticket may be obtained by the relying device 140 in accordance with an authentication or login process with the ticketing service, such as a Kerberos based service. In some embodiments, such as within a client-server environment, where the relying device 140 is a client type device (or includes at least some client computing device capabilities), an authentication server 155 may issue a session that causes the relying device 140 to fetch the ticket, either from a ticking service 175B of the authentication server 155 or other ticketing service 175A.

In some example embodiments, such as within a windows-based computing environment of a relying device 140, an authentication server 155 may issue a session that causes the relying device 140 to fetch a ticket, either from a ticking service 175B of the authentication server 155 or other ticketing service 175A. The relying device 140, such as via an active-directory, provides login services to permit user access to an account based on the ticket. Active directory-aware applications (e.g., applications 110) may fetch service tickets, so the user to which the session was issued is not prompted to authenticate or re-authenticate (e.g., provide credentials 111) for one or more applications. In some embodiments, those applications 110 to which the user is credentialed via service tickets may access online resources 147 provided by various relying parties 145 which may be the same or different from the party managing the relying device 140 (e.g., the applications 110 may be automatically credentialed to access internal resources among others, like $3^{rd}$ party resources). In other words, the ticket obtained by the relying device 140 in response to issuance of the session may persist user access to the relying device and various software applications 110 requiring authentication of the user without prompting the user to re-enter credentials on the relying device.

In some embodiments, such as within a Unix or Linux-based computing environment of a relying device 140, an authentication module, like a pluggable authentication module (PAM module) may provide login services responsive to a session issued by the authentication server 155. Thus, for example, the relying device 140, such as via a PAM module, provides login services to permit user access to an account based on the ticket. The PAM modules or other PAM modules may permit user access to other applications 110 based on the ticket so the user is not prompted to authenticate or re-authenticate (e.g., provide credentials 111) for one or more applications.

In some example embodiments, a ticket or token, like those described above, may be issued for granting user access to a relying device 140, such as after a mobile initiated authentication requesting user access to a given relying device 140. A ticket or token may also be issued for granting user access to a relying device 140 when the user otherwise accesses a given relying device 140, such as by inputting credentials directly to request access. Additional tickets or tokens may be issued to the relying device 140 for granting the relying device 140 access to web-services, and those tickets or tokens may be issued in association with a mobile initiated authentication to a web-service. In various embodiments of mobile initiated authentications to web-services, one or more of the those additional tickets or tokens may be issued to a given relying device 140 (e.g., the relying device to which the requested access to in a mobile initiated authentication) before the user physically accesses the device in a user session, or they may be issued after the user physically accesses the given relying device (e.g., a user session is active) either after a mobile initiated authentication or the user otherwise beginning a user session with a given relying device 140. As described herein, the authentication server 155 may issue user sessions to relying devices participant in the authentication system, and the mobile devices 101 of respective users are registered with the authentication system (and may additionally be registered with one or more participant relying devices). The authentication server 155 may thus identify a given participant relying device 140 to which requests from a mobile device 101 of a user for mobile initiated authentications to web-services pertain, either by identifying an active user session of the user with the relying device, or session issued to the relying device as a result of processing a mobile initiated authentication request from the mobile device 101 of the user to access the relying device. In turn, results of authentications to one or more web-services initiated via the mobile device 101 associated with the user (and which may be registered with the relying device) may be passed by the authentication server 155 to the relying device 140 for which the user has an active user session with or has requested (and was granted) access to which the authentication server issued a session. In some embodiments, the results may include one or more of those additional tickets or tokens may be issued to the relying device 140 in response to a user initiating via their mobile device 101 a mobile initiated authentication to one or more web-services. Those additional tickets or tokens, like those described above, or other authenticators that may be passed by the authentication server 155 over a session to the relying device 140, along with any instructions, like a script, which the relying device may process to automatically present the ticket or token to the corresponding web-service like a relying party or other service (or otherwise utilize the credential) to obtain access (or authenticate) to the web-service.

A token, or ticket, like that described above may be a Ticket Granting Ticket or Ticket to Get Tickets (TGT), which may be an encrypted identification file with a limited validity period (e.g., like a certificate having a limited validity period). After authentication, the encrypted identification file, or TGT, may be granted to a user for data traffic protection by a key distribution center (KDC) subsystem of an authentication service (e.g., 175A or 175B), such as according to a Kerberos protocol. The TGT file, such as for user account access (e.g., the user to which a session was granted), may contain a session key, expiration date, and an IP address (e.g., of the relying device) which protects from man-in-the-middle attacks. Once obtained by the relying device 140, the TGT may be used to obtain one or more service tickets from Ticket Granting Service (TGS), which grant user-level access to network devices or web-services. As described above, the authentication server may issue a session to a relying device 140 based on authenticators provided to the authentication server by a mobile device in accordance with a mobile initiated authentication process. Verification of authenticators, like representations of credentials and any user certification or other data may be performed by the authentication server 155 or services 175B thereof, which then issues a session (which may include issuance of a token or ticket) to the relying device 140. In some embodiments, issuance of a token or ticket to the relying device 140 cause the device to permit user access to the device 140 or, optionally, a controlled device 141. In some embodiments, a token or ticket provided to the relying device 140, which may be provided with instructions for utilizing the token (or the relying device 140 may determine which instructions stored on the relying device to utilize based on the token), may be utilized by the relying device to access or authenticate on a web-service. The relying device 140 may utilize an issued token or ticket to perform one or more corresponding logins with the service 175B or other services 175A, such as by the obtaining of a service tickets, which may provide user-level access to other resources on a network, such as via one or more applications 110. In some embodiments, a service ticket may permit user access to a controlled device 141. Accordingly, the user which the authentication service verified based on authenticators received from the mobile device 101 may be logged into the relying device 140 with a ticketing service and service tickets on the service may be obtained to permit user-level access (e.g., user account privileges) to other resources. In some cases, one or more service tickets on the ticketing service (or services tickets on multiple different ticketing services) may be issued based on mobile initiated authentications to web-services that may be performed in addition to, or in connection with, a mobile initiated authentication or after the user has physically accessed the relying device 140 in an active user-session. In some embodiments, a session may include issuance of a session key, such as a single-use symmetric key for protecting messages via encryption during a given communication session, and which may mitigate man in the middle attacks which may attempt to insert themselves between the authentication server 155 or service and relying device 140. In some embodiments, the authentication server 155 may utilize a single session to exchange data with the relying device 140, or the authentication server 155 may utilize multiple different sessions protected by different session keys for respective web-services or login services.

Other example services 175 may include, but are not limited to Integrated Windows Authentication protocols, which may include SPNEGO and NTLMSSP authentication protocols, in addition to Kerberos based or other ticketing based protocols. Similar techniques to those that utilize windows based Active Directory integration extend to Unix and GNU/Linux systems and the like. Moreover, functions or other devices, like controlled devices 141, which a relying device 140 may be configured to control may be automated based on rules or scripts to provide predefined functionality responsive to commands received from an authentication server or request-response results based on identifiers (e.g., for controlled devices 141) conveyed over corresponding sessions. Additional example services 175 may include services responsive to Security Assertion Markup Language (SAML) or other exchange techniques, and devices may be configured in accordance with such protocols as relying devices. For example, SAML is an XML-based language for exchanging user security information between an SAML identity provider (e.g., an authentication server 155 or service 175) and a SAML serviced device (e.g., relying devices 145 or other relying parties 145) or services 175. For example, mobile initiated authentication services provided by an authentication server 155 or service (e.g., 175B) may be configured to provide user access to a relying device 140 protected by a SAML and facilitate credential exchange (or authentication) of the relying device 140 to access other relying party resources 147 with applications 110 or utilize other services (e.g., 175A).

The authentication server 155 may store data for authentication operations in an authorization repository 165. The authorization repository 165 may include a vast number of UID Records 151. A UID Record 151 may include information associated with a particular user and the devices associated with that user. In some embodiments, a UID Record 151 for a particular user may be created for a particular relying device or relying party or used across multiple relying devices or relying parties. For example, a given user may have a different UID Record 151 associated with the different relying devices or relying parties utilizing the authentication system and which the user engages. One relying party may be an employer of the user and others may be one or more providers of software or services to the employer, and others may be providers or software or services to a user, for example, another relying party may be a financial institution used by the user, and yet another relying party may be an application developer from which the user has purchased an application for personal use.

A relying party, such as an employer, may include within the workplace, issue to employees, or otherwise utilize various relying devices. A user may also engage a consumer-based service to operate a personal relying device, like a personal computer, or other networked device. Thus, for example, a relying device may be associated with a relying party governing user access of different user accounts to the device (e.g., like an employer) or alternatively with a user account in a consumer-based service (e.g., like a home or small business account) and the relying device may utilize web-services provided by other relying parties (e.g., such as authentication services to access an application or other DRM controlled content, access online resources hosted by a relying party, like web applications or other services 175A, and the like).

A UID record 151 associated with a relying device for a user may indicate (e.g., in addition to an employer or consumer-account governing user authentication for access to the relying device) one or more web-services to which the user is permitted to initiate authentication to, via their mobile device, to confer access to the relying device.

The different UID Records for a same user may have some same information, such as whether a given mobile device 101 is permitted to authenticate the user to access a given relying device or with a given relying party (e.g., across one or more relying devices), and device information for a mobile device 101 of a user may remain the same across the different UID Records. Different UID Records, such as for different relying devices (or parties managing the different relying devices), may indicate whether a given relying device to which the user registers a mobile device is permitted to access a given relying party (e.g., like a set of permitted web-services the user may authenticate to via their mobile device to access from the given relying device) but not another. Different UID Records for different relying parties may be segmented within the repository 165 for a variety of different reasons, such as compliance with relying party requirements, government regulations, or user privacy in general.

Information associated with a particular user in a UID Record 151 may include one or more user identifiers that user uses with a relying party, such as a username, email address, employee ID, etc. The user identifiers may also be representations of user identifiers, such as cryptographic hashes of user identifiers, and the cryptographic hashing function may be specific to a given relying party. UID Records 151 may be created by the authorization server 155 when a given user elects to use an authentication application for user authentication to access assets of the relying party. Alternatively, UID Records 151 may be created by the authentication server 155 upon request by a relying party. The request may include user provided account information for generation of a UID Record. In some embodiments, the authentication server 155 may handle user registration for the relying party and receive and process some or all of the user provided information directly to generate a UID Record 151 for the user. A relying party administrator may also provide or otherwise create specified account information for generation of a UID Record, such as when an administrator of the relying party creates an employee account.

A UID Record 151 may include a plurality of constituent device records for devices associated with that user that may be used for authentication or accessing a secure asset or resource. For example, a user having UID record 151 may use a device A for user authentication and a device B for accessing secure assets of a relying party. In some embodiments, device A information may be associated with the UID record 151 when the user registers their mobile device 101 with the authentication server 155. In some embodiments, device B information may be associated with the UID record 151 when the user registers their mobile device 101 with a relying device 140 to permit mobile initiated authentication. In some embodiments, device B information may be associated with the UID record 151 based on information received from device B, such as in response to an active session corresponding to the user being reported by device B, and the user may be permitted to request mobile initiated authentication to one or more webservices via their mobile device and access to those webservices may be granted to device B. In some cases, all or some of the device B information may be associated with the UID record 151 by an administrator, like a party (which may be a relying party) that determines user (e.g., the user to which the UID record 151 corresponds) privileges. For example, the UID record 151 may indicate to which relying devices the user is permitted to access, whether the user (or users) are permitted to access a given relying device (or a given relying party) by mobile initiated authentication, register with the relying device, and the like. In some cases, a user may be permitted to access a plurality a relying devices and which devices the user is permitted to access may be reflected by identifiers for those devices or a collection of devices within the UID record 151.

In some cases, a relying device (or devices) may be devices with which the user is permitted to register for mobile initiated authentications or which the user may be pre-authorized to access via mobile initiated authentications (e.g., embodiments contemplate a process by which a user may be registered to one or more devices, like a set of devices, during registration or by administrator authorization instead of individually in a piecemeal fashion). In some embodiments, a user device, like a mobile device 101, associated with a UID Record 151 may request (e.g., based on a policy associated with a given relying device) to enable mobile initiated authentications via the mobile device to one or more web-services (e.g., relying parties) the given relying device is permitted to access. In some embodiments, when a user device is registered with a given relying device one or more web-services of relying parties for which mobile initiated authentications have been established may be enabled (e.g., selectively based on policy) for the given relying device.

By way of example, Device A record may correspond to a mobile device 101 registered with the authorization server 155 for user authentication to access relying devices or online resources. During a registration process, such as one performed through an authentication application 120, initial information about the mobile device 101 may be collected and stored within the device A record. The initial information may include information operable to identify the device, such as in response to an access request. In some cases, that identifier may be used by the authentication server 155 to identify access requests received from the mobile device. Some of the information about the mobile device 101 may also be updated over time based on information about the device provided to the authentication server 155 by the authentication application 120 on the mobile device. The Device A record for the mobile device 101 may also contain out-of-band credentials A for authentication of a user of the mobile device, such as based on an access request. For example, the OoB Credentials A may include representations of various different credentials provided in a registration process of Device A and a public key for verifying signed data received from Device A.

Device B record may correspond to a relying device 140 to which the user registers via their mobile device 101 for mobile initiated authentications, or which the user is otherwise permitted to access. Relying devices need not be registered, and records for relying devices may be created over time as a user uses different relying devices to access secure assets. In some cases, records of such devices may correspond to a device (or devices) reporting an active user session, such as that corresponding to a given user having a device A. However, in some cases, the relying device 140 may optionally be registered with the authorization server 155 for use by a particular user or to access secure assets of the relying party. Depending on the relying party, there may be multiple device records corresponding to different relying devices used by the user over time. A Device B record for a relying device may be created when a relying device is configured by a system administrator (e.g., of the relying party). In some cases, the Device B may be assigned to a specific user, such as by a UID Record 151. Alternatively, one or more users may be permitted to register with a Device B (e.g., in which case the Device B may be associated with their respective UID Records 151) and different Device B records may be established in association with the UID records of the users. The repository 165 may also store information such as which users are permitted to register with or otherwise access which relying devices and the like. A UID record 151 may include additional or different Device B records (e.g., multiple) over time as a user is permitted to access different relying devices or different sets thereof.

In some cases, a relying device 140 may optionally be registered with the authentication server 155 for use by a particular user or to access secure assets of the relying party. A Device B record for a relying device 140, like a client-type device, may contain an identifier or other identifying information for the device and optionally credentials B, where those credentials may be in-band credentials (e.g., account/password/token/keys, etc.), representations thereof, or various authenticators for applicable embodiments. In some cases, the ID B may be an address of the Device B, like a network address, by which information may be transmitted to the Device B, such as to initiate a session for a user during a mobile initiated authentication. In some cases the credentials B may include data by which authenticators corresponding to the Device B may be verified. For example, a certificate may be valid when signed, and credentials B may include a public key and the certificate by which the signature may be verified (and an access request may include a timestamp or other value associated with the signature, which may be incorporated within the signed data such that the mobile device proves possession of the private key corresponding to the public key by signature over specific data in a zero-knowledge proof). Some of those credentials (or representations or authenticators) may alternatively be stored under the UID Record 151 for relying device 140 in general rather than for a specific relying device. However, some credentials (or representations or authenticators) may be preferable to store in a device specific fashion, such for each relying device which the user registers with for mobile initiated authentication or is otherwise permitted to access, to increase the difficulty of an attack to obtain access to a relying device. Additionally, specific relying device records may provide management oversight where different devices are utilized to access different assets (e.g., with a given license (e.g., a product key) for some secure asset) or are configured to manage different controlled devices 141.

In some embodiments, permissions, or policy, may be specified for a UID Record 151 or for a given device. Permissions for a UID Record 151 may, generally, may define which assets the user (associated with the UID Record) may access and how the user may access those assets. Permission for a client device (e.g., one registered by an administrator associated with a relying party), generally, may define which users may access the device and optionally what assets that device is permitted to access, which may differ from assets the user (associated with the UID Record 151 of the user utilizing the device) is permitted to access. Similarly, policy information may be stored. For example, policy information may be specified for mobile initiated authentication of users to Device B. The policy information may include the one or more rules by which an access request must comply to verify the request and permit access to Device B, such as by issuing a session to the Device B for the user of the UID Record 151 which requested the access. Policy information may also be specified for mobile initiated authentication of users to web-services of various relying parties for which access thereto is conferred to Device B. The policy information may include the one or more rules by which an access request must comply to verify the request and permit access to the web-service by Device B, such as by passing authenticators over a session issued to the Device B for the user of the UID Record 151 which requested the access.

For example, in a business environment context, a relying device 140 may be assigned to a particular employee by an administrator of the relying party and Device B record may be stored under the UID Record of the employee. In other instances, a relying device 140 may be used by multiple employees and a record thereof may be associated with different ones of the UID Records, such as when a user corresponding to a one of the UID Records registers to access a given one of the relying devices. Alternatively, in some embodiments, an administrator may register one or more relying devices to one or more UID Records with specific permissions to restrict use of those relying devices to that specified subset of users or such that only registered devices may access secure assets.

In another example context, a party managing a number of relying devices may specify permissions governing amounts or types of devices allowed under a UID Record 151. As described above, the UID Record 151 may contain a user identifier tied to a particular user/account. When a given mobile device 101 attempts to register a relying device 140 in association with that user identifier, the authentication server 155 may create a device record (e.g., Device B) corresponding to the given relying device under the UID Record 151 for that user identifier. Thus, which relying devices 140 are associated with which users may be tracked via UID records. Permissions may specify a number of relying devices which may be active under a given UID Record 151, such as to limit the number of relying devices to which a user may register or to restrict use of a secure asset to a given number of devices overall, or to restrict use of a secure asset to a given number of devices at a particular time. For example, if the protected asset is a web application, permissions may be a license agreement that prohibits the use of multiple relying devices (or over a threshold number of relying devices) at the same time under a same UID Record 151. Similarly, if the protected asset is an application installed to a relying device, permissions may be a license agreement restricting use and installation of the application to a single client. Tracking relying devices in this manner may also be used for security purposes, such as to detect when a user attempts to register with over a threshold number of relying devices, whether or not those access attempts are successful, and whether the user is permitted to register with those relying devices or to detect user sessions on an unknown or new relying device or if multiple unknown or new relying devices attempt to access an asset, and whether or not those access attempts are successful. For example, which devices are accessed or access which resources based on which credentials provided by the mobile device 101 may be tracked and additional or multiple credentials may be requested for new or additional relying devices attempting to access a same asset. Additionally, thresholds may be established for the number of relying device 140 which a user may register to within a given amount of time or additional, different, or multiple credentials may be requested during a registration process for additional relying devices.

The auth repository 165 may be configured to respond to queries to return, store, or otherwise provide data corresponding to UID Records 151, such as to the authentication server 155 in association with a registration or authentication process. Some or all of the information stored within the auth repository 165 or representations thereof may be stored within the UID repository 160, such as where a relying party 145 manages a number of relying devices 140, and may implement authentication server functions or services as an internal rather than external service. A relying party 145 may also specify information for records within a UID Repository 160 and those records or data corresponding to those records may be passed to an authentication sever 155 for managing authentication operations associated with those relying devices.

Benefits of such configurations including an authentication server 155 (e.g., as a third-party service) may reduce overhead for relying parties 145 managing relying devices 140 and relying parties 145 providing online resources 147 or services 175A as they can significantly offload authentication burden and reduce storage of user specific data in addition to increasing security. For example, in the previously described example utilizing tokens, the process may continue in much of the same fashion, but rather than the relying party server 145 determining whether the token-identifier combination corresponds to an authenticated client, the relying party server 145 need only query the auth repository 165 or the authentication server 155 with the token, identifier, or information on used for the identifier. In an example embodiment, the relying party server 145 may query the auth repository 165 with a token and an identifier determined for the relying device that presented the token and the auth repository may provide an authentication result. In some example embodiments, the queries may flow through the authentication server 155 such that, for example, the authentication server 155 may process the information to determine the identifier (e.g., such that only the authentication server 155 houses the logic for the determination) and return a result. However, such configurations are not limiting, as a relying party 145 may implement an authentication server 155 for management of relying devices and online resources of the relying party (among access of other relying party resources by managed relying devices), such as within a corporate environment.

Figure 2:
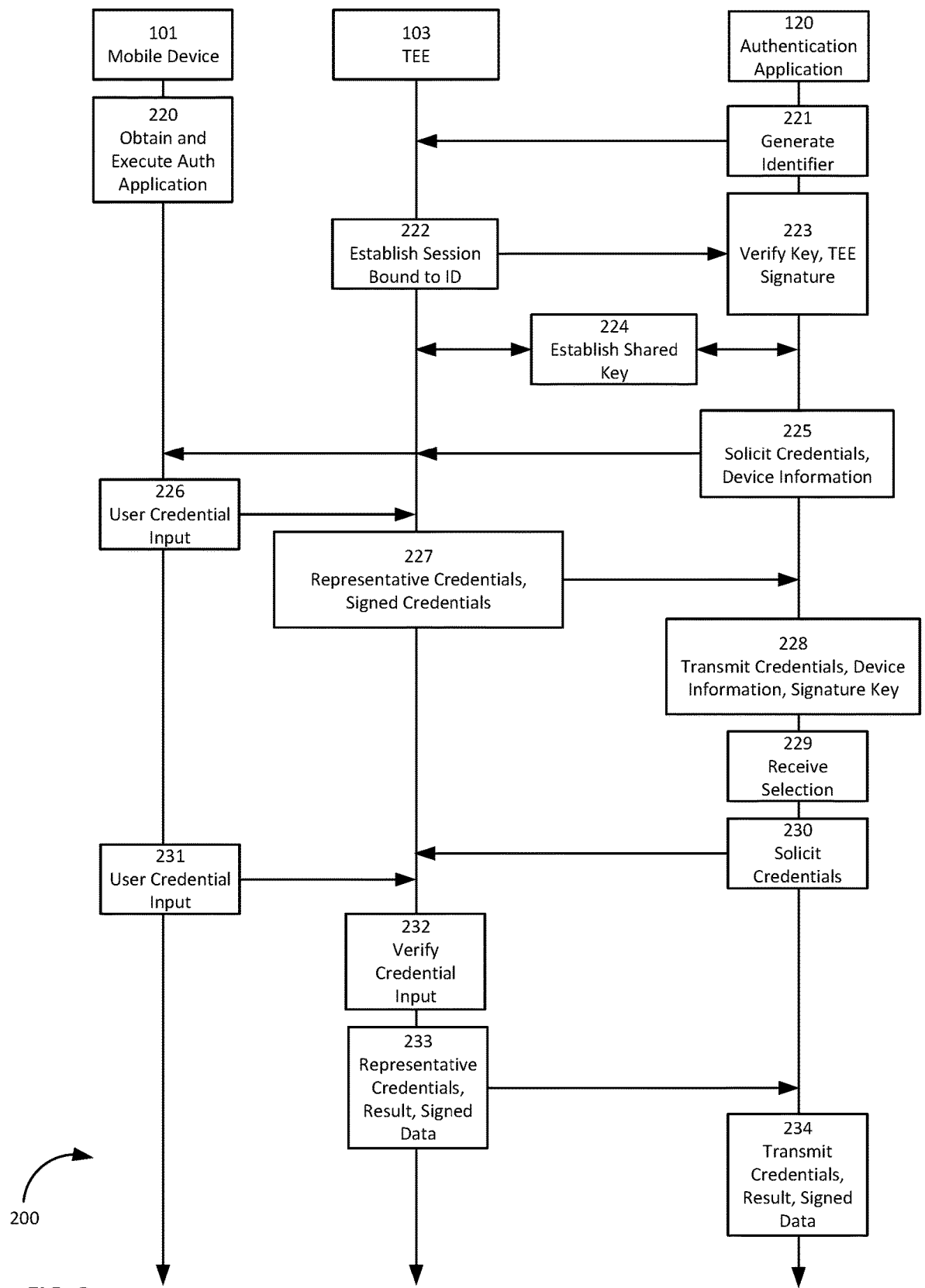
FIG. 2 and FIG. 3 are diagrams showing examples of processes for authenticating a user on a mobile device within example computing environments described in the present application.

Example Process for Credential Establishment and Collection for Authentication of a User FIG. 2 is a diagram showing an example of a process 200 for authentication of a user. The process 200 may be executed within an example computing environment, such as the example computing environment 100 illustrated in FIG. 1.

The process 200 of FIG. 2 illustrates operations performed by a device, such as a mobile device 101 including a trusted execution environment 103 and an authentication application (e.g., authentication application 120), according to at least some embodiments described herein. As described previously, example mobile devices 101 may include a trusted execution environment 103 and execute an authentication application 120. As such, the separation of the blocks 101, 103, 120 may be considered illustrative as each of the operations may be performed on a mobile device 101.

The process 200 may begin with the obtaining 220 of an authentication application on the mobile device 101. Examples of obtaining the authentication application on the mobile device may include a preloading of the authentication application on the mobile device 101 or downloading of the authentication application to the mobile device from an application repository. Further, step 220 may include executing the authentication application on the mobile device 101, which may include loading the authentication application in a memory of the mobile device and executing the authentication application by a processor of the mobile device. The memory and processor of the mobile device 101 may be configured for the execution of applications within a client execution environment (CEE), which may be isolated from a trusted execution environment 103 (TEE) of the mobile device. The TEE 103 may include a secure memory and co-processor not accessible by applications within the CEE.

Example authentication application 120 may be configured to interface with the TEE 103 of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application 120 within the CEE, the authentication application 120 is configured to establish a secure session, e.g., a secure channel of communications, with the TEE 103. The secure session may be considered secure by way of encryption of data communicated between the authentication application 120 and the TEE 103.

Once executed, such as within the CEE, the authentication application 120 may perform one or more operations in association with a registration process, which may correspond to steps 221-228. Starting with operation 221, the authentication application 120 may generate an identifier and pass the identifier to the TEE 103. For example, the authentication application 120 may pass the identifier to the TEE 103 in association with one or more requests for establishing a secure session.

The TEE 103 may also perform operations to establish a secure session. The TEE 103 may also bind a secure session to an identifier received from the authentication application. For example, the TEE 103 may generate one or more keys, and one or more of those keys may be bound to a received identifier. The TEE 103 may generate a public key and a private key of a key pair, which may be bound to the received identifier. Additionally, the TEE 103 may generate a shared key, which may be bound to the received identifier. The binding may be logical, such as by an association in memory, or one or more of those keys may be generated based on the identifier. For example, in response to a request for a secure session, the TEE 103 may generate a private and public key, and pass the public key to the authentication application 120 by which the application 120 may encrypt a generated identifier 221 to pass to the TEE 103. In turn, a shared key may be bound to or based on the generated identifier. Alternatively, the TEE 103 may sign the identifier or other data with a private signature key and pass the signed identifier or other data with the public signature key to the TEE 103 for verification. In either instance, a public key may be provided in a response to the authentication application 120, by which the authentication application may verify 223 that data was generated by the TEE.

Thus, the TEE 103 may establish 222 a session bound to the identifier generated by the authentication application 120 and output data for establishing the session to the authentication application. In addition, the TEE 103 may sign data corresponding to output data in the response, and provide a key (e.g., a public key) of the TEE 103, in association with the response. The signed data and the signature may be provided in a same response as a key or by one or more different responses.

The authentication application 120 receives responses from the TEE 103. The responses may include data, signed data, or a key for verifying signed data. The key may be a public key for verifying 223 a signature of the TEE 103 based on a corresponding private key, such that the data may be verified as being generated by the TEE 103 based on the signed data and signature key. For example, a verification function may take as input the data, signed data, and signature key, and return a result indicating that the data corresponds to the signed data. In some embodiments, the data may be organized in a string for signing and verification. Example string values may correspond to data values or hashes of data values.

Once the authentication application 120 verifies that the TEE 103 generated data, the authentication application 120 and TEE 103 may establish a shared key 224. For example, the authentication application 120 may encrypt data (e.g., identifier or other data) corresponding to a shared key using a public key provided by the TEE 103. In turn, using a private key, the TEE 103 may decrypt the data to obtain the shared key. Alternatively, the process may occur in the other direction with the authentication application 120 providing a public key to the TEE 103, by which the TEE 103 can encrypt and return a shared key. The shared key may be used by the TEE 103 and the authentication application 120 to exchange data using symmetric encryption. In either instance, the shared key may be bound to an identifier generated by the authentication application 120—which in some examples may correspond to a given registration session (or as described later, an authentication session).

In some embodiments, establishment 222 of the secure session further comprises an initialization of a count within the TEE 103. The TEE 103 may also provide a current count in responses to the TEE 103. The TEE 103 may respond to only those requests received from the authentication application 120 which increment the count. As such, the authentication application 120 may be configured to, in generating a request to the TEE 103, increment a current count last received from the TEE 103 in an immediately prior response to the generated request. Thus, in receiving a request from the authentication application 120, the TEE 103 may verify whether the incremented count was incremented in an appropriate manner (various examples of which are described herein, such as with reference to FIG. 1). The TEE 103 may also verify whether the number of increments or a value of the count exceeds a threshold representative of a number of requests allowed for a given session. Upon determining the threshold has been reached, the TEE 103 may request the authentication application 120 refresh the session, such as by performing one or more of steps 221-224, which may include authentication of the user according to one or more credentials stored within the trusted execution environment 103.

With the shared key established, the authentication application 120 may request the solicitation of 225 credentials and device information from the TEE 103 or mobile device 101. Device information may include a device identifier solicited from the TEE 103 or mobile device 101 that is operable to receive a notification for authentication of the user of the mobile device. User input credentials 226 via the mobile device 101 may be obtained with the TEE 103. The TEE 103 may generate 227 representations of those credentials for transmission outside of the TEE without divulging actual credential values. The TEE 103 may sign output data corresponding to the representations and output the representations and the signed data. The TEE 103 may also output one or more public keys corresponding to one or more private keys used to generate signed data if different than a prior key provided to the authentication application 120.

In some examples, step 225 may include generation of keys by the TEE 103. For example, the request the request may include identifying information corresponding to a domain, such as a domain corresponding to a website or webservice hosted by a remote server. In some examples, the user may cause the authentication application 120 (or other native application, like a web browser) to request registration of the mobile device 101 with the domain for authentication of access attempts by other devices, which may include mobile initiated authentication of such devices. In response to the election, the authentication application 120 may receive, from the remote server or the authentication server, domain identifying information and policy information for establishing and governing use of the credentials and keys within the TEE 103. The authentication application 120 may request, via the API of the TEE 103, solicitation 225 of credentials and generation of keys in association with the domain within the TEE 103. The TEE 103 may receive the domain information and policy and initialize a domain within the TEE memory space for storage of credentials and keys associated with the indicated domain. User input credentials 326226 via the mobile device 101 may be obtained with the TEE 103 and stored in association with the domain. The TEE 103 may generate 227 representations of those credentials for transmission outside of the TEE without divulging actual credential values. The TEE 103 may generate a key-pair corresponding to the domain and store the keys. The public key and signed output data corresponding to the representations of credentials may be output by the TEE 103 and conveyed to the remote server or the authentication server by the web browser 120.

The authentication application 120 receives data output from the TEE 103, which may include representations of credentials, signed data corresponding to those representations, and signature key (e.g., a public key) for verifying signed data output by the TEE 103. As described above, the authentication application 120 may verify data was generated by the TEE 103 based on the signed data, correspond public key, and data. The authentication application 120 transmits 228 data, including the data output from the TEE 103, and device information of the mobile device 101, to a server to complete a registration. The data transmitted to the server many further include user account information (e.g., for a given relying party) to which the registration pertains. The server stores the information for later use to authenticate a user to access secure assets of the relying party. In some examples, the transmitted 228 data may include the public key of the domain and one or more representations and signed data to complete a registration. Data signed by a private TEE key may also be transmitted, and the corresponding public TEE key may be obtained by the remote server to verify that the data processing was performed within the TEE 103 of the mobile device 101, e.g., in accordance with a policy governing the credentials and use of the keys established for the domain. Data transmitted to the server by the web browser 120 many further include user account information (e.g., for a given relying party) to which the registration pertains. For example, the user may utilize the web browser to login or otherwise provide user account information to the remote server in association with the registration process such that the registration of the mobile device 101 with the domain may be tied to an account of the user with the domain which the user wishes to access with other devices (for which access is permitted subject to user authentication using the mobile device). The remote server stores the information for later use to authenticate a user to access secure assets (e.g., of the relying party or otherwise hosted or associated with the domain to which the mobile device registered).

After registration of the mobile device 101 by the authentication application 120, the authentication application may receive a selection 229 of a relying device, webservice, or combination thereof for a mobile initiated login. Thus, for example, the selection may correspond to an indication of intent of the user to access a relying device or a secure asset from a relying device. As described above, credentials established within the TEE 103 may correspond to an identity or account of the user that corresponds to the selected relying device or asset. The authentication application 120 may request solicitation of one or more user credential inputs, such as one or more of the different credentials established during the registration process. In some example, different credentials may be established with respect to the different selections, e.g., for different domains or relying devices. The authentication 120 interfaces with the TEE 103 to solicit 230 user credential input corresponding to the received selection.

The user may be prompted or otherwise request to input 231 one or more credentials. The input credentials are obtained within the TEE 103, and the TEE 103 may verify 232 credential input based on stored credential information. Representations of the input credentials may be generated, or stored representations of the input credentials the TEE 103 verified 232 according to the input credentials may be output by the TEE 103. In some embodiments, the TEE 103 also provides a result of the verification. In some embodiments, the TEE 103 generates signed data corresponding to one or more of the output data and outputs the signed data. The signed data may also include inputs such as one or more timestamps or other identifying information describing when or what the signed data was generated for. For example, the signed data may take as input a representation of a credential and other information, such as a timestamp or other identification information for the notification. The other inputs may be included in the output data or selected from information also known to a server based on the last notification transmitted to the mobile device (which may select same other data in a verification of signed data). The data and signed data are provided to the authentication application 120, which transmits 234 the data and signed data to a server for authentication. A signature verification key (e.g., a public key) previously provided to the server in a registration process can be used to verify the signed data in accordance with the data (and optionally other data, such as notification information).

In some examples, the TEE 103 may sign data 233, like an authentication result or representations or other data, based on a private key associated with a domain—such as a private key of a key pair generated in association with a registration process for mobile initiated authentication to the domain. For example, in some embodiments, use of keys associated with a domain, like a private key established in association with registration for mobile initiated authentication with the domain, may be subject to user authentication with the mobile device 101 upon credential values stored with the TEE 103. The private key may be used to sign output data, such as to indicate authentication of the user on the mobile device to access the key for the signature operation, or the private key may be used to decrypt received data, such as to indicate authentication of the user on the mobile device to access the key for the decryption operation. Data 233 output by the TEE 103 may include data that is hashed, signed by a private key stored within the TEE for the domain, or encrypted by a public key (e.g., of an entity of the domain possessing access to a corresponding private key), and which may be transmitted to a remote server (e.g., authentication server or server of a relying party) for verification by a respective process or a combination of processes as described herein. A combination of techniques may be used as described herein such that values upon which successful authentications are based may be obtained, or known, only within the TEE 103 of the mobile device 101 or by the authenticating entity.

Example Process for Out-of-Band Authentication

Figure 3:
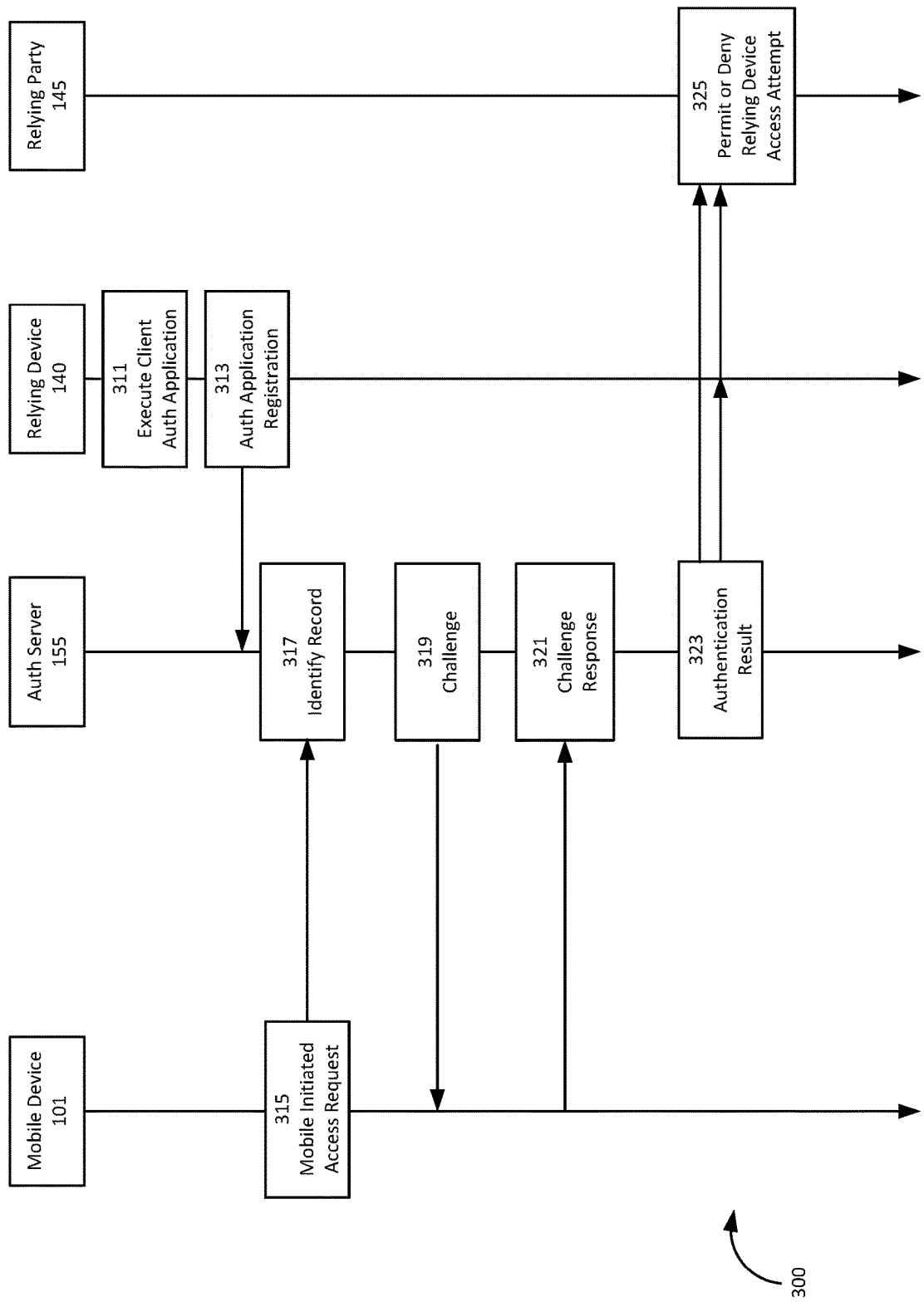

FIG. 3 is a diagram showing an example of a process 300 for initiating authentication on a device different from a device that is permitted to access an asset based on the authentication result. The process 300 may occur within an example computing environment, such as the example computing environment 100 illustrated in FIG. 1. For example, the process 300 of FIG. 3 illustrates example operations performed by various devices, such as a mobile device 101 including a trusted execution environment 103, an authentication server 155, relying device 140, and a relying party server 145 according some embodiments described herein.

As shown, the process 300 may begins with an access attempt request by a mobile device 101. The mobile initiated access request may include a selection via the mobile device of a relying device or webservice for which the mobile device has registered to permit mobile initiated authentications. In some examples, the relying device 140 may execute a client-side component of an authentication application (e.g., like an application 110 in FIG. 1 or another application) that may communicate with the authentication server 155.

In some examples, the authentication application 313 may register with the authentication server. The authentication application 313 may be associated with a user account of a user, such as an account by which the user accesses the relying device 140. Accordingly, when a user accesses their account on the relying device 140, the application may report (or register), like a heartbeat, to report active status (e.g., like an identifier of the relying device and active user account) to the authentication server 155. In some examples, the application may report to the authentication server 155 after a user actively accesses their account, such as via the relying device 140. In some examples, the user may access such an account by a mobile initiated access request 315, and later, perform another mobile initiated access request 315. For example, a user may perform a mobile initiated access request to access their accounts via the relying device 140 and then perform one or more mobile initiated access requests by which the relying device 140 is permitted to access one or more assets, like one or more webservices. Some example embodiments may permit a user, such as via the mobile initiated access request 315, to request access to a relying device and also one or more webservices via a single such request.

The mobile device 101 may pass information about the asset the user is requesting to access, such as given relying device or webservice, or a combination thereof, such as requesting to access a given webservice via a given relying device (which in some examples, may be pre-selected based on an indication of an active status reported to the authentication server 155 and conveyed to the mobile device 101, such as for display within an authentication application executing on the mobile device). The information passed to the authentication server 155 may include information such as user account information or device information associated with the access attempt. For example, the authentication server 155 may receive a user account identifier or identifier of a relying device at block 317.

The authentication server 155, based on the user account identifier, may identify a record, like a user identification record (UID) record 317, such as within a repository storing various UID Records corresponding to different users or accounts. The UID record may be associated with or otherwise include the user account identifier for identification by the authentication server 155 based on information about an access attempt by a relying device. The UID record identified by the authentication server 155 may include records or a listing of one or more devices or webservices with the authentication server 155 to which the user has registered for mobile initiated authentications. Information about a user selection, like an identifier, by the mobile initiated request 315 may indicate which asset (or assets) the user is requesting to authenticate to access, and may also indicate from which relying device 140 the asset will be accessed (e.g., in the case of a webservice). A relying device may also be determined by the authentication server 155, such as based on an indication of an active session for the user being reported by the relying device 140 (e.g., by the client-side component report an active session of the user on the device) or based on an indication of the user having requested to authenticate to a relying device to which the user has registered.

With a relying device or webservice identified based on the records, the authentication server 155 may determine a challenge 319 for transmission to the mobile device 101. For example, the authentication server 155 may determine a challenge based on a policy, such as by which credentials the user is to authenticate on via their mobile device 101, and the information the mobile device 101 should return (e.g., in a challenge response 321) to the authentication server 155. Some examples of a challenge may include data signed by the mobile device 101, such as by processing of the data within a trusted execution environment (TEE) of the mobile device using a key (e.g., like a private key) for which use thereof is subject to authentication of the user by the mobile device. The identified record may include a public key by which verification of the signature may be performed to determine whether the challenge was successfully processed by the mobile device to generate the challenge response. In other examples, a challenge may be data encrypted by a public key stored in association with the identified records and the mobile device 101 must successfully decrypt the data, such as by the private key, and may return the result to the authentication server 155. In some examples, the mobile device 101 may encrypt a result (e.g., challenge response 321) using a public key associated with the authentication server 155 which is then decryptable by the authentication server to verify that the challenge response.

The mobile device 101, as noted above, may have a TEE and have previously registered with the authentication server 155. Credentials and other data may be processed on the mobile device 101 in a fashion similar to that described in connection with FIG. 2, or elsewhere herein, to process or respond to a challenge. In some examples, a challenge may not be issued, but rather, the mobile device 101 may store a policy and assert a knowledge proof based on use of a private key or other credential information indicative of use authentication on the mobile device. Such information may be transmitted to the authentication server 155 in association with the mobile initiated access request 315, and example signatures of data using a private key may include a time stamp (e.g., valid for a threshold period of time) or unique identifier that an attacker cannot replay.

The authentication server 155 may receive an assertion of credentials by the initial request 315 or in response to a challenge 319 (or other request) from the mobile device. Data transmitted by the mobile device 101 may include data corresponding to representations of requested (or asserted) credentials input by the user or results of any verifications performed within the TEE. Data transmitted by the mobile device 101 may also include signed data for verification of the data. For example, the authentication server 155 may use a public key for signature verification, the public key being previously received from the mobile device 101 (e.g., in association with a registration process where, for example, the mobile device generated a key pair and transmitted the public key component to the authentication server). In some examples, the mobile device 101 may sign data with multiple private keys or otherwise use multiple private keys. The mobile device 101 may encrypt data using a public key of the authentication server 155 such that only the authentication server 155 may decrypt the transmitted data. The authentication server 155 may verify whether data originated from the TEE of the mobile device subject to authentication of the user based on verification signed data based on the public key, stored data, or challenge information. For example, the authentication server 155 may determine whether a received representation of the credential matches a previously stored representation of the credential. Further, the authentication server 155 may determine whether the received data corresponds to a challenge 319 requesting that data. For example, the received data or verification process (e.g., using signed data) may include a timestamp or other identifying information for a challenge such that authentication server 155 may determine that the response was generated specifically in response to the challenge that was transmitted to the mobile device for a specific authentication request.

Based on the processing of the data like that described above that the authentication server 155 received from the mobile device 110, the authentication server 155 may determine an authentication result for an authentication request. For example, if the data can verified as originating from the mobile device 101 the data was requested from based on the signed data and a stored public key for the verifying, which may include verification of whether the data is responsive to a particular challenge, and a received representation of a credential matches a stored representation of the credential that was requested, or a response to a challenge matches the expected result, the authentication server 155 determines the user successfully authenticated on the mobile device 101. Alternatively, the authentication server 155 may determine that the user did not successfully authenticate, such as if one of the verification steps fails due to a lack of a match, credential different than that requested, or unable to verify data based on signed data, etc. The authentication server 155 may transmit an authentication result 323 (or data) based on the verifying of information received from the mobile device 101 to a relying device 140 or relying party 145. In some examples, the authentication server 155 may transmit some data to the relying device 140, like an indication of an asset (e.g., user account for the relying device or a webservice) to which a user authenticated and authentication information by which the asset may be accessed from a relying party (e.g., in the case of a webservice). For example, the authentication server 155 may transmit a token value or token information to the relying device 140 (e.g., to the client-side authentication application executing on the relying device) which may be asserted by the relying device to the relying party. In some examples, the token value may be a component of a URL and based on the authentication result. The authentication server 155 may transmit information some data to the relying party, such as information by which the relying device 140 may be identified and data by which a token value may be verified as authentic. Thus, for example, the authentication result may indicate that the user was authenticated and the access attempt by the relying device presenting a valid token should be granted (e.g., for that particular device). In some examples, the authentication result 323 may correspond to a determination to permit user access to a user account accessible from the relying device 140. In such examples, the user may then, or in connection with that request, initiate requests to access one or more webservices (e.g., via the relying device 140).

The relying party 145 may receive an authentication result and information for verifying an access request received from a relying device 140 for an access attempt by the relying device 140. In turn, the relying party permits or denies 325 the access attempt by the relying device based, at least in part, on the result. Accordingly, the access attempt by the relying device may be permitted, at least in part, by authentication of a user on a different device including a trusted execution environment, such as mobile device 101, and the authentication action may be initiated by that device (e.g., pre-emptively rather than reactively).

Example Process for Registering a User for Mobile Initiated Authentication

Figure 4:
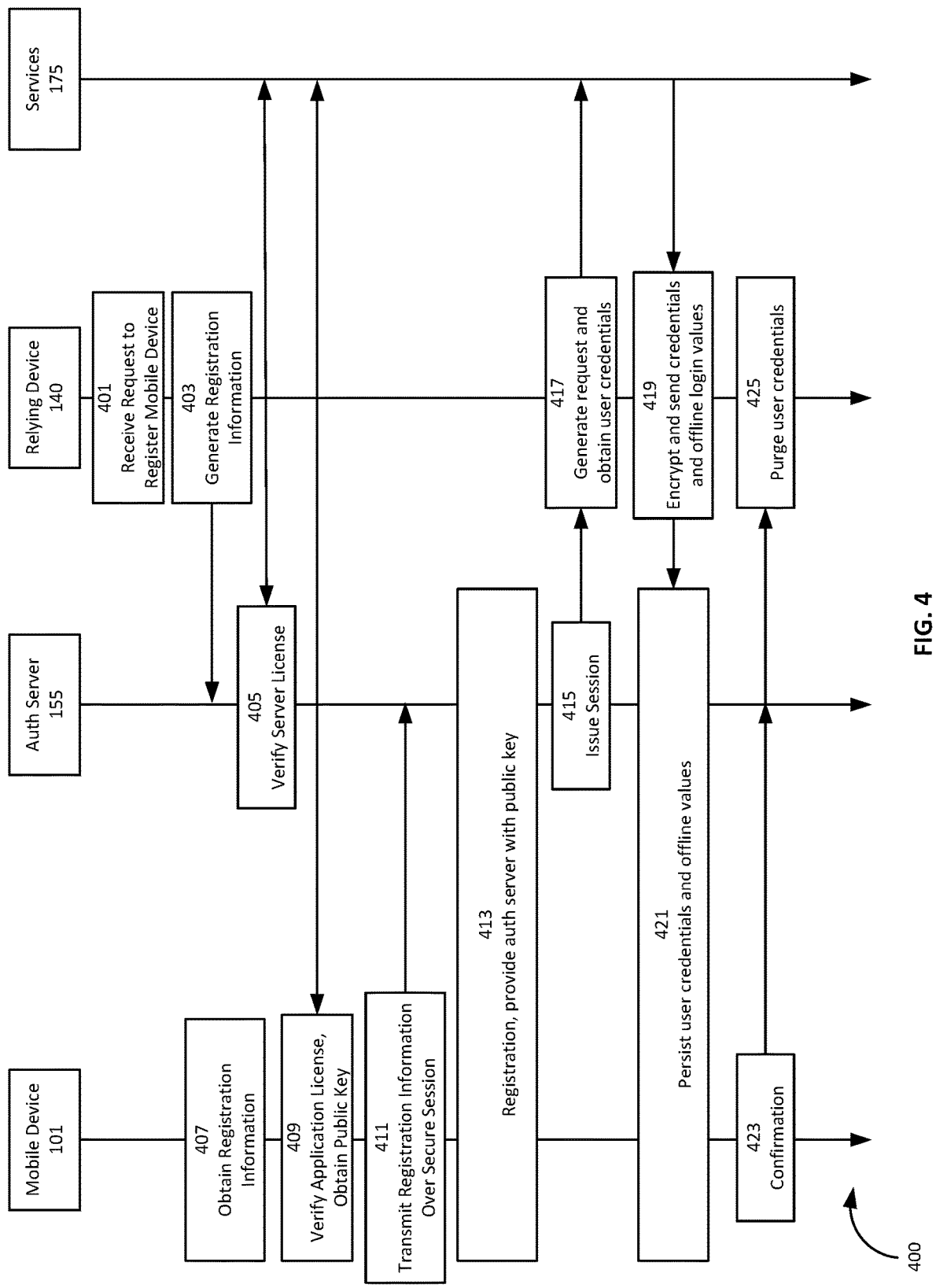
FIG. 4 is a diagram showing an example process for registering a mobile device with a relying device to permit mobile initiated authentication within example computing environments described in the present application.

FIG. 4 is a diagram showing an example process 400 for registering a mobile device with a relying device or domain to permit mobile initiated authentication within example computing environments described in the present application. Embodiments of the process 400, which may include one or more of the illustrated steps, may occur within an example computing environment, such as the example computing environment 100 illustrated in FIG. 1.

An example mobile device 101 is shown. Examples of a mobile device 101 may include an application like an authentication application 120 or other native application 125 configured to perform at least some of the disclosed operations, according to at least some embodiments described herein. In addition, the mobile device 101 may include a trusted execution environment operable to collect, store, or process at least some of the data described below, according to at least some embodiments described herein.

An example authentication server 155 is shown. Examples of an authentication server 155 may include various services and application programming interfaces by which authentication information and other data may be communicated between the authentication server and other entities. Additionally, the authentication server 155 may be configured to perform at least some of the disclosed operations, according to at least some embodiments described herein.

An example of services 175 is also shown. In some embodiments, the authentication server 155 may include one or more services, such as authentication services, which may include services 175. In some embodiments, the authentication server 155 may include one or more services 175, but not others. For example, services 175 may include services external to the authentication server 155. In various embodiments, use of services may be comingled, for example, authentication server 155 may provide a first service and services 175 may provide one or more other second services. An authentication server 155, as described herein, may be implemented in a variety of ways and optionally by different parties. For example, the authentication server 155 may be implemented by a $3^{rd}$ party authentication service which provides authentication services to various parties managing relying devices, by a party managing relying devices (such as to manage user access to relying devices and other resources), or by other parties managing various other resources, like online resources, which relying devices (that may be operated by other parties) or users may authenticate with to access. In various embodiments, an authentication result may confer one or more privileges, such as user access to a relying device, which may extend other privileges to the user, such as user access to one or more resources via the relying device, either natively or via extension (e.g., obtaining permissions based on the authentication result which may include forwarding of the authentication result or other credentials in response to the authentication result).

An example relying device 140 is shown. Examples of a relying device 140 may include a workstation which one or more users may access, such as to access one or more resources the workstation is configured to or permitted to access for authenticated users. Thus, for example, the relying device 140 may be a client-type device (e.g., like a relying device 140), and the relying device may be configured to access one or more online resources provided by a relying party. A relying device 140 may be associated with the relying party, an example of which may include an employer issued workstation where the online resources may include one or more internal resources of the employer. The disclosure, however, is not so limited. The relying party may provide $3^{rd}$ party services (e.g., $3^{rd}$ party online resources) to the employer, which employees may be permitted to access, such as via an employer issued workstation (or other device which relies on or is permitted to access the $3^{rd}$ party services). In some cases, the resources may be locally stored and executed by the relying device 140, like an application 110, but which may implement one or more DRM controls to permit user access. For example, the relying device 140 may be a device of a relying party, such as within a corporate environment. Alternatively, the relying device 140 may be a controller or communicatively coupled to a controller which governs physical user access to areas or functions (e.g., valves or machinery or panels) via electrical signals.

Although not shown, the process 400 of FIG. 4 may begin with the obtaining of an authentication application on the mobile device 101. Examples of obtaining the authentication application on the mobile device may include a preloading of the authentication application on the mobile device 101 or downloading of the authentication application to the mobile device from an application repository. The mobile device 101 may execute the authentication application, such as by loading the authentication application in a memory of the mobile device and executing the authentication application by a processor of the mobile device. In some embodiments, a memory and a processor of the mobile device 101 may be configured for the execution of applications within a client execution environment (CEE), which may be isolated from a trusted execution environment (TEE) of the mobile device. The TEE may include a secure memory and co-processor not accessible by applications or processes executing within the CEE. For example, an application executing within the CEE may be required to securely communicate with an interface of the TEE to request data from and request processing of data within the TEE, and the interface may respond to various requests based on verification of certain criteria.

Accordingly, an application (or other process) within the CEE may be prevented from accessing the TEE other than by communications over a secure session via the interface, and the TEE may restrict which values may be returned in a response. For example, actual user credential values may not be divulged but rather a representation of credential, such as cryptographic representation, like a cryptographic hash of a credential or encrypted credential (via either symmetric or asymmetric encryption protocol) indicative of the credential may be provided in a response. Similarly, an authentication result on a credential may be provided in a similar fashion, such as by returning a representation of the credential on which the user authenticated and a signed result (or other data, such as a signature of the representation by which the user authenticated) indicative of the authentication result. In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

In some embodiments, process 400 begins with a step 401 that includes a relying device 140 receiving a request to register a mobile device (e.g., of a user) to the relying device. In some cases, the relying device 140 includes a user interface by which a request to register the mobile device may be received in step 401. For example, the relying device 140 may be a workstation which the user desires to access, and the workstation may present a user interface by which a user may select a registration option. A relying device 140 may include other interfaces, for example, a relying device may include a physical button, or other human interface element with which a user may interact. The human interface element may be indicative of the registration process, and the relying device 140 may detect the user interaction in step 401 to receive a request to register a mobile device. In other embodiments, a relying device 140 may receive a request by virtue of detection of the mobile device, such as by a connection attempt via a wireless near-field communication protocol or other wireless connection, e.g., a WiFi connection attempt. In other embodiments, a relying device 140 may receive a request by virtue of detection of a signal emitted by a mobile device, such as via a wireless near-field communication protocol. In either instance, the relying device 140 may determine a user is requesting to register a mobile device.

In response to receiving a request to register a mobile device, the relying device 140 may generate registration information 403. For example, the relying device 140 may generate a registration information including a registration value. Registration information may include multiple components, such as an identifier of the relying device and a registration value (which may change for different registration requests, and thus be tied to a specific request in time). The relying device 140 may pass the registration information, such as the registration value, to an authentication server 155. For example, authentication server 155 may maintain a secure connection, or tunnel, such as via TLS/SSL over HTTP, WebSocket, SSH, or other protocol, with the relying device 140 (or vice versa) to facilitate the secure exchange of data between the relying device 140 and the authentication server 155. The authentication server 155 may store information about the relying device 140, such as in a device record corresponding to the relying device, which may include information pertaining to a network address of the relying device, corresponding secure connection information, and associated identifier.

In step 405, the authentication server 155 may, in some embodiments, verify (or renew) a license with one or more service 175. The authentication server 155 may verify a license in response to receiving registration information from a relying device 140. For example, in various implementations, relying devices 140 and authentication servers 155 may be deployed by businesses which utilize software licensed by other developers of computer program code. In turn, a deployed authentication server 155 may verify a license with a certificate authority service through the developer or through which the developer licenses use of the computer program code executed by the authentication server 155 to the business. Accordingly, example services 175 may include one or more certificate services, like an active directory service, X.509 certificate service, or other trust service.

The relying device 140 may also transmit or display registration information, such as the registration value, or a deterministic value associated with the registration value, such that the mobile device 101 may obtain registration information. The registration information may also include an identifier corresponding to the relying device 140 (e.g., such that the authentication server 155 may match a registration information received from a relying device 140 to registration information received from the mobile device 101). In some embodiments, the relying device 140 may generate a code, like an optical code (e.g., a QR code or barcode), which includes the registration value or deterministic value (e.g., like an encrypted registration value, or hash of a registration value), which the relying device may display within a user interface (e.g., on a display associated with the relying device). In some example embodiments, the relying device 140 may transmit registration information to the mobile device 101. For example, the relying device 140 may generate a signal indicative of the registration information or transmit, over a connection with the mobile device, data including the registration information, such as via a near-field communications protocol. In some embodiments, the relying device 140 may provide a first portion of registration information via first source (e.g., within an interface of a display) and a second portion of registration information via a second source (e.g., by a wireless interface), where the first source and second source differ and correspond to different interfaces or protocols by which the portions are provided. In some embodiments, the relying device 140 may provide an encrypted registration value to the mobile device 101, such as by wireless transmission, and display another value or code by which the mobile device 101 may decrypt (e.g., after reading the value or the user inputting the value) the encrypted registration value (e.g. within the TEE of the mobile device which may sign the output) to obtain the registration values (e.g., in plaintext). In some embodiments, the relying device 140 may transmit an encrypted value via first wireless interface and transmit the value or code by which a mobile device may decrypt the value over another interface.

In step 407 of the process, the mobile device 101 obtains the registration information. The registration information may be obtained by an authentication application executing on the mobile device 101, and may include multiple components, such as an identifier of the relying device and a registration value (which may change for different registration requests, and thus be tied to a specific request in time). The mobile device 101 may obtain displayed registration information, such as by user input, a scan of a code, like an optical code, or obtaining a value of a signal. For example, a user of the mobile device 101 may key in information displayed by the relying device 140 to an interface of an authentication application, such as a generated code. Alternatively, the user of the mobile device 101 may scan the code, such as by positioning the code within view of an imaging device by which the code may be captured. An interface of an authentication application may include a user interface element which a user may select to scan an optical code, like a QR code, by positioning the QR code in view of an image sensor of the mobile device, like a camera. Alternatively, an interface of an authentication application may include a user information element which a user may select to cause the mobile device 101 to obtain a signal generated by the relying device, such as a beacon signal indicative of the registration information or communication data including the registration information. Such as beacon signal may be broadcast via sound waves or electromagnetic waves. In some cases, the user may position the mobile device 101 proximate to an NFC device associated with the relying device by which the mobile device may obtain the signal. In some cases, such as whether the user caused the mobile device 101 to request a connection to the relying device 140, the mobile device may obtain the registration information over a connection with the relying device.

In some example embodiments, an authentication application may cause the mobile device 101 to search for one or more signals on one or more wireless interfaces of the mobile device when executed, or in response to the user navigating to a registration interface. In some cases, such a registration interface may display information about nearby detected relying devices based on respective beacon broadcasts, and the user may select one of the devices to transmit a signal which the relying device may receive as a registration request in step 401, and which may cause the relying device to transmit a signal by which the mobile device may obtain the registration information in step 407. Additionally, in some embodiments, the mobile device 101 may obtained registration information from multiple sources, such as an encrypted value from one source and a key or portion of a key for decrypting the value from another source. In some embodiments, the mobile device 101 is configured to obtain registration information or a portion thereof within the TEE of the mobile device, such as via a component (e.g., image sensor, touch interface keyboard, wireless interface like an NFC sensor, or other sensor) configured to securely pass data to the TEE. Accordingly, in some embodiments, the TEE may process at least some registration information, such as to obtain a registration value, and the TEE may sign the registration value, to indicate that the registration value was determined by the TEE.

In some example embodiments, in step 409, the mobile device 101 may verify a license, such as a license associated with the authentication application. For example, in a step 409 the mobile device 101 may transmit a request to a service 175, such as the service 175 with which the authentication server 155 is verified, to verify a license associated with the authentication application. In some embodiments, the service 175, such as a certificate service, may provide one or more public keys (e.g., upon request) to a first entity that correspond to another entity registered (or active) with the service such that the first entity may securely transmit data. Thus, for example, the mobile device 101 may obtain one or more public keys associated with the authentication server 155 from the service 175. In some embodiments, obtaining a public key for the authentication server 155 may be dependent upon whether the authentication application is licensed. Additionally, in some embodiments, the authentication application may be licensed in association with a given application server 155 such that revocation of the certificate for the authentication application may revoke privileges of the mobile device (e.g., if lost, stolen, or otherwise).

In step 411, the mobile device 101 may transmit registration information corresponding to the relying device 140, such as a registration value and identifier of the relying device, to the authentication server 155. The mobile device 101 may establish a secure session with the authentication server 155, such as based on the obtained public key, for the secure transmission of registration information. For example, the mobile device 101 and authentication server 155 may establish a secure session by the mobile device 101 transmitting a session key encrypted by the obtained public key to facilitate the exchange of information. The secure session may be HTTP over TLS/SSL, SSH, WebSocket over TCP, or other secure connection type by which the mobile device and authentication server 155 may exchange data, like registration information. In some cases, the mobile device 101 may encrypt the registration information, such as a registration value, with the obtained public key of the authentication server 155. In some cases, the mobile device 101 may sign data transmitted to the authentication server 155, such as by a private key stored within the TEE for which the authentication sever may obtain a public key for verifying the signature (e.g., the private key may correspond to a public key associated with the license of the authentication application which the authentication server may request from a service 175 to verify the signature).

In step 413 the mobile device 101 and authentication server 155 may participate in a registration operation. The registration operations may include the secure exchange, such as over the secure session, of a public key corresponding to a private key stored within the TEE of the mobile device. In some embodiments, the authentication server 155 may be configured to retrieve a public key corresponding to a license authentication application of the mobile device 101 from a service 175, like a certificate service, and may challenge the mobile device to a proof of knowledge, such as knowledge of the corresponding private key, like in a challenge-response. For example, the mobile device 101 may sign specific data within the TEE by the private key and the signed data may be transmitted to the authentication server for verification based on the public key (e.g., according to a signature verification algorithm). The mobile device 101 may also provide other information over the secure session established with the authentication server 155, such as representations of credentials. One or more steps of the registration operation discussed below may be optional, such as in instances where the mobile device 101 is already registered with the authentication server 155, in which case the authentication server 155 may maintain a record for the user which may include one or more representations of user credentials, public keys, etc., for authentication operations. In some case these representations and public keys may be used for multiple relying devices or other authentication operations, however, some of the representations or public keys may be reestablished in some instances, or by default, depending on implementation.

Additionally, some registration operations discussed at step 413 may occur in a variety of different ways depending on the embodiment, and some registration operations of step 413 may occur prior to the process of FIG. 4. For example, after obtaining an authentication application on the mobile device 101 and prior to the process of FIG. 4, a user may have registered or established an identify according to a process 200 described with reference to FIG. 2. For example, registration may be performed in association with establishing an identify of a user which may be utilized in a process like that described with reference to FIG. 4 or other processes described herein. Likewise, user credentials established within a TEE of the mobile device 101 in association with such a registration process may be subsequently utilized. In some cases, a user may have a registered account or other federated identity to which the user may authenticate to in the registration process. Thus, in some cases, the mobile device 101 may submit a knowledge proof (e.g., signature of some data in step 411 or 413) or respond to a challenge for a knowledge proof (e.g., in step 413) to bypass some or all of the steps described below or with reference to process 200.

In some embodiments, such as in association with a registration step 413 or prior to the illustrated process 400, an authentication application may be configured to cause the mobile device 101 to request establishment of an account within an identity management system, which may correspond to the authentication server 155 and optionally one or more other services 175. For example, upon execution of the authentication application within the CEE of the mobile device 101, the authentication application may cause the mobile device 101 to prompt the user indicate whether the user desires to create an account, like a federated identity. If the user desires to create a federated identity, the authentication application may cause the mobile device 101 to generate a request for transmission by the mobile device to a server, such as authentication server 155.

In some embodiments, such as in association with a registration step 413 or prior to the illustrated process 400, the authentication application performs one or more steps similar to those previously described with reference to FIG. 2 (e.g., in process 200) to establish data (e.g., credentials or private keys) within the TEE and receive data (e.g., representations of credentials or public keys) from the TEE, and transmit the received data to the authentication server 155. For example, the mobile device, TEE, and authentication application may perform one or more steps, like steps 220-228 of process 200, as described with reference to FIG. 2. Those steps may also include the exchange, storage, and generation of the addition data discussed above and discussed elsewhere throughout the application, such as with reference to FIG. 2, for the establishment of a federated identity including that information. Examples of which may include FIDO and FIDO2 standards, and those standards may be similarly augmented with techniques like those disclosed herein.

The mobile device 101, as described above, such as over the secure session, may communicate registration information to the authentication server. An authentication application may cause the mobile device 101 to transmit information indicative of the mobile device or user, such as in cases where the mobile device has previously registered with the authentication server. For example, the authentication server may store a record corresponding to the user and which includes information about the mobile device, such as device information and a public key corresponding to a private key stored within the TEE of the mobile device. The user record may additionally include one or more representations of credentials established within the TEE of the mobile device 101. The authentication application may cause the TEE to sign, within the TEE, data which may be transmitted to the authentication server 155, by which the authentication server may verify the mobile device as a registered mobile device. In order to generate the signature, the user may be required to authenticate on the mobile device 101, such as by providing one or more credentials for verification within the TEE. Accordingly, the authentication server 155 may verify the signed data in accordance with a signature verification algorithm based on the public key and the data which was signed, such as a representation of a credential on which the user authenticated with the mobile device. The authentication server 155 may access a user record, such as by mobile device identifier, indicate user record, or by a public key provided by the mobile device 101. The authentication server 155 may access a record based on the received information, such as to obtain the public key associated with the record (or ensure a match thereof) and obtain a stored representation of the credential for performing the verification of a previously registered device. The data which was signed may include a timestamp which may be communicated to the authentication server 155 (or other temporal data, like challenge data, provide by the authentication server) and by which the authentication server may verify temporality of the signed data to a current system time (or a timestamp associated with the receipt of registration information from the relying device 140).

If the mobile device 101 is not previously registered, e.g., there is no record of the device for a user record, the authentication server 155 may request the mobile device 101 provide information like that described above. In instances where no record of the user exists, additional information may be requested, such as to establish a user record, and verify privileges associated with the user to access the relying device 140. In either instance, the authentication server 155 may request the mobile device 101 provide a public key and representations of credentials by which a record of the device may be established for the user. The authentication application executing on the mobile device 101 may request, to the TEE, establishment of a private key within the TEE, or request a public key which may cause the generation of a private key within the TEE, or the TEE may provide a public key corresponding to a private key already established within, stored, or otherwise of the TEE. In each case, the TEE maintains the private key within a secure memory and not divulge the private key. In some cases, the TEE may output a generated result (e.g., a generated public key corresponding to a generated private key) from within the TEE, and provide a public key associated with a secure processor (or other secure element) of the TEE (which may output signed data) such that secure processing of data on which the result is based may be verified (e.g., that the public key may be verified as corresponding to a securely generated private key that is maintained within the TEE). In some embodiments, the authentication application may verify the public key output by the TEE as securely generated (e.g., thus indicating the key pair was generated within the TEE and the private key is securely retained with a secure memory). In turn, the authentication application may cause the mobile device 101 to transmit the public key to the authentication server 155, and optionally include data by which the authentication application may verified the public key as securely generated. With a public key established for the mobile device 101, for which the corresponding private key is secure within the TEE, the authentication server 155 may verify other data received from the mobile device 101, such as by signature verification, and encrypt data which may be transmitted to the mobile device 101 for processing within the TEE. In some embodiments, different public keys are utilized for the different operations, in which case multiple public keys may be generated in accordance with the above processes.

The authentication server 155 may request the mobile device 101 generate representations of credentials corresponding to the user. In some cases, the user may establish one or more credentials from which the representations are generated, such as where those credentials differ from ones already established within the TEE, are more secure, or otherwise. For example, the authentication server 155 may request a set of representations, each representation corresponding to a different credential in a set of credentials. The authentication application may request, to the TEE, establishment of one or more credentials (e.g., the set of credentials) within the TEE. The authentication server 155 may provide a policy with which one or more of the credentials must comply, e.g., a pin length greater than 4 digits, alphanumeric password requirements, whether one or more biometric credentials (or a combination) are permitted, and the like. The authentication application may provide the policy requirements to the TEE in association with respective credentials for establishment within the secure memory of the TEE. In turn, the authentication application may request a representation of an established credential, such as a cryptographic hash of a credential. The TEE may output a representation of the requested credential, and may also provide a result indicating whether the credential complies with the policy (although in some cases the TEE may prevent the user from providing a credential which does not comply with the specified policy requirements). In some embodiments, the TEE may output signed data such that the authentication application or authentication server 155 may verify the secure generation of data output by the TEE. For example, after establishment and verification of the private key within the TEE, the TEE may sign outputs, such as results (e.g., a representation) or other processed data, with the private key. In turn, the authentication application or authentication server may verify data as being processed or securely generated within the TEE based on corresponding signed data by processing the data, the signed data, and public key by a signature verification algorithm which indicates whether the signing key (e.g., the private key of the TEE) was used to sign the data, and whether the signed data correspond to the data. Thus, the authentication server 155 may receive representations of credentials from the mobile device 101, which may be verified by the above public key or another public key (e.g., that corresponds to a private key of the TEE and which was exchanged in a process like that described above) according to a signature verification technique. In other words, embodiments should not be construed to be limited to a single key-pair, as multiple key-pairs may be created in accordance with techniques like those described above, or that embodiments preclude use of a symmetric encryption protocol with shared key encryption. The authentication server 155 may determine whether the user is authorized to access the relying device, such as based on associations between users and relying devices, verification of the registration value, and determine whether to issue a session in step 415 based on the results.

In some cases, the relying device 140 may maintain a WebSocket tunnel, or other secure tunnel or connection, like a heartbeat between the relying device and an authentication server 155 (or vice versa). For example, a secure session may be established between the relying device 140 and the authentication server 155 (as well as services) for the transmitting of credentials, like public keys, certificates, offline values, or the exchange of other data. The secure session may be HTTP over TLS/SSL, SSH, WebSocket over TCP, or other secure connection type by which the relying device 140 (or applications thereon) can exchange data with a server. The secure session may be held open by the authentication server 155 or relying device 155 for a pre-configured amount of time (e.g., 1-180 seconds, or 1-5 minutes) before timing out, and refreshed upon a heartbeat signal, like receipt of a packet indicative of a heartbeat (e.g., that a connection is alive) or refresh request. Thus, for example, the authentication server 155 may determine an availability of a relying device 140 for online authentication based on the status of the session (e.g., whether the session is active). The authentication server 155 may issue a user session by transmitting data received from the mobile device to the relying device 140 based on an agreement of information received from the relying device 140 (e.g., registration information in 403) and the information received from the mobile device 101 (e.g., matching registration information in 411), and verification of authentication information received from the mobile device (e.g., for a user). In some embodiments, the authentication server 155 may additionally verify permissions associated with a record of the user or the relying device, such as to determine whether the user is permitted to access the relying device prior to issuing a session 415 for the user to the relying device 140. Additionally, the authentication server 155 may push an offline authentication policy to the relying device 140, which may govern generation of offline values by which a user may access the relying device when networked communications between the relying device (or the mobile device) and authentication server are unavailable.

In a step 417, such as responsive to a session issued by the authentication server to the relying device 140, the relying device may generate a request to a service 175, such as a certificate service. The service 175 may differ from other certificate services (e.g., those utilized in steps 405 or 409), or may be the same. In some cases, the certificate service utilized in steps 405 and 409 is a trust certificate service associated with a developer which licenses server 155 instances and utilization of authentication applications on mobile devices (e.g., may permit 1 active server instances and 100 authentication applications instances, or 1-10 server instances and 0-1000, or 0-10,000 application instances, or many more such as in the case of a $3^{rd}$ party service, and different entities, like relying parties, may be permitted different amounts of instances of servers and associated authentication application instances by which users may access relying devices). In step 417, the request for a certificate may be to an active directory service, or other service which governs credentialing of relying devices, such as user accounts on such relying devices and the like, such as for examples in which a relying device is a workstation or server executing an operating system or modules configured to utilize the respective service. Other relying devices in accordance with other embodiments may transmit requests to other services, which may optionally be provided by the authentication server 155 or other server or other service provider. The relying device 140 may also generate a key-pair, such as a public-private key pair, for signing data transmitted to one or more entities, such as one or more services 175 or servers (e.g., like the authentication server). For example, the relying device 140 may generate a public-private key pair in association with the registration process, such as responsive to the session being issued by the authentication server to the relying device 140 in step 417 (e.g., to register a mobile device/user not previously registered to the relying device 140). In turn, the relying device 140 may provide the public key to one or more services, servers, or other entities by which those entities may verify data signed by with relying device with the private key (which the relying device retains). In another example embodiment, the relying device 140 may receive a private key, such as over a secure connection (and optionally provide the public key or distribute the public key to one or more entities). For example, the relying device 140 may receive a key pair from the authentication server, or a service, and store the private key of the key pair for singing data transmitted to one or more entities to which the public key of the key pair is distributed.

In some embodiments, the request generated in step 417 may be a request to sign or create a signed certificate to obtain credentials corresponding to the user for which the authentication server 155 issued the session 415. The request to the service in step 417 may include information based on data received over the session with the authentication server 155, which may include information provided by the mobile device 101 to the authentication server or based on information provided by the mobile device to the authentication server in the preceding steps. For example, the request may be a certificate signing request for an active directory compatible SSL certificate or other certificate or token from a service 175 which generates or signs a certificate (e.g., as a signing authority) and returns the certificate. The signed certificate may be tied to the user, e.g., as a user identifier or authenticator or both. For example, the signed certificate may be tied to information provided by the mobile device, like a public key, certificate, or cryptographic hash, other deterministic information (e.g., such as information output by the TEE), or other credential associated with the mobile device, to establish a zero-knowledge proof of ownership. In some cases, the certificate signing request may correspond to a public key of the mobile device or certificate based on a public key of the mobile device, such as the public key provided to the authentication server. Other embodiments may associate the certificate with the user within one or more databases, such as based on an association of the user certificate with a public key, or cryptographic hash, or other deterministic information provided by the mobile device, thus tying the user certificate to the mobile device.

In step 419 of the process, the relying device 140 may receive a response from the service 175, such as a signed certificate or token returned in response to the request 417, like a user certificate, for user credentials corresponding to a user account which may be accessed on the relying device. The user account which may be access based on the credentials may correspond to a user-level account (e.g., which may be an existing user account) of the user of the mobile device 101. For example, within a corporate environment, the user account may be an account which the user has permission to log into on the relying device 140. In some cases, such as where multiple such accounts exist, like a user-level account, or an administrative-level account, a user certificate may be obtained for each account. In some cases, the user certificate is specific to a given relying device, and the user may register with other relying devices, or the user certificate may be valid across a collection of relying devices. The relying device 140 may transmit 419 the signed certificate to the authentication server 155 such that the certificate may be persisted to the mobile device 101. In some embodiments, the relying device 140 may encrypt the user credentials or other data (e.g., with a public key or encryption key associated with the mobile device), like a certificate, for which the TEE of the mobile device stores a corresponding key by which the encrypted data may be decrypted (e.g., within the TEE of the mobile device).

Additionally, the relying device 140 may generate one or more offline values in accordance with an offline policy received from the authentication server 155 or stored on the relying device 140. Offline policy may provide for use of an offline value for a user login to a relying device 140 (which may communicate the offline values for persistence with the policy on a mobile device when registered and when performing an online enabled mobile initiated login). Offline values may be a PIN, numerical or alphanumeric, or other value which may be input to the relying device by the user or obtained by the relying device from the mobile device (e.g., value may be provided by NFC, Bluetooth beacon, optical code, or other communication means). A given offline value may be single use, such that is cannot be captured for reuse, and a limited number of offline values may be persisted 421 to a user device. For example, after registration or online login, the relying device may generate 1, 5, 10, 15, 25 etc. offline values (e.g., according to a policy) which may be persisted to the mobile device. In some embodiments, the offline values are generated based on the signed user certificate, or other deterministic data, like a public key of the mobile device, or a value associated with the relying device, such as a value or values of one or more registers, or a combination of values. Offline values may be generated in other ways in other embodiments. The relying device 140 may store data, such as the offline values, or data by which a received offline value may be verified. Additionally, the relying device 140 may store the policy, which may optionally include one or more rules for offline value verification. In some cases, the rules may be based on the capabilities of the mobile device and configuration of the relying device. Additionally, the relying device 140 may sign transmitted data, such as offline values or other data described herein, and an entity receiving the data may verify a signature of the relying device 140 based on public key associated with the relying device. In some case, the private key by which the relying device 140 signs data is associated with a given mobile device or user having registered to access the relying device. Thus, for example, an entity receiving signed data from the relying device 140, which may be in association with a request, challenge, access attempt, or login pertaining to a particular mobile device of a particular user, may verify the signature based on a corresponding public key distributed by the relying device or other entity in association with registration of the mobile device of the user.

The authentication server 155 may persist data 421 received from the relying device 140 to the mobile device 101. For example, the authentication server 155 may transmit the user credentials to the mobile device 101, along with offline values. The authentication server 155 may transmit a policy to the mobile device 101, which may specify one or more rules governing user access to the relying device to which the mobile device registered. The above information may be encrypted, such as by a key of a key-pair to which the TEE has access to the other key of the pair and by which the information may be decrypted. In some embodiments, the key may be a shared key. In either instance, data transmitted to the mobile device 101 may be encrypted, and the mobile device may obtain unencrypted data by processing the encrypted data in accordance with an encryption protocol, such as within the TEE of the mobile device, which may securely store a key by which the encrypted data may be decrypted. A policy may also be provided in association with the registration or other disclosed step, or transmitted or updated for a relying device by the authentication server 155 at another time. In some cases, the policy includes an online authentication component and an offline authentication component. The online authentication policy component may specify rules by which user access may be granted to the relying device 140 by mobile initiated authentication over a network, such as through the authentication server 155. The offline authentication policy component may specify rules by which user access may be granted to the relying device 140 by mobile initiated authentication when network access to one or more devices is unavailable.

The mobile device 101 may some or all of the received information in encrypted form within any memory, or may store some or all of the received information within the TEE in decrypted or encrypted form. In either instance, the TEE may retain a key by which the information may be decrypted, and an unencrypted version of the information may only be obtained by processing within the TEE (e.g., as opposed to a CEE) of the mobile device. In some cases, the received information may include encrypted information (like a certificate) which may by encrypted by another key (e.g., to protect the encrypted values as well as other values).

In a step 423, the mobile device may confirm receipt of received information, such as by a response to the authentication server 155, and the authentication server 155 may confirm receipt to the relying device 140. Upon receipt of confirmation, the relying device 140 may purge user credentials, such as a user certificate or other data received in association with the registration process 400 in a step 425. In some embodiments, the relying device 140 may purge user credentials after completion of a user session with the relying device. For example, upon receiving confirmation from the authentication server 155, the relying device 140 may permit user access to the relying device.

In some embodiments, the authentication server 155 or services 175 may utilize one or more local databases or networked databases, such as one or more repositories (e.g., like an authentication repository 165). In some embodiments, the authentication server 155 or services 175 may each, or individually, utilize a combination of databases. For example, many entities may store some data locally or via networked datastore.

Example Process for Online Mobile Initiated Authentication

Figure 5:
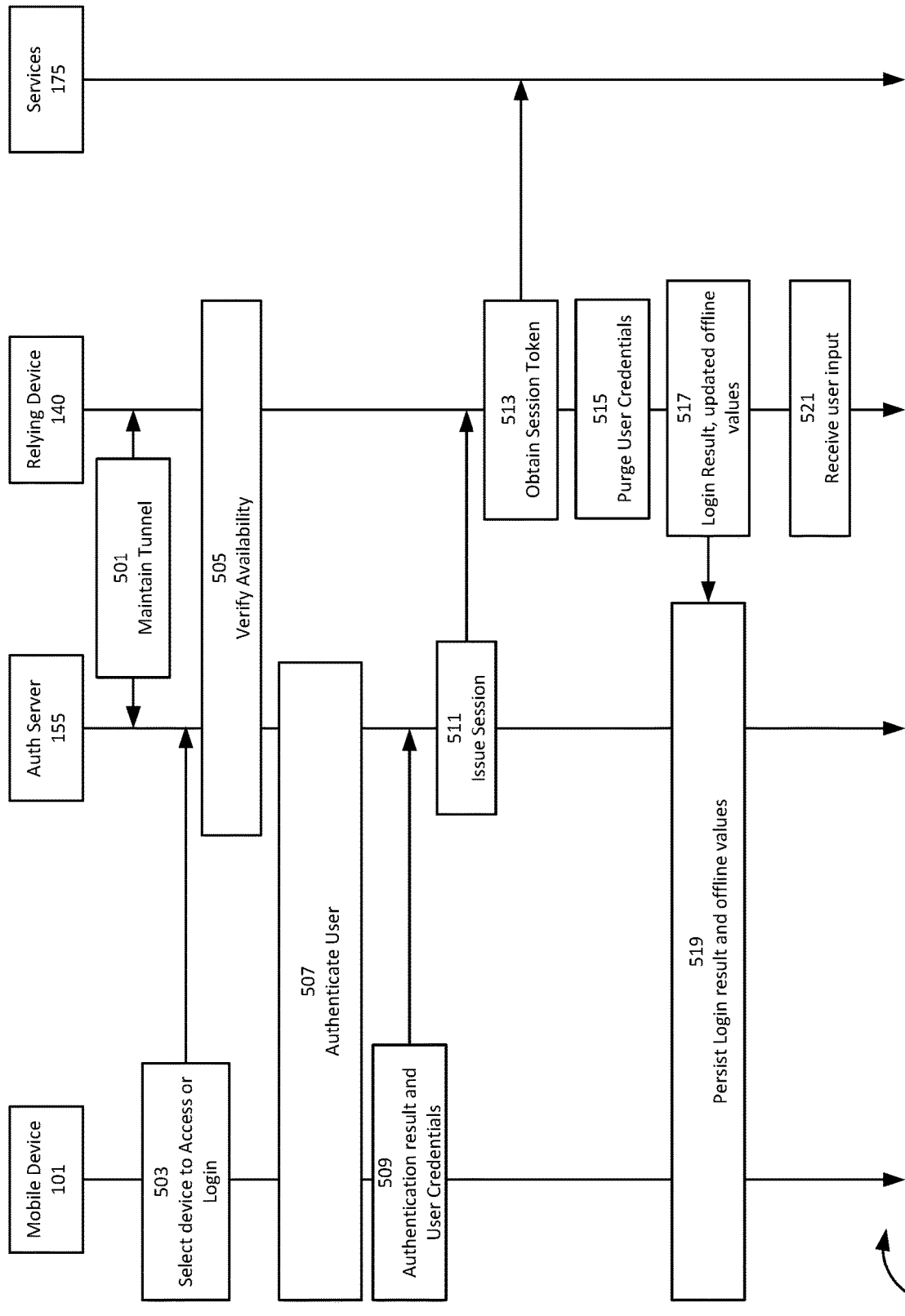
FIG. 5 is a diagram showing an example process for online mobile initiated authentication within example computing environments described in the present application.

FIG. 5 is a diagram showing an example process 500 for online mobile initiated authentication within example computing environments described in the present application. Embodiments of the process 500, which may include one or more of the illustrated steps, may occur within an example computing environment, such as the example computing environment 100 illustrated in FIG. 1. In some embodiments, the process of FIG. 5 may occur after a registration process, such as the registration process described with reference to FIG. 4, or other registration process described herein.

In FIG. 5, as shown, a relying device 140 may in a step 501 maintain a tunnel to an authentication server 155, or vice versa. In other words, process 500 may be an online enabled process. In some embodiments, a tunnel may not be maintained, but rather established in association with a verification of relying device 140 availability by the authentication server 155.

In a step 503, a user may elect to login to the relying device 140 on a mobile device 101. For example, the user may navigate a user interface of an authentication application executing on the mobile device 101 and select a relying device with which the mobile device is registered for mobile initiated authentications. In some embodiments, the user may select from a plurality of relying devices to which the user has registered the mobile device in one or more iterations of the process 400 described with respect to FIG. 4. The mobile device may store, such as within the TEE, user credentials corresponding to a user account for logging into the respective relying devices. In some cases, the credential is a token, like a user certificate, which may be signed by a certificate service, like an SSL certificate service, or other certificate or ticketing service. Thus, for example, the certificate may be an active directory SSL certificate. In some embodiments, the authentication application may obtain one or more signals, which may be associated with one or more relying devices. In turn, the authentication application may display a subset of relying device to which the user has registered based on the obtained signals. Example signals may include GPS signals, WiFi signals, or beacon signals indicative of location associated with respective relying devices or presence of a respective relying device within proximity of the user. The user may select 503 a given relying device 140 which the user desires to authenticate to access, e.g., log into under an account of the user. The mobile device 101 may transmit an access request corresponding to the selected relying device 140 to the authentication server 155. The access request may include an identifier corresponding to the relying device which the user desires to access. An example identifier may be a device identifier for the relying device obtained during a registration process. The access request may additionally include identifying information corresponding to the user of the mobile device, or the mobile device, such as an identifier associated with the mobile device or the user. An example identifier may be public key, or other identifier associated with a record of the user or mobile device. In turn, authentication of the user may occur prior to the user physically interacting with the relying device and the relying device 140 may login under the account of the user without the user physically inputting providing user credentials (such as a username, password, or both) for the account on the relying device.

In a step 505, such as in response to receiving an access request corresponding to a given relying device from the mobile device, the authentication server 155 may verify an availability of the selected relying device 140. For example, the authentication server 155 may obtain one or more records based on a received identifier associated with the relying device. The record may include information about a network address, or connection, like a WebSocket tunnel, associated with the relying device by which the authentication server 155 may determine availably of the relying device. In some embodiments, the authentication server 155 may identify a WebSocket tunnel associated with the relying device 140, such as by a network address associated with the relying device. In some cases, the authentication server 155 may determine a status associated with the WebSocket tunnel, such as whether a heartbeat signal has been received from the relying device 140. The heartbeat signal, in some embodiments, may indicate an availability status of the relying device 140, such as whether another user session is ongoing, in which case the authentication server 155 may determine the relying device to be unavailable. If the requested relying device 140 is available, the authentication server 155 may authenticate the user of the mobile device that requested access to the relying device.

User authentication may be performed according to one or more processes discussed herein. In some embodiments, the access request transmitted in step 503 may include authentication information by which the authentication server 155 may deem the user authenticated. For example, the mobile device 101 may receive a policy including one or more rules by which the authentication server 155 verifies an authentication result generated by the mobile device. Thus, the mobile device 101 may generate the authentication result and transmit the result in association with the access request. Alternatively, as illustrated by step 507, the mobile device 101 may receive a request for an authentication result from the authentication server 155 (e.g., after availability of the requested relying device 140 is determined) and the mobile device 101 may generate, such as by processing user provided credentials within a TEE of the mobile device, the authentication result. In some embodiments, the authentication result may include one or more representation of credentials which the user authenticated on with the mobile device 101, such as by providing those credentials to the TEE for verification. For example, the TEE may process credential values corresponding to one or more credentials obtained from the user to determine whether the obtained credential values match previously established credentials for the user within the secure memory of the TEE. The TEE may output a representation of a credential by which the user was deemed authenticated, and the TEE may output signed (e.g., signed by a key maintained within the secure memory) data, which may include the representation of the credential, thus verifying the TEE determined the result. A timestamp or other value may be included in the data, such that the signed data conveys a time at which the result was determined. The mobile device 101 may transmit generated authentication results to the authentication server 155 in step 509 for verification. For example, the authentication server 155 may verify signed data based on corresponding received data and a public key associated with an established record associated with the user or the mobile device.

In accordance with examples like those described above, the mobile device 101 may transmit user credentials in association with the result. The user credentials may be a certificate, or token, like a user certificate issued to the mobile device for accessing the relying device 140. In some embodiments, the authentication result may be, or include, signed data. In some embodiments, the signed data may be, or include, the user credentials. For example, a certificate may be signed within a TEE of the mobile device 101 (e.g., by a private key or signature key stored within a secure memory of the TEE) and transmitted to the authentication server 155, which the authentication server may verify (e.g., using a public key or signature verification key). In some embodiments, a policy may be enforced within the TEE to permit signing or other processing of a user certificate (e.g., release of the user credentials associated with a user account for the relying device). Accordingly, in some embodiments, release of a signed user certificate by the TEE may convey authentication of the user on the mobile device to the authentication server 155. A timestamp including in the singing of the certificate, which may be provided with the user certificate, may convey timeliness of the generation of the signature. The data and signed data may also convey other information, like one or more authentication results like those described above. These and other principle may be utilized in authentication processes, for example, the authentication server 155 may issue a challenge to the mobile device requesting signature over specific data or a value, and a successful response includes signed data incorporating the challenge response.

Examples of other or additional steps which may be performed in association with steps 507 and 509 may include one or more of the steps described with reference to processes like those of FIG. 2 or 3 among others. For example, the mobile device 101 may authenticate a user and process challenges in accordance with techniques described with reference to step 319 in FIG. 3 and provide results of processing in accordance with those techniques to the authentication server 155. In the context of the process 500 of FIG. 5, such techniques may be applied to other data, like a user certificate, and signed data corresponding to such data, which may be processed within the TEE of the mobile device in accordance within a policy governing signing and release of such data, and the mobile device may transmit the data to an authentication server 155 or other entity.

As described above, successful authentication of the user on the mobile device 101 may include user authentication within a TEE of the mobile device to release a user certificate corresponding to a user account for logging into the relying device 140. The user cert may be encrypted, or stored within a secure memory of the TEE of the user device such that the CEE cannot access the certificate in unencrypted form. Additionally, singing of the user certificate may be performed with the TEE based on a private key or signature key stored within a secure memory of the TEE which the CEE may not access, and the TEE may not release the private key or signature key. This operation may occur subsequent to authentication of the user, such as by credential values stored within the TEE. Such steps may include active (e.g., specific user inputs, like a PIN, password, or biometric data, like a faceprint or fingerprint) or passive authentication (e.g., obtained biometrics, such as over time, or detection after specific user inputs that the user remains in control of a mobile device) based on policy governing passing of an encrypted version of the user certificate to the authentication server 155. Additionally, the authentication server 155 may verify such information in according with the policy, which may be associated with the relying device 140 the mobile device requests access. The authentication server 155 may access a public key or signature verification key by which received data may be verified. For example, in step 509 the mobile device may send the user certificate to the authentication server 155 based on an authentication result determined on the mobile device, which may be subject to challenge by the authentication server 155 or driven by conformance to policy on the mobile device (which may be verified by the authentication server). The authentication server 155 may verify the information received from the mobile device, such as in accordance with techniques described herein, such as on established representations of user credentials, signature verification of received data, and issue a user session in a step 511 based on results of a verification determination. For example, as described, the authentication server 155 may verify received information based on one or more records, which may include information like representations, public keys or signature keys, and the like, and thus operable to verify data received from a mobile device by signature verification of signed data and agreement of data corresponding to that which was signed with data maintained in the one or more records. The authentication server 155 may additionally verify whether the user is permitted to access the relying device 140, such as by determining whether the user certificate was revoked or based on associations of records (e.g., relying device record with a user record or record of the mobile device) and authenticity thereof.

The issued user session 511 may include communication of information by which the relying device 140 may obtain one or more tokens or tickets for establishing a user session on the relying device 140 (e.g., by login to a user account, and optionally other accounts with other entities, such as for one or more application) or performing other operations. For example, the authentication server 155 may issue a user session by passing a user certificate to the relying device 140. In some embodiments, the authentication server 155 may sign the user certificate, such as in response to verifying the information received from the mobile device. The signature of the authentication server 155 may convey the verification of the issuance of the user session, such as to a service 175. In some embodiments, the relying device 140 may sign the user certificate. Thus, for example, presentation of the certificate to the service 175 may convey the provenance, like a chain of tile, of the certificate and the entities which handled it, e.g., by nested signatures, and which the service 175 may verify based on public keys or signatures keys maintained for the respective entities. In either instance, the relying device 140 may obtain 513 a token, or ticket, by transmitting the user certificate (which may be signed by one or more entities) in association with a request for a token or ticket to the service 175. The service 175 may authenticate the relying device 140, such as by issuing one or more challenges to the relying device 140, which may be signature challenges. The relying device 140 may sign data, such as the token, and other data to convey temporality of a request (e.g., like a timestamp) and possession of a private key by which the data was signed. The relying device 140 may sign data in response to challenge, like a unique challenge issues by a service 175 or other entity, thus conveying possession of a private key by which the data was signed. For example, the private key by which the data is signed may be a private key of a public-private key pair and the public key of the pair may be distributed such that other entities may verify signed data as being signed by the private key of the pair. The private key may be a private key retained on the relying device 140, such as a private key generated during a registration process (e.g., mobile device registration to the relying device 140) or otherwise stored on the relying device 140. For example, the private key may be generated and stored on the relying device 140 during a mobile device registration process and the corresponding public key may be exchanged with one or more servers or services for signature verification. The private key may be utilized by the relying device 140 to sign a variety of data like that discussed above and elsewhere herein.

The relying device 140 provides responses to one or more challenges to the service 175 to receive a token or ticket. In some embodiments, the service 175 in an active directory service which issues a ticket for a user account associated with the user certificate, which the relying device 140 may utilized to log into the user account, and may convey credentials associated with one or more applications. For example, one or more other application, such as active directory aware applications, based on the received ticket, may obtain other tickets from the service or other services, such as to access online resources under the same or another account of the user (e.g., one or more federated accounts or via single sign-on permissions) provided internally (e.g., by a party managing the relying device) or externally (e.g., other relying parties, like $3^{rd}$ parties).

After obtaining a user session token or ticket in step 513 the relying device 140, in some embodiments, may purge 515 the user credentials received from the authentication server 155. In some embodiments, such purging 515 may not be required in terms of providing robust security, but rather as a housekeeping measure. For example, signing of a user certificate may convey a timeliness, such as by a including a timestamp in a signature, to the service 175 for obtaining a session token or ticket, and the server 175 may tie a user session token or ticket to a given instance of a signed certificate such that it may not be presented multiple times to the service 175 to obtain other tickets.

In step 517 the relying device 140 may return a result of successfully obtaining a user token or ticket, and thus a result of a login attempt to an account of the user by the relying device. The relying device 140 may return the result, such as in a response, to the authentication server 155. Additionally, the relying device 140 may generate one or more updated offline values, such as to refresh offline values provided to a mobile device of the user. The authentication server 155 may receive the response and refreshed offline values from the relying device 140 and persist 519 the information to the mobile device, such as over a secure communication session, which may be a session utilized in step 503, 507, or 509.

In some embodiments, the relying device 140 may wait for user input prior to altering a display or performing other operation. Thus, for example, the relying device 140 may not exhibit or perform an action prior to a user input (or action), such as for a configurable amount of time, such as to permit the user the convenience of authenticating via the mobile device 101 without indicating that a user session was initiate with the relying device 140. In some embodiments, the received user input 521 may be a key press, or other interaction with an interface. For example, the user may press a key on a keypad, keyboard, or touch a touchscreen associated with the relying device 140 to access the relying device 140 (which may otherwise not display or indicate that user access is permitted prior to receiving the input). In some embodiments, the relying device 140 may receive an input via wireless signal, such as from the mobile device 101 of the user, which the mobile device 101 may emit subsequent to receiving the result and offline values in step 519. In some embodiments, user input may be a combination or sequence of inputs, like Control-Alt-Delete, Esc-Esc-Esc, Konami Code, etc., or a specific input, like Esc or Del or 1 or A or a symbol, etc. In some embodiments, the combination or sequence of inputs may be specified by the user of the mobile device 101, such as during a registration process or otherwise associated with a record of the mobile device or the user. In some embodiments, the combination or sequence of inputs may be determined by the relying device 140 and persisted to the mobile device of the user with the offline values or other result. In some embodiments, the mobile device 101 may wireless emit a signal indicative of the combination of sequent of inputs or a specific input, such as based on the received information. In various example embodiments, the combination or sequence of inputs (like a specific input) may be reduced in complexity over a username or password requirement (or combination thereof) to which user access may otherwise require omit a requirement for a multi-factor authentication (e.g., such as an out-of-band authentication process in response to access attempt) as the user already authenticated via the mobile device.

In some embodiments, the relying device 140 operates within a VDI environment. Thus, for example, rather than providing access to a local OS, a virtual machine executes a desktop image and the relying device 140 receives data (e.g., the virtualized desktop) for display over a network session with the VM. In such example embodiments, steps 503 and 511, for example, may include one or more additional operations and the authentication server 155 may provide authentication to the network enabled VDI session between the relying device 140 and a VM executing a desktop image. As noted previously, a virtualized desktop may be persistent or not. In a persistent configuration, a desktop images which a user accesses retains (e.g., includes) user configured or stored data during a session, like installed applications, files, settings, etc. and in a non-persistent configuration an assigned desktop image may be clean-slated on logout or selected from a pool of desktop images and user configured or stored data during a session is not saved or periodically wiped.

In an example VDI environment, a user may utilize a mobile device 101 to scan a code, like an optical code, like a QR code, or otherwise obtain a code as described herein that corresponds to a VDI or workstation session. The mobile device 101 may parse the code, which may indicate information about a relying party 145 which hosts one or more virtual machines within the VDI environment. For example, the code may indicate server information and a domain, such as for the relying party 145 or a relying party server. The code may also indicate information corresponding to a public key unique to the relying device 140, and other identifying information for requesting authentication to login. In some embodiments, information may be provided for the authentication server 155, rather than a relying party 145 server. For ease of explanation, an example is provided with respect to the illustrated authentication server 155 in reference to FIG. 5. After obtaining information from a code, which may be a code associated with a relying device 140 or a virtual desktop, or virtualized application, which may be displayed by the relying device, the mobile device 101 parses the code to obtain identifying information corresponding to a server, like the authentication server 155, and identifying information corresponding to the asset which the user desires to access (e.g., a virtualized desktop, a virtualized application, or the relying device 140, which may display a login screen to access a virtualized desktop, application, or one or more thereof). Based on the server information, such as in step 503, the mobile device 101 may transmit a request to the server, like the authentication server 155. For example, the mobile device 101 may transmit the identifying information for the asset which the user is attempting to access and request a policy governing access to the asset. In turn, the authentication server 155 may return an authentication policy for that asset. In some cases, the authentication server 155 may obtain the policy from a relying party 145, or, as noted above, the identifying information for a server may be that of the relying party 145 from which the mobile device 101 may request the policy.

Upon receiving the policy, the mobile device 101 may authenticate in accordance with the policy, such as with the authentication server 155 as indicated in step 507. Additionally, the mobile device 101 may transmit an encrypted user certificate, such as encrypted with the public key obtained via the code. Thus, for example, the asset to which the public key corresponds, or which is hosting the asset, and which maintains a corresponding private key, may decrypt the user certificate. In turn, the user certificate may be presented to one or more services 175, and a session to a virtualized desktop or application may be issued to the relying device 140 presenting the user certificate. A server, like a relying party server 145, hosting one or more virtual machines, may select a desktop image corresponding to the user certificate (e.g., in a persistent configuration) or select a desktop image from a pool (e.g., subject to verification of the user certificate in either instance). In the example of a virtualized desktop, the public key may correspond a given relying device 140 and the private key is maintained by the relying device 140

In some embodiments, the authentication server 155 or services 175 may utilize one or more local databases or networked databases, such as one or more repositories (e.g., like an authentication repository 165). In some embodiments, the authentication server 155 or services 175 may each, or individually, utilize a combination of databases. For example, many entities may store some data locally or via networked datastore and some data within a distributed datastore.

Mobile Initiated Authentication to a Web-Based Service Provider

Figure 6:
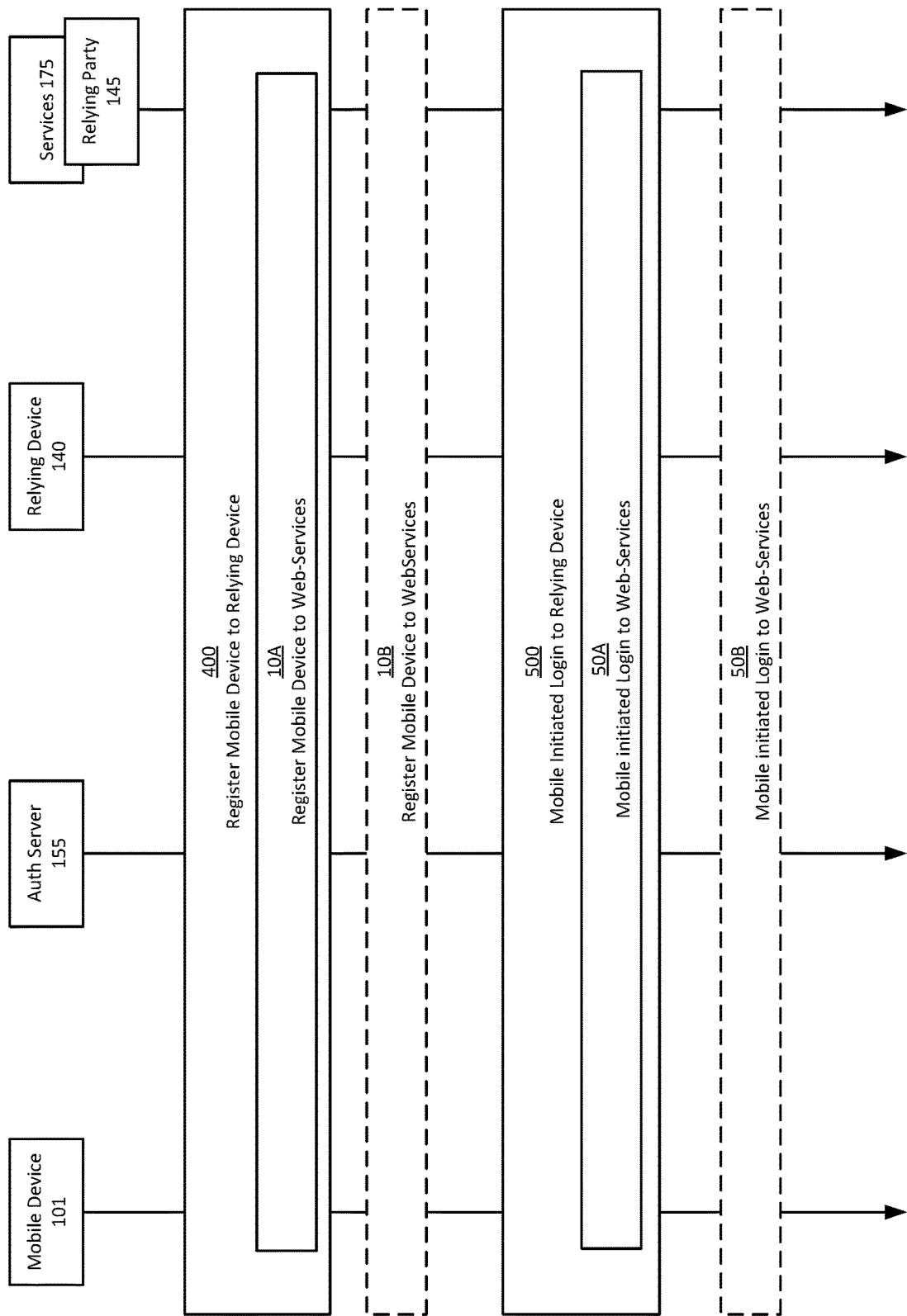
FIG. 6 and FIG. 7A and FIG. 7B are diagrams showing example processes for mobile initiated authentication to a web-service within example computing environments described in the present application.

FIG. 6 is diagram showing example diagram for mobile initiated authentications within example computing environments described in the present application. FIG. 6 illustrates contexts within which mobile initiated authentications to web-services may be implemented. In some examples, mobile initiated authentication may be implemented in connection with mobile initiated authentications to relying devices. Embodiments of the processes illustrated in FIG. 6, which may include one or more of the corresponding processes, may occur within an example computing environment, such as the example computing environment 100 illustrated in FIG. 1.

An example mobile device 101 is shown. Examples of a mobile device 101 may include an application like an authentication application 120, or other native application 125 configured to perform at least some of the disclosed operations, according to at least some embodiments described herein. In addition, the mobile device 101 may include a trusted execution environment operable to collect, store, or process at least some of the data described below, according to at least some embodiments described herein.

An example authentication server 155 is shown. Examples of an authentication server 155 may include various services and application programming interfaces by which authentication information and other data may be communicated between the authentication server and other entities. Additionally, the authentication server 155 may be configured to perform at least some of the disclosed operations, according to at least some embodiments described herein. An example services 175 is also shown. In some embodiments, the authentication server 155 may include one or more services, such as authentication services, which may include services 175. In some embodiments, the authentication server 155 may include one or more services 175, but not others. For example, services 175 may include services external to the authentication server 155, such as services provided by or relied upon in some cases by various relying parties 145. The authentication server 155 may provide a relying device with authenticators by which the relying device 140 may obtain access or authenticate to other services 175 or relying parties 145. Those authenticators may be received from a mobile device or based on authenticators received from a mobile device of the user (e.g., in response to the user authenticating to the mobile device). Broadly, such a collection of relying parties 145 and services 175 may be referred to as web-services which a relying device 140 may utilize (though some or all may also be utilized by the authentication server 155 in some embodiments). In various embodiments, use of services may be comingled, for example, authentication server 155 may provide a first service and services 175 may provide one or more other second services.

An authentication server 155, as described herein, may be implemented in a variety of ways and optionally by different parties. For example, the authentication server 155 may be implemented by a $3^{rd}$ party authentication service which provides authentication services to various parties managing relying devices, by a party managing relying devices (such as to manage user access to relying devices and other resources), or by other parties managing various other resources, like online resources, which relying devices (that may be operated by other parties) or users may authenticate with to access. In some embodiments, the authentication server 155 may be permissioned to determine authentication results on which one or more relying parties 145 rely, or which are accepted by one or more other services 175 external to the authentication server. In various embodiments, an authentication result may confer one or more privileges, such as user access to a relying device, which may extend other privileges to the user, such as user access to one or more resources via the relying device, either natively or via extension (e.g., obtaining permissions based on the authentication result which may include forwarding of the authentication result or other credentials in response to the authentication result).

In some cases, the authentication server 155 may determine a first authentication result to extend user access to a relying device, and may determine one or more second authentications results to extend to the relying device access to one or more web-services of a relying party 145 or services 175. For example, services 175 may include services external to the authentication server 155, such as services provided by or relied upon in some cases by various relying parties 145. In some cases, the authentication server 155 may provide a relying device authenticators by which the relying device 140 may obtain access or authenticate to other services 175 or relying parties 145. Broadly, such a collection of relying parties 145 and services 175 may be referred to as web-services which a relying device 140 may utilize (though some or all may also be utilized by the authentication server 155 in some embodiments). In various embodiments, use of services may be comingled, for example, authentication server 155 may provide a first service and services 175 may provide one or more other second services.

Example web-services like relying parties 145 and services 175 are shown. In some cases, the authentication server 155 may be an identity provider (e.g., as a service provided by the authentication server) trusted by one or more (e.g., other, $3^{rd}$ party) web-services. In other words, one or more services 175 external to the authentication server 155 and other relying parties 145 may provide access to entities, like relying devices 140, based on authentication results determined by the authentication server. For example, one or more services 175 or relying parties 145 may accept an authenticator, like a token or ticket indicative of an authentication result determined by the authentication server 155, verify the token or ticket, and provide access to web-services responsive to the verification result. For example, a mobile device 101 may authenticate with the authentication server 155 for conferring access to one or more web-services to a relying device 140, the authentication server 155 may pass an authenticator or other information indicative of authentication results to the relying device 140 in response to a successful authentication, and the relying device 140 may present the information to the corresponding web-services provider (e.g., a service 175 or relying party 145) to access the web-services.

An example relying device 140 is shown. Examples of a relying device 140 may include a workstation which one or more users may access, such as to access one or more resources the workstation is configured to or permitted to access for authenticated users. Thus, for example, the relying device 140 may be a client-type device (e.g., like a relying device 140), and the relying device may be configured to access web-services like one or more online resources provided by a relying party 145 or other services 175. Alternatively, the relying device 140 may be a controller or communicatively coupled to a controller which governs physical user access to areas or functions (e.g., valves or machinery or panels) via electrical signals. A relying device 140 may be associated with a relying party, an example of which may include an employer issued workstation where the online resources may include one or more internal resources of the employer. For example, the relying device 140 may be a device of a relying party, such as within a corporate environment. The disclosure, however, is not so limited. Other example relying parties 145 as described herein may provide $3^{rd}$ party services (e.g., $3^{rd}$ party online resources) to the employer which may be utilized by a relying device 140 and example services 175 may be utilized by the relying devices 140, which employees may be permitted to access, such as via the relying device 140 implemented as an employer issued workstation (or other device which relies on or is permitted to access the $3^{rd}$ party services). Access to some of the aforementioned web-services may be conferred to a relying device 140 as the result of a mobile initiated authentication to one or more web-services, such as in lieu of a user manually entering and submitting corresponding credentials via the relying device to a respective web-service (e.g., a given relying party or service). In some cases, one or more resources may be locally stored and executed by the relying device 140, like an application 110, but which may implement one or more DRM controls to permit user access, such as by online-DRM checks to a web-service.

Although not shown, examples processes may begin with the obtaining of an authentication application on the mobile device 101. Examples of obtaining the authentication application on the mobile device may include a preloading of the authentication application on the mobile device 101 or downloading of the authentication application to the mobile device from an application repository. The mobile device 101 may execute the authentication application, such as by loading the authentication application in a memory of the mobile device and executing the authentication application by a processor of the mobile device. In some embodiments, a memory and a processor of the mobile device 101 may be configured for the execution of applications within a client execution environment (CEE), which may be isolated from a trusted execution environment (TEE) of the mobile device. The TEE may include a secure memory and co-processor not accessible by applications or processes executing within the CEE. For example, an application executing within the CEE may be required to securely communicate with an interface of the TEE to request data from and request processing of data within the TEE, and the interface may respond to various requests based on verification of certain criteria.

Accordingly, an application (or other process) within the CEE may be prevented from accessing the TEE other than by communications over a secure session via the interface, and the TEE may restrict which values may be returned in a response. For example, actual user credential values may not be divulged but rather a representation of credential, such as cryptographic representation, like a cryptographic hash of a credential or encrypted credential (via either symmetric or asymmetric encryption protocol) indicative of the credential may be provided in a response. Similarly, an authentication result on a credential may be provided in a similar fashion, such as by returning a representation of the credential on which the user authenticated and a signed result (or other data, such as a signature of the representation by which the user authenticated) indicative of the authentication result. In some embodiments, the authentication application is configured to interface with the TEE of the mobile device 101, such as via an application programming interface (API) configured to exchange data between the CEE and the TEE. The exchange of data via the API may occur by way of one or more requests and responses, each of which may contain data. In some embodiments, to increase security of communications between the TEE and the authentication application within the CEE, the authentication application is configured to establish a secure session, e.g., a secure channel of communications, with the TEE. The secure session may be considered secure by way of encryption of data communicated between the authentication application 120 and the TEE.

In some embodiments, process 400 (e.g., as described in more detail with reference to FIG. 4) registers a mobile device 101 to a relying device 140 for mobile initiated authentications of the user to access the relying device. In some cases, a process 10A (e.g., as described in more detail with reference to FIG. 7A) registers a mobile device 101 to one or more web-services for mobile initiated authentications of the user to access those web-services by the relying device. In some cases, process 10A may be performed on a per-relying device 140 basis. In other words, when a mobile device 101 of the user is registered to a relying device 140 as described in the context of process 400, the user may subsequently, or as a component of the process 400, register the mobile device to one or more web-services the user desires to access with the relying device 140. In some embodiments, credentials for those web-services to which the mobile device 101 has registered by process 10A are stored in association with other data corresponding to the relying device 140 generated during process 400. In some cases, those credentials may be specific to authentications via the mobile device 101 to confer access to the web-services that relying device 140 may access.

Additionally, as shown, a process 10B (e.g., as described in more detail with reference to FIG. 7A) may register a mobile device 101 to one or more web-services for mobile initiated authentications of the user to access those web-services by a relying device 140. In some cases, the relying device 140 may be a relying device to which the mobile device 101 has registered to under process 400. In some cases, a process 10B (or process 10A) to register the mobile device 101 to one or more web-services need not be specific to a given relying device. For example, a user may utilize an authentication application of the mobile device 101 to register the mobile device to one or more web-services as indicated by process 10B, and the registration may be valid for one or more relying devices to which the mobile device 101 also registers under process 400. For example, those web-services to which the mobile device 101 is registered may be indicated as available for mobile initiated authentications for one or more relying devices 140 to which the mobile device 101 registers (e.g., later) or is already registered. In some embodiments, such as via an interface of an authentication application of the mobile device 101, the user may elect for which relying devices 140 which web-services the mobile device is registered to, or registers to, should be enabled for mobile initiated authentications.

In some embodiments, process 500 (e.g., as described in more detail with reference to FIG. 5) may authenticate a user of a mobile device 101 to access a relying device 140 (e.g., to which the mobile device is registered under process 400) by a mobile initiated login. In some cases, a process 50A (e.g., as described in more detail with reference to FIG. 8) may authenticate a user of a mobile device 101 to one or more web-services by mobile initiated authentication of the user to access those web-services by the relying device the user has been authenticated to access. For example, a web-service (or web-services) which the user may request mobile initiated authentication to in process 50A may include one or more of the web-services for which the mobile device 101 registered in process 10. In some cases, process 50A may be performed on a per-relying device 140 basis. In other words, when a user is authenticated to access a given relying device 140, the user may subsequently, or as a component of the process 500, mobile initiate login to one or more web-services (e.g., to which the mobile device is registered under process 10) the user desires to access with the given relying device 140. In some embodiments, credentials for those web-services to which the mobile device 101 may elect to mobile initiate login to are stored in association with other data corresponding to the relying device 140. In some cases, those credentials may be specific to authentications via the mobile device 101 to confer access to the web-services that relying device 140 may access. In the context of process 500, in some embodiments, the user may elect, such as via an authentication application of the mobile device 101, which additional web-services to authenticate to by process 50A. In some embodiments, an authentication result determined by the mobile device 101 (e.g., within the TEE) in association with process 500 may be utilized in a process 50A. For example, authentication of the user by the mobile device 101 to permit generation of results for verification by the authentication server 155 or other entity may be considered valid for a process 50A when implemented in connection with process 500, and some steps of process 50A may be omitted (e.g., rather than performing redundant user authentications to the mobile device 101).

Additionally, as shown, a process 50B (e.g., as described in more detail with reference to FIG. 7B) may authenticate a user of a mobile device 101 to one or more web-services by mobile initiated authentication of the user to access those web-services by a relying device 140. For example, a web-service (or web-services) which the user may request mobile initiated authentication to in process 50B may include one or more of the web-services for which the mobile device 101 registered in process 10. In some cases, a process 50B (or process 50A) to authenticate the user of the mobile device 101 to one or more web-services need not be specific to a given relying device. For example, a user may utilize an authentication application of the mobile device 101 to authenticate via the mobile device to one or more web-services as indicated by process 50B, and the authentication results may be valid for a relying device issued a user session for the user. As described in relation to process 500, a session for the user may be issued to a relying device 140 as a result of a mobile initiated authentication. However, in many cases, a user may login to a relying device 140 by other means, such as by entering credentials into the relying device, optionally with out-of-band authentication by the mobile device (e.g., rather than mobile initiated). In either instance, a session for the user may be issued to the relying device 140 by an authentication server 155, or alternatively, such as in cases of a user providing credentials to a relying device 140, the relying device may report user login (e.g., a user session). Accordingly, the authentication server 155 may track active sessions of different users with respective relying devices 140. In turn, when a user requests mobile initiated authentication 50B to login to a web-service via their mobile device 101, the authentication server 155 may identify the relying device 140 to which an authenticator for the web-service should be transmitted. For example, the authentication server 155 may transmit over a secure session with the relying device 140 an authenticator for the web-service (e.g., to which the user authenticated to via the mobile device) and instructions for the relying device to present the authenticator to the web-service, thereby permitting the user to access the web-service via the relying device.

Examples of processes 10 and 50 are discussed in more detail below and one or both of the processes may be incorporated within or implemented in connection with other authentication processes described herein, such as mobile initiated authentication processes by which a user initiates authentication to access a relying device. Examples of processes 10 and 50 may also be implemented in connection with more traditional authentication techniques, such as by a relying device 140 reporting user-level account access events to the authentication server 155 such that the authentication server may identify which relying device to transmit authenticators for accessing web-services.

Figure 7A:
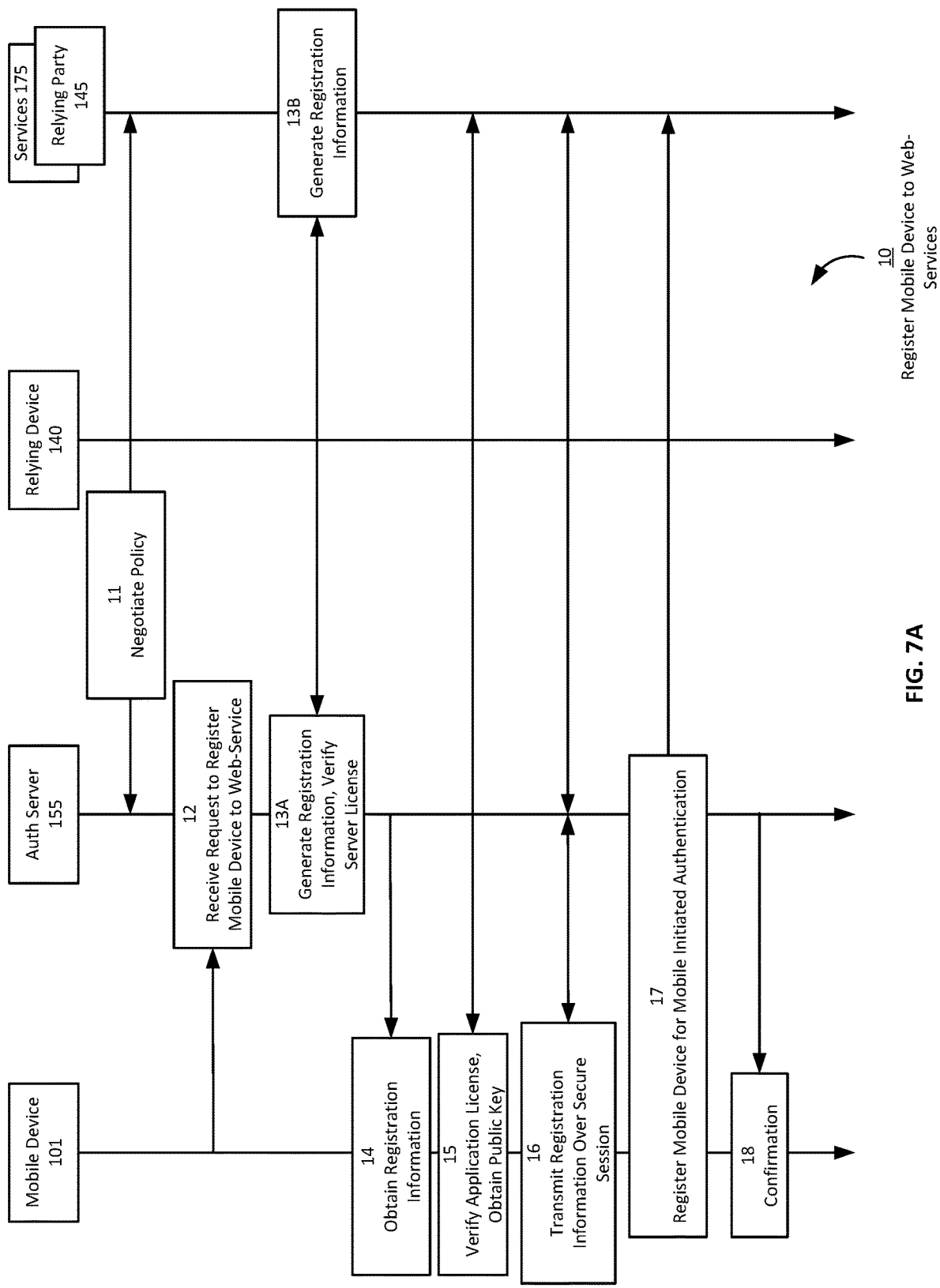

Example Process for Registering a User for Mobile Initiated Authentication to a Web-Based Service Provider FIG. 7A is a diagram showing an example process 10 for registering a mobile device with a web-service to permit mobile initiated authentications to web-services for access by a relying device within example computing environments described in the present application. Embodiments of the process 10, which may include one or more of the illustrated steps, may occur within an example computing environment, such as the example computing environment 100 illustrated in FIG. 1. Process 10 may be implemented in the context of other authentication operations as described with reference to example processes 10A and 10B in FIG. 6. Some example implementations of process 10 may share some steps with other processes described herein, like process 200 of FIG. 2 or process 400 of FIG. 4.

In some embodiments, process 10 begins with a step 11 that includes an authentication server 155 negotiating 11 a policy with a web-service, like a service 175 or a relying party 145. Policy negotiation 11 may include the establishment of a policy by which a web-service accepts authentication results determined by another entity, like the authentication server 155. For example, a policy may specify one or more rules with which determination of an authentication result must comply to be accepted by the web-service. The authentication server 155 may be "trusted" by the web-service, e.g., as an identity provider, to enforce a policy of the web-service or a policy compliant with the web-service such that the web-service may rely on those authentication results.

Authentication results may be conveyed in a variety of ways. For example, a web-service may accept an authentication value determined by the mobile device 101 or authentication server 155, and which may be signed by both entities, and accepted by the web-service upon signature verification. For example, the web-service may accept a generated token (e.g., as an authentication value) which when presented to the web-service by a relying device 140 the web-service permits the relying device access to the web-service. In some embodiments, an authentication value may also be signed by a relying device 140. A policy may specify rules by which a user may authenticate via the mobile device 101 (e.g., with the authentication server 155) to convey access to the web-service by the relying device. Examples of authenticators as described herein may include user certificates, tokens, tickets, or other credentials (or representations of credentials) to which one or more cryptographic techniques may be applied (or generated by application thereof). For example, data may be signed to generate signed data and a receiving entity may verify that the signed data corresponds to received data by signature verification, and the received data may be encrypted by a public key of the receiving entity to mitigate leakage of data (e.g., the receiving entity securely maintains the corresponding private key of the public-private key pair such that other entities cannot decrypt data encrypted by the public key). In some embodiments, policy negotiation 11 may include the exchange of one or more public keys between the public server and the web-service, or obtaining of respective public keys or certificates from another trust (or certificate service) by which the authentication server 155 and relying party 145 may securely exchange data or verify signed data. A poly 11 may also specify a service or protocol to which the exchange of authenticators, like credentials corresponding to user access of the web-service, may be communicated. For example, the exchange or conveyance of credentials may conform to or be based on protocols such as ID Connection, open ID, or SAML, and may be specified by the policy governing mobile initiated authentications to the web service.

As shown, web-services may include various services 175 and relying parties 145 for which the authentication server 155 is permitted to serve as an identity provider, and which the various web-services may trust to provide authentication results. A web-service may provide functionality to users of authorized user accounts and, in some cases, authorized user accounts on authorized relying devices (or virtual desktop images). For example, if a user utilizes multiple relying devices 140, a web-service may support only one or a subset of those relying devices, or one or a subset of desktop images executed by a relying device, and not necessarily all. Accordingly, different web-services may be associated with different policies, which may include different rules. Some rules may be similar to those described with respect to polices that are enforced with respect to relying devices 140 as previously described herein. In some embodiments, by virtue to the relying device 140 presenting authenticators to a web-service for verification, the web-service may be ensured that user access policy to the relying device 140 has been met in addition to any additional policy requirements negotiated 11 by the web-service. In may cases, the negotiated policy 11 may be valid for a plurality of users having user accounts with the web-service and provided for selection to a user of a mobile device 101 to register for mobile initiated authentications to the web-service. In some cases, a web-service may convey access to a plurality of relying parties 145 or other services 175, such as where the web-service is an identity provider for one or more other web-services. In such cases, the relying device 140 may present authenticators to authenticate to a web-service also severing as an identity provider itself which may convey privileges to those other relying web-services, and the authentication results may comply with a policy of the web-service to which those other relying web-services already trust.

As shown in process 10, the authentication server 155 may receive 12 a request to register a mobile device (e.g., of a user) for mobile initiate authentication to a web-service. In some cases, the mobile device 101 includes an authentication application that provides a user interface by which a request to register the mobile device may be received in step 12. For example, the authentication application may present an interface indicative of which services a user may elect to register the mobile device to after the mobile device is registered to at least one relying device 140. In some embodiments, the authentication application may present the interface when a user selects a given relying device 140 for which mobile initiated authentications to one or more web-services are permitted and provides a user input to register to one or more of those web-services. In some embodiments, the user may elect to register the mobile device 101 to one or more web-services prior to registering the mobile device with a relying device. For example, after the authentication application is installed and a user account is registered with the authentication server 155 an option may be provided by the authentication application for the user to register to one or more web-services. In such cases, some web-services may only be available to some relying devices 140 to which the user has access, but not all, such as based on a policy of the web-service or policy governing the relying device.

Example interface(s) generated by the authentication application for display on the mobile device 110 may include one or more human interface elements indicative of the registration process, and the mobile device 101 may detect the user interaction to transmit the request represented by step 12 that is received by the authentication server 155. In some embodiments, indications of different web-services, such as different interface elements depicting logos of the respective web-service may be provided to the mobile device 101 for presentation by the authentication application. For example, subsequent to the establishment of a policy governing a web-service, the authentication server 155 may transmit a logo or other identifier to be displayed in connection with (or as) a user interface element within the authentication application on the mobile device 101 which the user may interact with to cause the transmission of the request received the authentication server in step 12. The request of step 12 may indicate one or more web-services with which the user desires to register the mobile device 101 for mobile initiated authentications. For example, a request 12 to register the mobile device to a web-service may include an identifier associated with the web-service.

In response to receiving a request to register a mobile device, the authentication server 155 may generate registration information 13A in accordance with a policy associated with web-service indicated by the identifier. For example, the authentication server 155 may generate a registration information including a registration value. Registration information may include multiple components, such as an identifier of the mobile device 101 and a registration value (which may change for different registration requests, and thus be tied to a specific request in time). In some embodiments, the authentication server 155 may pass the registration value to the web-service such that the registration value is known to the web-service. In some embodiments, the authentication server 155 may request a registration value from a web-service, in which case the service 175 or relying party 145 may generate 13B the registration value. In turn, the authentication server 155 may receive the registration value from the web-service, which is known to the web-service (and may change for different registration requests, and thus be tied to a specific request in time). Embodiments of the registration value may be a randomly generated value or deterministic value (e.g., like an encrypted registration value, or hash of a registration value). An example of a deterministic registration value (e.g., like a cryptographic hash value) may be based on a record of the mobile device or other account information associated with the user, which may be maintained by the authentication server 155 or web-service, and identified in association with the request 12, such as by an email or username or other identifier associated with the user).

In some embodiments, the authentication server 155 may verify a server license 13A to operate as an identity provider for the identified web-service, such as with the web-service or other entity. In step 13A, the authentication server 155 may, in some embodiments, verify (or renew) a license with one or more web-services. The authentication server 155 may verify a license in response to receiving a request to register a mobile device with a given web-service. For example, in various implementations, relying devices 140 and authentication servers 155 may be deployed by businesses which utilize software licensed by other developers of computer program code. In turn, a deployed authentication server 155 may verify a license with a certificate authority service through the developer or through which the developer licenses use of the computer program code executed by the authentication server 155 to the business. Similarly, such certificate authority services may govern access of web-services (or may govern licenses to computer program code or other assets or online resources provided by web-services) utilized by relying devices. Accordingly, example services 175 may include one or more certificate services, like an active directory service, X.509 certificate service, or other trust service.

The authentication server 155 may pass the registration information, such as the registration value, to the mobile device 101. The registration information may also include policy information with which the mobile device 101 must comply to register for mobile initiated authentications to the web-service. For example, authentication server 155 establish a secure connection, or tunnel, such as via TLS/SSL over HTTP, WebSocket, SSH, or other protocol, with the mobile device 101 (or vice versa) to facilitate the secure exchange of data between the mobile device 101 and the authentication server 155. The authentication server 155 may exchange data securely in a similar fashion with web-services and relying devices 140.

In step 14, the mobile device 101 obtains registration information from the authentication server 155. For example, the mobile device 101 may obtain the registration value and other associated registration information, like a policy, or rules of the policy associated with the web-service in response to a transmitted request to register the mobile device with the web-service. In some embodiments, the registration information may also include an identifier corresponding to a relying device 140 (e.g., to which the mobile device 101 is registered such that a relying device which will be conveying an authenticator may be identified to (and later by) the authentication server 155) or devices for which the user is permitted to initiate an authentication to the web-service via the mobile device and that the relying device(s) are permitted to access. As an example, some relying devices 140 may be permitted to access a web-service providing personal email accounts and another may not be permitted to access such a service, yet both relying devices may be permitted to access some other services. Thus, for example, the authentication application may indicate which web-services for which relying devices (e.g., based on the relying device identifiers) the mobile device is registered that the user may mobile initiate authentication. Further, in some cases, a web-service may also match a registration identifier of a relying device 140 with an identifier of the relying device conveyed in association with an authenticator during a mobile initiated authentication—however, the web-service may alternatively trust the authentication service 155 to make such determinations in an authentication process based on a policy like that noted above. In some embodiments, the registration information includes a public key (e.g., that of the authentication server 155 or web-service) by which the mobile device 101 may encrypt data conveyed to the respective entities. The mobile device 101 may obtain registration information from multiple sources, such as a registration value from one source (e.g., the authentication server 155 in response to request 12) and a public key from another source (e.g., the web-service or vice versa) or from one source (but which in some cases may be conveyed by an intermediate entity). In some embodiments, the mobile device 101 is configured to obtain registration information or a portion thereof within the TEE of the mobile device and, in some embodiments, the TEE may process at least some registration information, such as to sign a registration value by a private key of the TEE, to indicate that the registration value was determined by the TEE.

In some example embodiments, in step 15, the mobile device 101 may verify a license, such as a license associated with the authentication application. For example, in a step 15 the mobile device 101 may transmit a request to a service 175, such as the service 175 with which the authentication server 155 is verified, to verify a license associated with the authentication application. In some embodiments, the service 175, such as a certificate service, may provide one or more public keys (e.g., upon request) to a first entity that correspond to another entity registered (or active) with the service such that the first entity may securely transmit data. Thus, for example, the mobile device 101 may obtain one or more public keys associated with the authentication server 155 or a given web-service from the service 175 (e.g., instead of, or to verify public keys obtained in association with registration information in step 14). In some embodiments, obtaining a public key for the authentication server 155 or web-service may be dependent upon whether the authentication application is licensed. Additionally, in some embodiments, the authentication application may be licensed in association with a given application server 155 such that revocation of the certificate for the authentication application may revoke privileges of the mobile device (e.g., if lost, stolen, or otherwise).

In step 16, the mobile device 101 may transmit registration information corresponding to the web-service, such as the obtained registration value signed within the TEE, and a public key of the mobile device 101 by which other entities may verify the signature. In various embodiments, the authentication server 155 maintains a device record of the mobile device 101 and may store the public key by which the signed data can be verified. The mobile device 101 may also transmit credentials for the web-service, such as encrypted by a public key obtained for the web-service (or authentication server). The TEE may obtain the credentials in a secure fashion, such as via user input (e.g., username and password or other expected credential) into the TEE, and sign the encrypted credential values to indicate secure processing thereof. The credentials values which are encrypted by public key may be deterministic values based on input credential values, such as by the TEE generating one or more cryptographic hashes of input credential values according to a specified hashing algorithm. In some cases, these encrypted credentials may be transmitted over a secure session with the authentication server 155, which may subsequently verify signed data and pass the credentials over a secure session to the web-service, such as in response to verifying the signed registration value and signed encrypted credentials.

As noted above, the mobile device 101 may establish a secure session with the authentication server 155, such as based on an obtained public key, for the secure transmission of registration information. For example, the mobile device 101 and authentication server 155 may establish a secure session by the mobile device 101 transmitting a session key encrypted by the obtained public key to facilitate the exchange of information. In some embodiments the session key may be the registration value, but may alternative be another value generated in accordance with a protocol for establishing the session. The secure session may be HTTP over TLS/SSL, SSH, WebSocket over TCP, or other secure connection type by which the mobile device and authentication server 155 may exchange data, like registration information. In some cases, the mobile device 101 may encrypt the registration information, such as a registration value, with the obtained public key of the authentication server 155, or may encrypt the registration value in accordance with a protocol of the secure session. In some cases, the mobile device 101 may sign data transmitted to the authentication server 155, such as by a private key stored within the TEE for which the authentication sever may obtain a public key for verifying the signature (e.g., the private key may correspond to a public key associated with the license of the authentication application which the authentication server may request from a service 175 to verify the signature). The authentication server 155 may establish a secure session with the web-services in a similar fashion to pass registration information, or vice versa in some embodiments. In some examples, the authentication server 155 may pass the encrypted credentials to the web-service for verification and receive a result of the authentication. The authentication server 155 may obtain information (e.g., over secure session from the web-service) by which credentials may be verified, such as cryptographic hashes of credentials generated by a same cryptographic function performed by the web-service as that performed by the TEE of the mobile device 101 over the input credentials. In some example embodiments, the cryptographic hashes may be generated based on hashes of input credentials and another value, like the registration value, such that the authentication server 155 may verify credentials without receiving actual credential values (cryptographic hash or otherwise) accepted by the web-service.

In some embodiments, the authentication application of the mobile device 101 may cause the mobile device to request a secure session with the web-service (e.g., instead of, or in addition to, the authentication server) by which credentials and the registration value may be provided to the web-service for verification. For example, the authentication application may cause the mobile device 101 to request a resource of the web-service, like a uniform resource locator (URL), which may include an interface via which credential values and the registration value may be provided in a secure fashion to the web-service. In some embodiments, the URL may be provided to the mobile device 101 with registration information in step 14. In some embodiments, the URL may be based on the registration value, like a domain of the web-service followed by the registration value or deterministic value based on the registration value like a cryptographic hash or token value corresponding to the registration value (or other value, such as a certificate value or deterministic value based on a certificate) which may redirect the authentication application (or a browser enabled element) to another URL including an interface by which the user may input credentials. In examples where credentials are provided to the web-service for verification, the web-service may provide (e.g., via secure session) to the authentication server 155 a verification result corresponding to the user of the mobile device based on received credential values.

In step 17, the authentication server 155 may verify received registration information and determine to register the mobile device for mobile initiated authentication. The authentication server 155 may verify all or some of the registration information received from the mobile device 101, such as by signature verification indicative of processing of the received information by the TEE of the mobile device and matching of received values from the mobile device with expected values (e.g., as determined by the authentication server or received from the web-service). For example, the authentication server 155 may verify received information by signature verification based on expected data, signed data, and the corresponding public key of the mobile device 101. In some examples, the web-service may verify a portion of the registration information, which may be passed to the web-service by the authentication server 155 or provided to the web-service by the mobile device 101. The web-service may determine an authentication result based on the received portion of the registration information and provide the result to the authentication server 155, such as by signing data, like a result, or other value by a private key of the web-service and which the authentication server may verify by signature verification based on expected data, signed data, and the corresponding public key of the web-service. Accordingly, permission of the user of the mobile device 101 to access the web-service may be verified prior to registering the mobile device for mobile initiated authentications to the web-service.

Additionally, in step 17, the mobile device 101 and authentication server 155 may participate in a registration operation. The registration operation may include the secure exchange, such as over a secure session, of a public key corresponding to a private key stored within the TEE of the mobile device. In some embodiments, the authentication server 155 may be configured to retrieve a public key corresponding to a licensed authentication application of the mobile device 101 from a service 175, like a certificate service, and may challenge the mobile device to a proof of knowledge, such as knowledge of the corresponding private key, like in a challenge-response. For example, the mobile device 101 may sign specific data within the TEE by the private key and the signed data may be transmitted to the authentication server for verification based on the public key (e.g., according to a signature verification algorithm). The above information may be received in a prior step via secure channel by the authentication server 155, verified, and need not be obtained again in step 17. In some embodiments, a new private key may be generated or obtained within the TEE for utilization in association with the web-service, and a corresponding public key may be provided via the secure channel to the authentication server.

The mobile device 101 may also provide other information over the secure session established with the authentication server 155, such as representations of credentials. One or more steps of the registration operation discussed below may be optional, such as in instances where the mobile device 101 is already registered with the authentication server 155, in which case the authentication server 155 may maintain a record for the user which may include one or more representations of user credentials, public keys, etc., for authentication operations. In some case these representations and public keys may be used for multiple web-service, relying devices or other authentication operations, however, some of the representations or public keys may be reestablished in some instances, or by default, depending on implementation. Additionally, new credentials and representations of those user credentials may be established in accordance with a policy 11 for authentications to a given web-service.

Registration operations discussed at step 17 may occur in a variety of different ways depending on the embodiment, and some registration operations of step 17 may occur prior to the process of FIG. 7A. For example, after obtaining an authentication application on the mobile device 101 and prior to the process of FIG. 7A, a user may have registered or established an identity according to one or more steps described with reference to FIG. 2 or steps of FIG. 4, such as where registration to web-services are performed in connection with registration of the mobile device to a relying device, establishment of a user record, or combinations thereof. For example, registration may be performed in association with establishing an identify of a user or other record of the user with an authentication server. Likewise, user credentials established within a TEE of the mobile device 101 in association with such a registration process may be subsequently utilized. In some cases, a user may have a registered account or other federated identity to which the user may authenticate to in the registration process. Thus, in some cases, the mobile device 101 may submit a knowledge proof (e.g., signature of some data in step 16 or 17) or respond to a challenge for a knowledge proof (e.g., in step 17).

In some embodiments, such as in association with a registration step 17 or prior to the illustrated process 10, an authentication application may be configured to cause the mobile device 101 to request establishment of a user account record within an identity management system, which may correspond to the authentication server 155 and optionally one or more other services 175. For example, upon execution of the authentication application within the CEE, the authentication application may cause the mobile device 101 to prompt the user indicate whether the user desires to create a user account records. If the user desires to create a user account record, the authentication application may cause the mobile device 101 to generate a request for transmission by the mobile device to a server, such as authentication server 155.

In some embodiments, such as in association with a registration step 17 or prior to the illustrated process 10, the authentication application performs one or more steps similar to those previously described with reference to FIG. 2 (e.g., in process 200) to establish data (e.g., credentials or private keys) within the TEE and receive data (e.g., representations of credentials or public keys) from the TEE, and transmit the received data to the authentication server 155. For example, the mobile device, TEE, and authentication application may perform one or more steps, like steps 220-228 of process 200, as described with reference to FIG. 2. Those steps may also include the exchange, storage, and generation of the additional data discussed above and discussed elsewhere throughout the application, such as with reference to FIG. 2, for the establishment of a record of a user, which may be a federated identify record of the user.

In other words, various aspects of disclosed registration and identity establishment techniques and variations on such techniques are applicable to a registration process like that described below in reference to step 17 of process 10. For example, operations like those described with reference to FIG. 2 may be utilized to establish a federated identity record, but should not suggest that other federation technique may not be utilized. Examples of which may include FIDO and FIDO2 standards, and those standards may be similarly augmented with techniques like those disclosed herein. In some example embodiments of registering a mobile device 101 for mobile initiated authentication to a web-service, new or other representations of credentials may be established in association with a federated identity, such as in accordance with a policy 11 which may differ from that governing the federated identity. In turn, those representations of credentials may be verified (e.g., in addition to, instead of, or as a result of authentication to the federated identity) for authentication to a web-service.

The mobile device 101, as described above, such as over the secure session, may communicate registration information to the authentication server. An authentication application may cause the mobile device 101 to transmit information indicative of the mobile device or user, such as in cases where the mobile device has previously registered with the authentication server. For example, the authentication server may store a record corresponding to the user and which includes information about the mobile device, such as device information and a public key corresponding to a private key stored within the TEE of the mobile device. The user record may additionally include one or more representations of credentials established within the TEE of the mobile device 101. The authentication application may cause the TEE to sign, within the TEE, data which may be transmitted to the authentication server 155, by which the authentication server may verify the mobile device as a registered mobile device (e.g., previously). In order to generate the signature, the user may be required to authenticate on the mobile device 101, such as by providing one or more credentials for verification within the TEE. Accordingly, the authentication server 155 may verify the signed data in accordance with a signature verification algorithm based on the public key and the data which was signed, such as a representation of a credential on which the user authenticated with the mobile device. The authentication server 155 may access a user record, such as by mobile device identifier, indicated user record, or by a public key provided by the mobile device 101. The authentication server 155 may access a record based on the received information, such as to obtain the public key associated with the record (or ensure a match thereof) and obtain a stored representation of the credential for performing the verification of a previously registered mobile. The data which was signed may include a timestamp which may be communicated to the authentication server 155 (or other temporal data, like challenge data, provided by the authentication server) and by which the authentication server may verify temporality of the signed data to a current system time (or a timestamp associated with the receipt of registration information from the relying device 140).

If the mobile device 101 is not previously registered, e.g., there is no record of the device for a user record, the authentication server 155 may request the mobile device 101 provide information like that described above. In instances where no record of the user exists, additional information may be requested, such as to establish a user record, and verify privileges associated with the user to access or register a managed relying devices 140 from which a web-service will be accessed. Further, in some examples policy governing mobile authentication to the web-service may require the mobile device 101 to establish new credentials corresponding to the web-service. In either instance, the authentication server 155 may request the mobile device 101 provide a public key and representations of credentials by which a record of the device for registration with the web-service may be established for the user. The authentication application executing on the mobile device 101 may request, to the TEE, establishment of a private key within the TEE, or request a public key which may cause the generation of a private key within the TEE, or the TEE may provide a public key corresponding to a private key already established within, stored, or otherwise of the TEE. In each case, the TEE maintains the private key within a secure memory and not divulge the private key. In some cases, the TEE may output a generated result (e.g., a generated public key corresponding to a generated private key) from within the TEE, and provide a public key associated with a secure processor (or other secure element) of the TEE (which may output signed data) such that secure processing of data on which the result is based may be verified (e.g., that the public key may be verified as corresponding to a securely generated private key that is maintained within the TEE). In some embodiments, the authentication application may verify the public key output by the TEE as securely generated. In turn, the authentication application may cause the mobile device 101 to transmit the public key to the authentication server 155, and optionally include data by which the authentication application may verify the public key as securely generated. With a public key established for the mobile device 101, for which the corresponding private key is secure within the TEE, the authentication server 155 may verify other data received from the mobile device 101, such as by signature verification, and encrypt data which may be transmitted to the mobile device 101 for processing within the TEE. In some embodiments, different public keys are utilized for the different operations, in which case multiple public keys may be generated in accordance with the above processes.

The authentication server 155 may request the mobile device 101 generate representations of credentials corresponding to the user. In some cases, the user may establish one or more credentials from which the representations are generated, such as where those credentials differ from ones already established within the TEE, are more secure, or otherwise. For example, the authentication server 155 may request a set of representations, each representation corresponding to a different credential in a set of credentials. The authentication application may request, to the TEE, establishment of one or more credentials (e.g., the set of credentials) within the TEE. The authentication server 155 may provide a policy with which one or more of the credentials must comply, e.g., a pin length greater than 4 digits, alphanumeric password requirements, whether one or more biometric credentials (or a combination) are permitted, and the like. For example, the authentication server 155 may convey the policy 11 associated with the web-service or one or more policy rules. The authentication application may provide the policy requirements to the TEE in association with respective credentials for establishment within the secure memory of the TEE. In turn, the authentication application may request a representation of an established credential, such as a cryptographic hash of a credential. The TEE may output a representation of the requested credential, and may also provide a result indicating whether the credential complies with the policy (although in some cases the TEE may prevent the user from providing a credential which does not comply with the specified policy requirements). In some embodiments, the TEE may output signed data such that the authentication application or authentication server 155 may verify the secure generation of data output by the TEE. For example, after establishment and verification of the private key within the TEE, the TEE may sign outputs, such as results (e.g., a representation) or other processed data, with the private key. In turn, the authentication application or authentication server may verify data as being processed or securely generated within the TEE based on corresponding signed data by processing the data, the signed data, and public key by a signature verification algorithm which indicates whether the signing key (e.g., the private key of the TEE) was used to sign the data, and whether the signed data correspond to the data. Thus, the authentication server 155 may receive representations of credentials from the mobile device 101, which may be verified by the above public key or another public key (e.g., that corresponds to a private key of the TEE and which was exchanged in a process like that described above) according to a signature verification technique. In other words, embodiments should not be construed to be limited to a single key-pair, as multiple key-pairs may be created in accordance with techniques like those described above, or that embodiments preclude use of a symmetric encryption protocol with shared key encryption. The authentication server 155 may determine whether the user is authorized to access the web-service, such as based on verification of a result of user authentication to an account with the web-service, which may be determined to be associated with other registration information received from the mobile device based on the registration value. The authentication server 155 may, in some cases, determine whether a relying device 140 which the user is permitted to access (e.g., based on records of relying devices associated with a record of the user) is permitted to access the web-service (e.g., based on a policy governing use of the relying device).

In some embodiments, in step 17, the authentication server 155 may provide information indicative of the registration to the web-service. In some examples, the authentication server 155 may convey data from one or more records established or populated as result of the registration of the mobile device. For example, the authentication server 155 may convey one or more representations of credentials or public keys to the web-service, by which the web-service may verify an authentication request. In some embodiments, the authentications server 155 may obtain a token value corresponding to the user and the mobile device. In some cases, a token value may be a representation of a credential (or combination of credential values) or generated based on a representation of a credential or combination of representations of credentials. In some cases, a token value may be generated based on account information of the user with the web-service. In some cases, a token value may be a user certificate obtained, assigned, or associated with the user account. In some cases, a token value may be generated randomly, or deterministically based on other data, or correspond to other data. Generally, a token may be based on value, certificate, certain data, or based on a combination of data, such as a cryptographic hash value. The token may be conveyed to a web-service by a relying device 140 to obtain access to the web-service. The token may be persisted or generated and signed by one or more entities, such as to indicate possession of a given private key and the token, and the signature may incorporate a timestamp by which temporality of the signature may be verified. Further, a token may incorporate a timestamp, such as in cases where the token is a cryptographic hash of some data or value and a timestamp. A token schema may be specified by the policy 11 negotiated with the web-service. The token schema may specify a format for tokens accepted by the web-service. Accordingly, a token may be generated in accordance with the schema and conveyed to the web-service, which may verify the token. In some embodiments, the web-service may verify a token by signature verification of data signed (e.g., the token) by the authentication server, thereby relying on the authentication server for determining authenticity of the token in accordance with policy (e.g., by verifying the token in accordance the token schema). In some embodiments, the web-service may verify a token in accordance with the token schema, but may additional verify data signed (e.g., the token) by the authentication server, which may sign over data signed by the TEE of the mobile device or sign a result. In one example, a token may include an identifier of a mobile device (or user account), a timestamp, and a signed cryptographic hash value, where the signed cryptographic hash value may be signed by the TEE of the mobile device and be based on the identifier, the timestamp, and a representation of a credential (e.g., of a credential that the user authenticated to the TEE and for which a representation was provided in association with registration information). As previously described, various representations of credentials may be provided by the mobile device 101 during a registration process, and which credential (or combination thereof) to which the user authenticates on to the mobile device may be specified by a policy on the mobile device (and thus expected by an authentication entity) or indicated in a challenge response process. In some embodiments, a token or value on which a token is based may be persisted amongst the mobile device 101, authentication server 155, and web-service. Thus, for example, the authentication application of the mobile device 101 may associate the token with the web-service, the authentication server 155 may associate the token with the web-service and an identity record of the user and mobile device, and the web-service may associate the token value with a user account of the user with the web-service.

In some embodiments, step 17 may include a request to sign or create a token value or certificate to establish credentials corresponding to the user. A request to a service 175 to obtain a certificate or token value may include information based on data transmitted by over a session with the authentication server 155, which may include information provided by the mobile device 101 to the authentication server or based on information provided by the mobile device to the authentication server in the preceding steps. In some cases, the authentication application of the mobile device 101 (or the web-service) may transmit the request. In some embodiments the authentication server 155 may service the request (or a service 175 of the authentication server may service the request), although certificate services 175 provided by other entities are equally applicable. An example request may be a certificate signing request for an active directory compatible SSL certificate or other certificate or token from a service 175 which generates or signs a certificate (e.g., as a signing authority) and returns the certificate. The signed certificate may be tied to the user, e.g., as a user identifier or authenticator or both. For example, the signed certificate may be tied to information provided by the mobile device, like a public key, certificate, or cryptographic hash, other deterministic information (e.g., such as information output by the TEE), or other credential associated with the mobile device, to establish a zero-knowledge proof of ownership. In some cases, the certificate signing request may correspond to a public key of the mobile device or certificate based on a public key of the mobile device, such as the public key provided to the authentication server or web-service. Other embodiments may associate the certificate with the user within one or more databases, such as based on an association of the user certificate with a public key, or cryptographic hash, or other deterministic information provided by the mobile device, thus tying the user certificate to the mobile device. The mobile device 101 may receive a response from the service 175, such as a signed certificate or token for user credentials corresponding to a user account of the user with the web-service and indicative of the permissions of the user to mobile authenticate to confer access to the web-service to a relying device 140. The user account which may be accessed based on the credentials may correspond to a user-level account (e.g., which may be an existing user account) of the user of the mobile device 101. For example, the user account may be an account on the web-service which the user has permission to log into or authenticate to from a relying device 140. In some cases, such as where multiple such accounts exist (e.g., with different web-services), like different user-level accounts, or different administrative-level accounts, credentials may be obtained for each account and each web-service. In some cases, a user certificate is specific to the mobile device 101 and a given relying device, in which case an identifier of the relying device may be associated with the credentials for utilization by that relying device, and the user may register via the mobile device to access that that web-service with other relying devices, or the credentials may be valid across a collection of relying devices (e.g., in accordance with a policy 11). In such cases, the relying device 140 may be provided with and sign credentials such that those credentials may be persisted to the mobile device 101. In some embodiments, the relying device 140 may encrypt the user credentials or other data (e.g., with a public key or encryption key associated with the mobile device), like a certificate, for which the TEE of the mobile device stores a corresponding key by which the encrypted data may be decrypted (e.g., within the TEE of the mobile device).

Various combinations of the aforementioned embodiments may be implemented, such as to facilitate compatibility with different policies of different web-services, and policies governing different relying devices to register a mobile device for mobile initiate authentications to a web-service that conveys access to a relying device. In step 18, the authentication server 155 may return a registration result to the mobile device 101. For example, the authentication server 155 may transmit a registration result confirming the registration. In some cases, the confirmation may include any data persisted to the mobile device 101 for authentication (e.g., a value for a token, certificate, or other data). In some embodiments, the authentication server 155 may also persist some or all of that data, or other data, to the web-service for authentication operations.

Figure 7B:
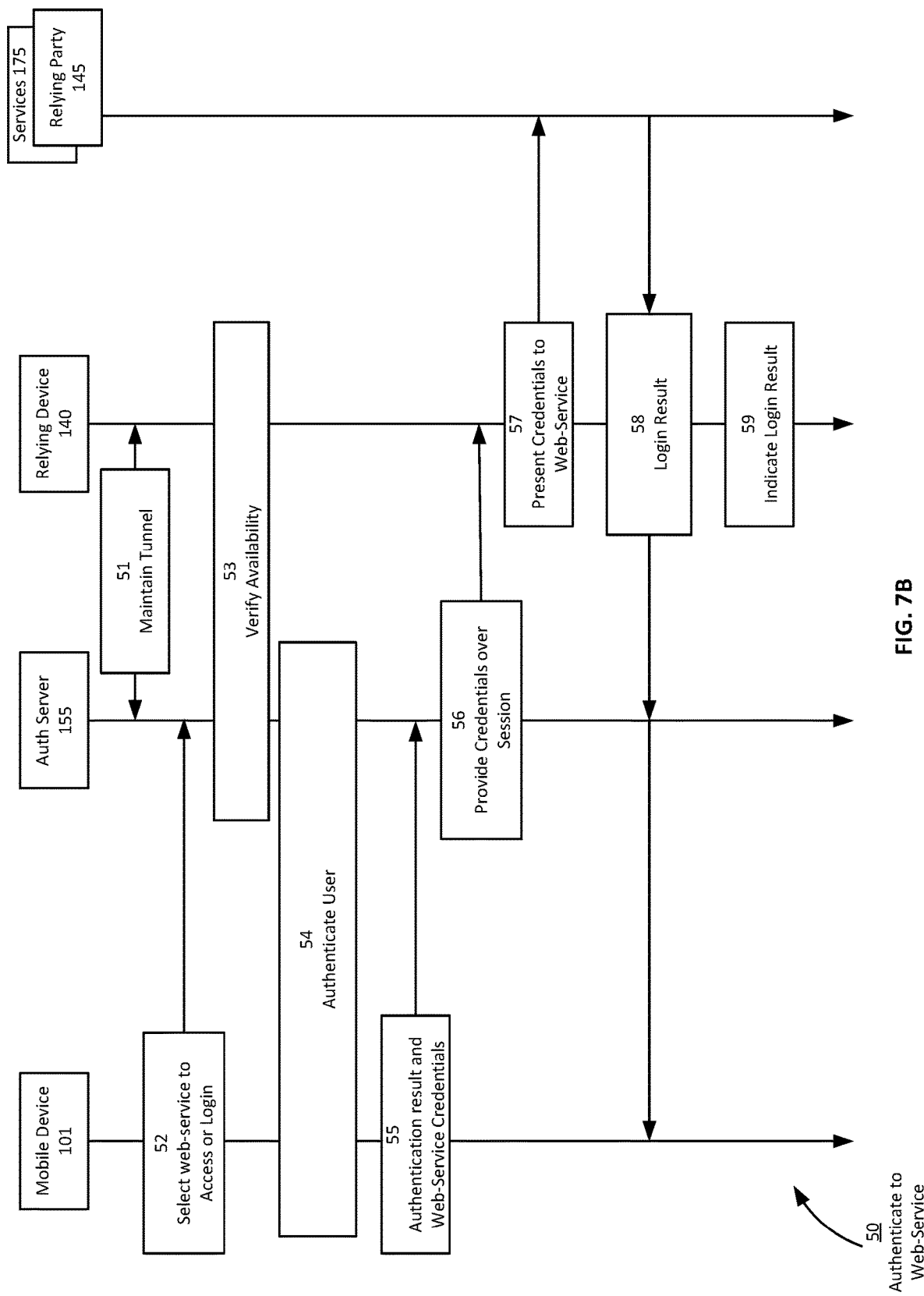

Example Process for Mobile Initiated Authentication of a User to a Web-Based Service Provider FIG. 7B is a diagram showing an example process 50 for online mobile initiated authentication to a web-service within example computing environments described in the present application. Embodiments of the process 50, which may include one or more of the illustrated steps, may occur within an example computing environment, such as the example computing environment 100 illustrated in FIG. 1. In some embodiments, the process of FIG. 7B may occur after a registration process, such as the registration process described with reference to FIG. 7A, or other registration process described herein.

In FIG. 7B, as shown, a relying device 140 may in a step 51 maintain a tunnel to an authentication server 155, or vice versa. In some embodiments, a tunnel may not be maintained, but rather established in association with a verification of relying device 140 availability by the authentication server 155. For example, the relying device 140 may maintain a WebSocket tunnel, or other secure tunnel or connection, like a heartbeat between the relying device and an authentication server 155 (or vice versa). For example, a secure session may be established between the relying device 140 and the authentication server 155 (as well as services) for the transmitting of credentials or the exchange of other data. The secure session may be HTTP over TLS/SSL, SSH, WebSocket over TCP, or other secure connection type by which the authentication server 155 and relying device 140 (or applications thereon) can exchange data. The secure session may be held open by the authentication server 155 or relying device 155 for a pre-configured amount of time (e.g., 1-180 seconds, or 1-5 minutes) before timing out, and refreshed upon a heartbeat signal, like receipt of a packet indicative of a heartbeat (e.g., that a connection is alive) or refresh request. Thus, for example, the authentication server 155 may determine an availability or status of a relying device 140 based on the status of the session (e.g., whether the session is active). The authentication server 155 may issue a user session to a relying device, such as in response to a mobile initiated login (e.g., as in process 500) or based on the user otherwise accessing the relying device (e.g., the relying device may report a user login to the authentication server 155 over the tunnel, and the authentication server 155 may issue a user session or otherwise store an indication of a user session in which user account is accessed on the relying device). Thus, for example, the authentication server 155 may determine an availability of the relying device 140 for accessing web-services associated with the user authenticated to access the relying device.

In a step 52, a user may elect to request access or login to a web-service for a relying device 140 on a mobile device 101. For example, the user may navigate a user interface of an authentication application executing on the mobile device 101, select a relying device with which the mobile device is registered, and elect to authenticate to one or more web-services to which the user registered the mobile device 101. In another example, the user may navigate to a user interface indicating web-services to which the user registered the mobile device and select one or more web-services to which the user desires to authenticate. In some cases, the list of services indicated on the interface may depend on which relying device 140 the user is currently authenticated to access, e.g., as reported to the authentication application of the mobile device by the authentication server 155. For example, upon launch of the authentication application or navigation to an interface by which web-services may be selected, the authentication application may request an indication of which web-services the user is permitted to authenticate to via the mobile device, as which services are available for selection may depend on an the availability of a relying device 140 to which the user is authenticated to access. In some embodiments, the user may select from a plurality of web-services to which the user has registered the mobile device in one or more iterations of the process 10 described with respect to FIG. 7A, and those services may be displayed in association with a relying device 140 for which the user has an actively issued or reported user session. The mobile device may store, such as within the TEE, user credentials corresponding to a user account for logging into the respective web-services. In some cases, the credential is a token, like a user certificate, which may be signed by a certificate service, like an SSL certificate service, or other certificate or ticketing service. Thus, for example, the certificate may be an active directory SSL certificate. In another example, the certificate or token may be issued by a service of the authentication server 155. Different web-services may be associated with different credential values, like different tokens or certificates, and in some cases those different tokens or certificates may be associated with a given relying device to which the user is permitted access. Upon the user authenticating to access a relying device 140, one or more web-services the user is permitted to access from the relying device may be presented for the user to select for authentication to via the mobile device. The user may select 52 a given web-service (or collection thereof) to which the user desires to authenticate the relying device 140 to access, e.g., cause the relying device to log into under an account of the user or otherwise present credentials of the user to utilize the web-service. The mobile device 101 may transmit an access request corresponding to the selected web-service to the authentication server 155. The access request may include an identifier corresponding to the web-service which the user desires to access, and which may also identify a relying device from which the user desired to access the web-service. An example identifier may be a identifier for the web-service obtained during a registration process. The access request may additionally include identifying information corresponding to the user of the mobile device, or the mobile device, such as an identifier associated with the mobile device or the user. An example identifier may be public key, or other identifier associated with a record of the user or mobile device. In turn, authentication of the user may occur without the user physically interacting with the relying device to provide credential values to the web-service (such as a username, password, or both) for utilizing the web-service via the relying device. In some cases, the providing of credential values may occur prior to the user physically accessing the relying device 140, though authentication via the mobile device is equally applicable after the user has physically accessed the relying device (e.g., using the mobile device like a wallet storing credentials by which the user is authenticated to access web-services from one or more different relying devices).

In a step 53, such as in response to receiving an access request corresponding to a given web-service from the mobile device, the authentication server 155 may verify an availability of a relying device 140 to which the user has authenticated. For example, the authentication server 155 may obtain one or more records based on a received identifier associated with the relying device. The record may include information about a network address, or connection, like a WebSocket tunnel, associated with the relying device by which the authentication server 155 may determine availably of the relying device and whether a session for the user is issued or active on the relying device 140 (e.g., the user has authenticated to access the relying device prior to attempting to convey access to the relying device to access web-services). In some embodiments, the authentication server 155 may identify a WebSocket tunnel associated with the relying device 140, such as by a network address associated with the relying device. In some cases, the authentication server 155 may determine a status associated with the WebSocket tunnel, such as whether a heartbeat signal has been received from the relying device 140. The heartbeat signal, in some embodiments, may indicate an availability status of relying devices, such as whether user sessions are ongoing. If no relying device 140 is associated with a user session for the user of the mobile device 101, the authentication server 155 may determine that no relying device is available for authentication to the web-service. If a relying device 140 is available, e.g., as indicated by an active user session of the user issued or reported for the relying device, the authentication server 155 may authenticate the user of the mobile device to convey access of the web-service to the relying device.

User authentication may be performed according to one or more processes discussed herein. In some embodiments, the access request transmitted in step 52 may include authentication information by which the authentication server 155 may deem the user authenticated. For example, the mobile device 101 may receive a policy including one or more rules by which the authentication server 155 verifies an authentication result generated by the mobile device. Thus, the mobile device 101 may generate the authentication result and transmit the result in association with the access request. Alternatively, as illustrated by step 54, the mobile device 101 may receive a request for an authentication result from the authentication server 155 (e.g., after availability of the requested relying device 140 is determined) and the mobile device 101 may generate, such as by processing user provided credentials within a TEE of the mobile device, the authentication result. In some embodiments, the authentication result may include one or more representation of credentials which the user authenticated on with the mobile device 101, such as by providing those credentials to the TEE for verification. For example, the TEE may process credential values corresponding to one or more credentials obtained from the user to determine whether the obtained credential values match previously established credentials for the user within the secure memory of the TEE. The TEE may output a representation of a credential by which the user was deemed authenticated, and the TEE may output signed (e.g., signed by a key maintained within the secure memory) data, which may include the representation of the credential, thus verifying the TEE determined the result. A timestamp or other value may be included in the data, such that the signed data conveys a time at which the result was determined. The mobile device 101 may transmit generated authentication results to the authentication server 155 in step 55 for verification. For example, the authentication server 155 may verify signed data based on corresponding received data and a public key associated with an established record associated with the user or the mobile device.

In accordance with examples like those described above, the mobile device 101 may transmit user credentials in association with the result. The user credentials may be a certificate, or token, like a user certificate or authenticator issued to the mobile device for conveying access to the web-service from another device, like the relying device 140. In some embodiments, the authentication result may be, or include, signed data. In some embodiments, the signed data may be, or include, the user credentials. For example, a certificate or token may be signed within a TEE of the mobile device 101 (e.g., by a private key or signature key stored within a secure memory of the TEE) and transmitted to the authentication server 155, which the authentication server may verify (e.g., using a public key or signature verification key). The authentication server 155 may verify and then sign the token or certificate to indicate a result of the verification. In some embodiments, a policy may be enforced within the TEE to permit signing or other processing of a user certificate or token (e.g., release of the user credentials associated with a user account for accessing the web-service). Accordingly, in some embodiments, release of a signed user certificate or token by the TEE may convey authentication of the user on the mobile device to the authentication server 155. A timestamp including in the singing of the certificate or token, which may be provided with the user certificate or token, may convey timeliness of the generation of the signature. The data and signed data may also convey other information, like one or more authentication results like those described above. Accordingly, such as in accordance with a policy governing authentication to a web-service, and which may specify a token schema by which the authentication server 155 may verify credentials received from the mobile device, the authentication server may sign a result or sign data (e.g., that also signed by the TEE of the mobile device) to indicate authentication of the user/data by the authentication server. These and other principles may be utilized in authentication processes, for example, the authentication server 155 may issue a challenge to the mobile device requesting signature over specific data or a value, and a successful response includes signed data incorporating the challenge response. As noted above, the authentication server 155 may also sign data, which may include a timestamp, such as in response to verifying signed data received from the mobile device 101 and authenticating the user of the mobile device to indicate an authentication result determined by the authentication server and when that authentication result was determined. Thus, for example, another entity, like a web-service, may verify a signature of the authentication server 155 and rely on the authentication result as determined by the authentication server, which is not to suggest that another entity, like a web-service, may not also verify data signed by the mobile device (e.g., according to a schema, like a token schema) to confirm an authentication result.

Examples of other or additional steps which may be performed in association with steps 54 and 55 may include one or more of the steps described with reference to other authentication processes described herein. For example, the mobile device 101 may authenticate a user and process challenges in accordance with techniques described with reference to FIG. 3 and provide results of processing in accordance with those techniques to the authentication server 155. In another example, techniques may be applied to other data, like a user certificate or token, and signed data corresponding to such data, which may be processed within the TEE of the mobile device in accordance within a policy governing signing and release of such data, and the mobile device may transmit the data to an authentication server 155 or other entity.

As described above, successful authentication of the user on the mobile device 101 may include user authentication within a TEE of the mobile device to release a user certificate or token corresponding to a user account for accessing the web-service from a relying device 140. The user certificate or token may be encrypted, or stored within a secure memory of the TEE of the user device such that the CEE cannot access the value in unencrypted form. Additionally, singing of the user certificate or token may be performed with the TEE based on a private key or signature key stored within a secure memory of the TEE which the CEE may not access, and the TEE may not release the private key or signature key. This operation may occur subsequent to authentication of the user, such as by credential values stored within the TEE. Such steps may include active (e.g., specific user inputs, like a PIN, password, or biometric data, like a faceprint or fingerprint) or passive authentication (e.g., obtained biometrics, such as over time, or detection after specific user inputs that the user remains in control of a mobile device) based on policy governing passing of an encrypted version of the user certificate or token to the authentication server 155. Additionally, the authentication server 155 may verify such information in according with a policy governing access to the web-service by a relying device, which may be associated with the relying device 140 to which the user is issued a user session. The authentication server 155 may access a public key or signature verification key by which received data from the mobile device 101 may be verified. For example, in step 55 the mobile device may sign and send a token or user certificate to the authentication server 155 based on an authentication result determined on the mobile device, which may be subject to challenge by the authentication server 155 or driven by conformance to policy govern authentication to the web-service on the mobile device (which may be verified by the authentication server). The authentication server 155 may verify the information received from the mobile device, such as in accordance with techniques described herein, such as on established representations of user credentials, signature verification of received data, and determine to pass credential information to a relying device over a tunnel associated with a user session of the user in step 56 based on results of a verification determination. For example, as described, the authentication server 155 may verify received information based on one or more records or policy governing authentications to the web-service, which may include information like representations, public keys or signature keys, schema for verifying credential values and token or certificate to be verified by a web-service, and the like, and thus operable to verify data received from a mobile device by signature verification of signed data and agreement of data corresponding to that which was signed with data maintained in the one or more records. The authentication server 155 may additionally verify whether the user is permitted to access the web-service from the relying device 140, such as by determining whether the user certificate or token was revoked or based on associations of records (e.g., record of registration to web-service with relying device record or with a user record or record of the mobile device) and authenticity thereof. In some embodiments, an identifier of a relying device 140 the user desires to authenticate access to a web-service may be indicated by the mobile device 101 and verified by (or determined by) authentication server 155. In some embodiments, a public key associated with a user-level accounts of the relying device 140 may be included or appended as a credential value, and signed by one or more of the TEE of the mobile device and the authentication server (e.g., and subsequently the relying device 140 may sign data by a private key and the signed data may be verified by the public key indicated for the relying service, such as to prevent the interception and presentation of credentials values by a relying device (or desktop image) that does not have access to the private key).

In response to authentication of the user, e.g., based on the information received from the mobile device 101 and which may include the signing of user credentials by the authentication server 155 to convey verification thereof, the authentication server may pass the credentials to a relying device. For example, the authentication server 155 may pass credentials to the relying device 140 over an issued user session 56 associated with the user of the mobile device (e.g., the relying device identified as available in step 53). Credentials passed to the relying device 140 may include communication of information by which the relying device 140 may authenticate to a web-service. The authentication server 155 may provide credentials to a relying device 140 over an issued user session by passing a user certificate or token to the relying device. In some embodiments, the authentication server 155 may sign the user certificate or token, such as in response to verifying the information received from the mobile device. The signature of the authentication server 155 may convey the verification of the credentials as being associated with the user for which the user session was issued, such as to a web-service. In some embodiments, the relying device 140 may sign the user certificate. Thus, for example, presentation of a certificate or other data to a web-service by the relying device in step 57 may convey the provenance, like a chain of tile, of the certificate and the entities which handled it, e.g., by nested signatures, and which the web-service may verify based on public keys or signatures keys maintained for the respective entities.

In some embodiments, the authentication process may include additional tokening or ticketing for authenticating to the web-service by the relying device 140 (e.g., by authentication to a web-service, and optionally requesting other resources based on the authentication result, such as for one or more application) or performing other operations. For example, the relying device 140 may, upon receipt of credentials provided by the authentication server 155, obtain in step 57 a token, or ticket, by transmitting a user certificate (which may be signed by one or more entities) in association with a request for a token or ticket to a ticking service (which may be provided by the authentication server or other entity). The ticking service may authenticate the relying device 140, such as by issuing one or more challenges to the relying device 140, which may be signature challenges. The relying device 140 may sign data, such as the token, and other data to convey temporality of a request (e.g., like a timestamp) and possession of a private key by which the data was signed. The relying device 140 may sign data in response to challenge, like a unique challenge issued by a ticking service or other entity, thus conveying possession of a private key by which the data was signed. For example, the private key by which the data is signed may be a private key of a public-private key pair and the public key of the pair may be distributed such that other entities may verify signed data as being signed by the private key of the pair. The private key may be a private key retained on the relying device 140, such as a private key generated during a registration process (e.g., mobile device registration to the relying device 140 or user account creation on the relying device) or otherwise stored on the relying device 140. For example, the private key may be generated and stored on the relying device 140 during a mobile device registration process or user account creation process and the corresponding public key may be exchanged with one or more servers or services for signature verification. The private key may be utilized by the relying device 140 to sign a variety of data like that discussed above and elsewhere herein. In such example, the relying device 140 may provide responses to one or more challenges to a ticketing service to receive a token or ticket which the relying device 140 may then present to utilize a given web-service, and may convey credentials associated with one or more applications. For example, one or more other application, such as active directory aware applications, based on the received ticket, may obtain other tickets from the ticketing service or other services, such as to access web-service providing online resources under a same or another account of the user (e.g., one or more federated accounts or via single sign-on permissions governing the web-service and other web-services) provided internally (e.g., by a party managing the relying device) or externally (e.g., other relying parties, like $3^{rd}$ parties). In some cases, the certificate or tokening service is a trust service associated with a developer which licenses user accounts or relying devices to access a web-service provided by the developer (e.g., may permit 0-1000 relying device or 0-1000 application instances or more for a given entity, like a corporation, and different entities, like relying parties, may be permitted different amounts of instances to access a web-service). In various embodiments, a web-service may trust the authentication server 155 as an identity provider, in which case the credentials received by the relying device 140 over the session may be presented 57 (e.g., directly, or signed and presented) a corresponding web-service. For example, the relying device 140, as in other examples, may receive a token to present or sign and present to an indicated web-service. Various services or protocols may be utilized to facilitate the exchange or conveyance of credentials, such as ID Connection, open ID, or SAML, and may be specified by the policy governing mobile initiated authentications to the web service.

In some embodiment, the relying device 140 may receive instructions in step 56 for presenting 57 a credential to a web-service. For example, the relying device 140 may receive credentials and instructions for presenting the credentials. In some cases, the instructions may be encoded in a script which is executed by the relying device 140 to present the credentials. As an example, the relying device 140 may receive a credential and instructions to launch an application, navigate to a webpage, or request a session with a service for presenting a given credential to authenticate to access to the web-service. In some embodiments, such as when a user mobile authenticates to a web-service when actively utilizing the relying device, the instructions may cause the relying device 140 to present the credentials and access the corresponding web-service for display on a screen of the relying device 140.

In step 58 the relying device 140 may receive a result of successfully authenticating to a web-service or service governing access to the web-service, and thus a result of a login attempt to the web-webservice for the user by the relying device. The relying device 140 may return the result 58, such as in a response, to the authentication server 155. The authentication server 155 log the result in association with a record associated with user, mobile device, or relying device, such as in association with a user record, and indicate information about the request, the requesting device, and which relying device obtained the login result. Thus, for example, an audit trail of mobile initiated authentications may be formed and may be stored in association with records of other authentications described herein. The authentication server 155 may pass the login result tot the mobile device 101, and the authentication application may indicate the success of the login to the web-service which was selected in step 52.

After obtaining a login result 58, the relying device 140, in some embodiments, may purge the credentials received from the authentication server 155 and indicate a login result 59. In some embodiments, such purging may not be required in terms of providing robust security, but rather as a housekeeping measure. For example, signing of a user certificate or token generation may convey a timeliness, such as by a including a timestamp, to a web-service or ticketing server, and a login result 58 may tie a user session token or ticket to a given instance of authentication to web-service such that same credentials may not be presented multiple times or to obtain access to other web-services. The relying device 140 may indicate a login result 59 by virtue of authenticating to web-service, such as by accessing an online resource associated with the web-service or launching an application (e.g., which may be licensed by a web-service) or accessing DRM controlled content on the relying device 140.

In some embodiments, the relying device 140 may wait for user input prior to altering a display or performing other operation indicative of login results 59. Thus, for example, the relying device 140 may not exhibit or perform an action prior to a user input (or action), such as for a configurable amount of time, such as to permit the user the convenience of authenticating via the mobile device 101 without indicating that authentication was completed by the relying device 140. In some embodiments, the received user input may be navigating to a webpage or launching an application associated with the web-service the relying device authenticated. In some embodiments, the relying device 140 operates within a VDI environment. Thus, for example, rather than utilizing a local OS, a virtual machine executes a desktop image and the relying device 140 receives data (e.g., the virtualized desktop) for display over a network session with the VM. In such example embodiments, for example, the authentication server 155 may provide credentials over a network in association with an enabled VDI session between the relying device 140 and a VM executing a desktop image. As noted previously, a virtualized desktop may be persistent or not. In a persistent configuration, a desktop images which a user accesses retains (e.g., includes) user configured or stored data during a session, like installed applications, files, settings, etc. and in a non-persistent configuration an assigned desktop image may be clean-slated on logout or selected from a pool of desktop images and user configured or stored data during a session is not saved or periodically wiped. In the context of clean-slated virtual desktop implementations, or the desire to implement similar principals to credentialing for access to web-services, the mobile device 101 may serve to retain those credentials which might otherwise be stored on a relying device 140. Embodiments of relying devices 140 or VM implementations may elect to purge credentials and mitigate the retaining of various credentials outside of the mobile device 101 of the user, thus permitting the mobile device executing an authentication application to serve as a wallet of credentials by which the user may authenticate to access a relying device 140 and then authenticate to web-services which the user desire to access from that relying device by authentications on the mobile device which convey user-level access to relying devices and web-services by those relying devices.

Domain Unrestricted Mobile Initiated Logins

Figure 8:
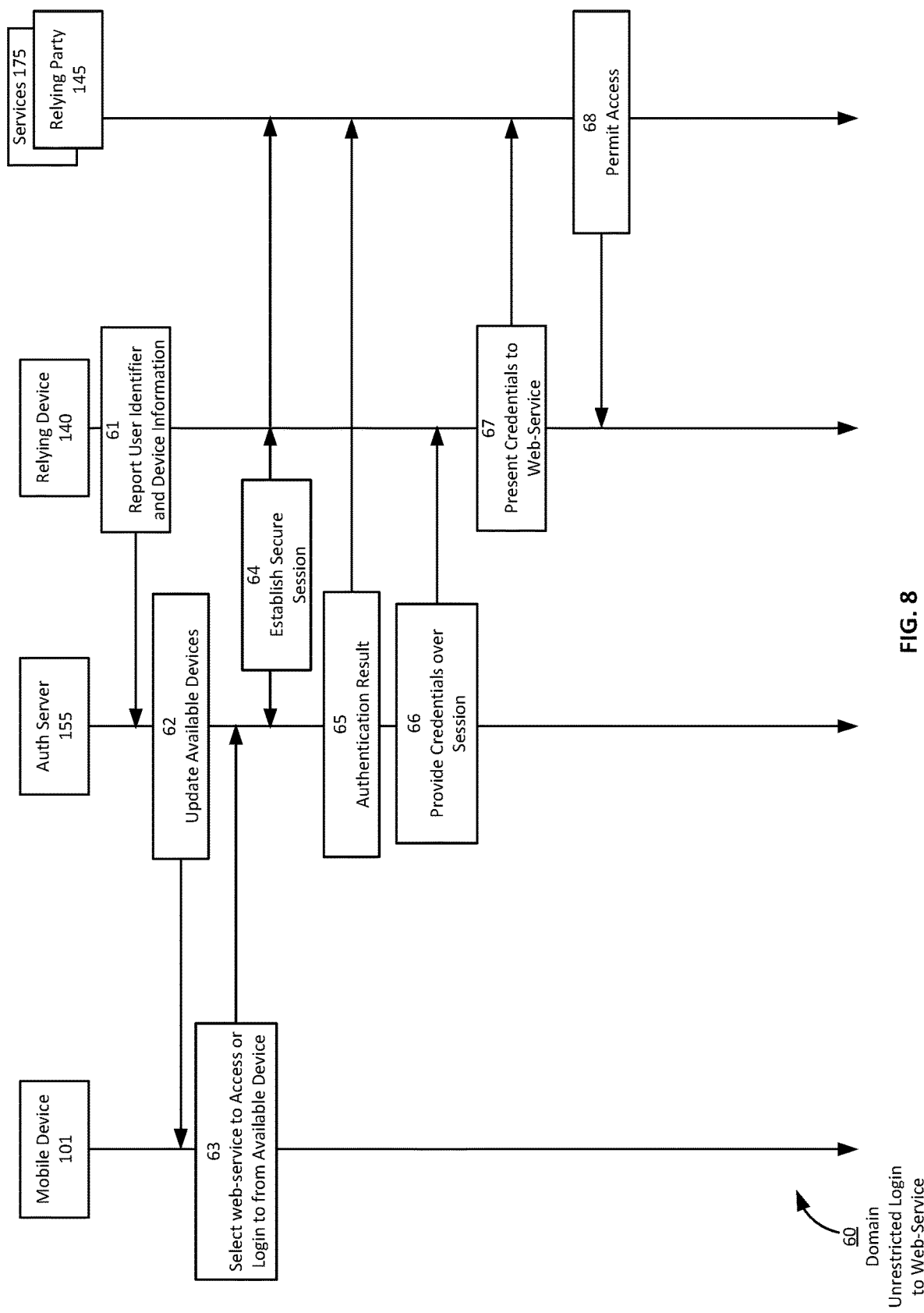
FIG. 8 is a diagram showing an example process for domain unrestricted mobile initiated authentications to a web-service within example computing environments described in the present application.

FIG. 8 is a diagram showing an example process 60 for mobile initiated authentication to a web-service within example computing environments described in the present application. Embodiments of the process 60, which may include one or more of the illustrated steps, may occur within an example computing environment, such as the example computing environment 100 illustrated in FIG. 1. In some embodiments, the process of FIG. 8 may occur after a registration process, such as a registration process described with reference to FIG. 2, FIG. 7A, or other registration process described herein.

Some embodiments are configured to enable domain unrestricted mobile initiated logins. For example, a (e.g., client) device, like a relying device, on which the user wishes to access a web-service need not be required to be resident on a given domain prior to permitting mobile initiated logins to web-services from that device. Many authentication and single-sign on services are reliant on OS-resident (usually proprietary services, and often domain based, like an enterprise domain type service) for credentialing. Accordingly, utilization of credentials cross-platform (e.g., different OS) or on devices not resident (e.g., on a domain) are restricted from utilizing single-sign-on credentials that are otherwise configured for the user.

A client-side application, like an authentication component (e.g., like an application or service), may be downloaded to a client device, like a relying device. For example, an application 110, like that illustrated in FIG. 1, may be downloaded by, or uploaded to, a relying device 140. When executed on the relying device, the client authentication component may permit a user to enter, or an authentication application of a mobile device of a user to provide, obtain, or otherwise exchange identifying information corresponding to the user (or an account of the user) or the relying device. The relying device, or the mobile device, may transmit identifying information to the authentication server 155. Thus, for example, the authentication server 155 may form or indicate within a record, like a UID Record or device record, an association between a user account and one or more devices.

Example applicable processes for exchange of identifiers that may be utilized are discussed herein. Examples of which include exchanges relevant to registration—which include registration of mobile devices, relying devices (or other client devices), and establishment of records—discussed herein. For example, a user may enter on a relying device 140 via a client authentication component an account identifier, which may be a user name or device information corresponding to their mobile device. The relying device 140, such as indicated by step 61, may report a user identifier or device information to the authentication server 155. The device information may also include device information corresponding to the relying device 140. For example, the client authentication component may determine information about the relying device 140, like a unique device identifier, and report the unique device identifier and other information indicative of the device to the authentication server 155. In some examples, the user may provide in association with the user identifier a nickname corresponding to the relying device 140, such that it may easily be identified by the user for selection via their mobile device 120.

In some example embodiments, the client authentication component on the relying device 140 may determine information about a user identifier and report the information the authentication server 155. For example, a user may login, or be logged into, a user account on the relying device 140 and the client authentication component executing on the relying device may determine information about the user account having an active session. In some examples, a user certificate, user account identifier, or other information corresponding to the account accessed by the user may be determined by client authentication component from the runtime environment session for the user and transmitted to the authentication server. In some example embodiments, such as those where the authentication server 155 manages credentials corresponding to user access of relying devices, the information determined by the client authentication component about the session that is received by the authentication server 155 may be indicative of a user record maintained by with the repository 165. If a user record cannot be identifier, the authentication server 155 may return a user record not found indicator, like a notification, to the client authentication component on the relying device 140. In turn, the client authentication component may prompt a user to enter a user identifier or identifying information for a mobile device of the user by which a corresponding record of the user (or device) may be identified by the authentication server. In some embodiments, the client authentication component may store an identifier, or receive an identifying token from the authentication server 155, such that the client authentication component may identify an account of a user to the authentication server 155 (e.g., automatically) upon launch (e.g., by a step 61).

The authentication server 155, such as upon receiving information by which a record of a user, and thus a mobile device of the user, may be identified, the authentication server may store information about the relying device 140 and indicative of the availability of the relying device (e.g., for mobile initiated authentications to a web service). In a step 62, the authentication server 62 may transmit a notification indicative of an updated availability of a relying device 140 to a mobile device 101 associated with an account of an identified user (which in some examples may be identified based on mobile device information). In other examples, the mobile device 101 may request such an update upon user launch or use of an authentication application on the mobile device. For example, when a user accesses an authentication application on the mobile device 101 the authentication application may request an update indicative of available relying devices for mobile initiated logins—whether to the relying device itself or to a webservice via the relying device.

Thus, for example, an authentication application on the mobile device 101 may be made aware of an availability of relying device 140 for mobile initiated authentications via the client authentication component on the relying device, or vice versa, such that mobile initiated authentication services may be provided to the relying device, in some cases, absent the requirement for addition of the relying device to a domain or other (often manual) administrative action. For example, the client authentication component on the relying device 140 may be a $3^{rd}$ party authentication component or service (e.g., 175B) provided by the authentication server 155 in connection with, or separate from, login services associated with the domain of the relying device. In some cases, a user may authorize the client authentication component for management of the relying device, such as integration with a sign-on service or user account associated with an operating system of the relying device to further enable mobile initiated login to the relying device in addition to web-based services as described below.

Accordingly, in some embodiments, a relying device 140 may be a user client device with a persistent or wake-able wireless connection to a network 121, such as within a home, and which may periodically report to the authentication server 155 in response to obtaining network connectivity or in response to a change in network conditions such that the authentication server may issue a communicate request to the relying device 140 (e.g., which may include waking the relying device via a network interface of the relying device) that may be processed by the client authentication component.

Configuration of a client-side authentication component on the relying device 140 for mobile initiated login, such as to web-services (and which, in some embodiments, may be further configured to integrate with operating system account access, such as by permissions granting access to a user certificate, or other credentials (e.g., 111) of the user account by the client authentication component), can be more flexible than other approaches. For example, some aspects do not require that the relying device or other client executing a client authentication component be provisioned on a given domain (e.g., enterprise) in advance, provide the option of mobile initiated authentication that other services do not support, or do not rely on additional user credentialing with respect to the relying device (e.g., establishment of new authenticators different than those which the user may have already established on their mobile device and can utilize for mobile initiated logins to web-services on the relying device).

After acknowledgement of a client component by an authentication server 155 and identification of a user account, an authentication application on the mobile device 101 may obtain information about the relying device 140 and client authentication component on the relying device. The authentication application on the mobile device 101 may present, via an interface, an indication of the availability of the relying device 140 and one or more webservices to which the mobile device 101 has registered for mobile initiated authentication. In step 63, a user may select an available relying device 140 and one or more webservices that the user wishes to access or login to from or on the available relying device. Here, the user may authenticate on the mobile device 101 (such as by providing credentials), the results of which may be verified by the authentication server 155.

The user may select, for example, a web-service on the mobile device (e.g., one which the mobile device has been registered with for mobile initiated authentications) in association with the relying device (e.g., such as by selecting the relying device and then selecting a web-service which the user desires to access from the relying device). The authentication application of the mobile device 101 may prompt the user or otherwise request the user to input one or more credentials, such as credentials corresponding to authentication on a webservice to which the mobile device 101 has registered for mobile initiated authentications. In some examples, the credentials corresponding to a webservice may be domain-specific credentials, e.g., specific to the webservice, and different credential sets (for different domains) may correspond to the different webservices. For example, different key-pairs or representations or credential values may be established with respect to different webservices. In other examples, the authentication server 155 may provide a federated identity services with which one or more webservices are registered and authentication to a user identity established with the authentication server 155 may convey access privileges to accounts of the user with the webservices that are federated under the user identity with the authentication server. The mobile device may pass authenticators to the authentication server 155 in association with the selection 63 of the webservice or in association with a challenge-response authentication process between the mobile device and the authentication server after the selection, such as in accordance with one or more of the example embodiments described herein for authentication of a user on their mobile device.

Input credentials may be obtained within the TEE of the mobile device 101, and the TEE may verify credential input. Representations of the input credentials may be generated, or stored representations of the input credentials the TEE verified according to the input credentials may be output by the TEE. In some embodiments, the TEE also provides a result of the verification. In some embodiments, the TEE generates signed data corresponding to one or more of the output data and outputs the signed data. The signed data may also include inputs such as one or more timestamps or other identifying information describing when or what the signed data was generated for. For example, the signed data may take as input a representation of a credential and other information, such as a timestamp or other identification information for the notification. In the case of webservices on different domains, use of keys associated with a domain, like a private key established in association with registration with the domain, may be subject to user authentication with the mobile device 101 upon credential values stored with the TEE during registration with the webservice. The private key may be used to sign output data like representations of credentials, user or other certificates, challenge responses, or other data, such as to indicate authentication of the user on the mobile device to access the key for the signature operation, or the private key may be used to decrypt received data, such as to indicate authentication of the user on the mobile device to access the key for the decryption operation. Output data may include data that is hashed, signed by a private key stored within the TEE for the domain, or encrypted by a public key (e.g., of an entity of the domain possessing access to the private key), and which may be transmitted to a remote server for verification by a respective process or a combination of processes as described herein. A combination of techniques may be used as described herein such that values upon which successful authentications are based may be obtained, or known, only within the TEE of the mobile device 101 or by the authenticating entity. The output data, which may include data and signed data, or encrypted data, for example, may be provided to the authentication application, which cause the mobile device 101 to transmit the output data for authentication by the authentication server 155—such as to authenticate the user for selected 63 webservice. A public key (or signature verification key) previously provided to the authentication server 155 in a registration process can be used to verify the signed data in accordance with the data (or other data known by the server). Or, in some examples, the output data may be encrypted by a public key, and thus upon receiving that output data the authentication server may decrypt that data to obtain the output data in plaintext for verification, which may include, for example, representations or challenge response data encrypted by the public key of the key pair established within the TEE for the domain and obtained within the TEE by decrypting the challenge data with the private key stored for the domain. Thus, for example, the authentication server 155 may determine an authentication result 65 based on authentication of the user via the mobile device 101 as described in detail herein.

A secure session 64 may be established between the relying device 140 and the authentication server 155 (as well as services) for the transmitting of credentials, like public keys, certificates, offline values, or the exchange of other data. The secure session may be HTTP over TLS/SSL, SSH, WebSocket over TCP, or other secure connection type by which the relying device 140 (or applications thereon) can exchange data with a server.

To prevent man in the middle attack, one or more tokens, like a channel binding token, may be generated by the authentication server 155. The authentication server 155 may generate a channel binding token in association with establishing a secure session 64 with a relying device 140. In some examples, the secure session 64 may also extend to a relying party 145 or webservice 175. In some examples, such a secure session 64 may be established in response to the selection in step 63 to login to a selected relying device 140 or to access a selected webservice from a selected relying device. In some examples, establishing 64 of the secure session may include a connection established with the relying device 140, and may be performed to verify current availability of the relying device 140. Verification of current availability may include acceptance of a connection for establishing the secure session and may include a requesting (or receipt) of an updated report from the client authentication component of the relying device 140 corresponding to its runtime environment (e.g., to verify the secure connection is established with the same relying device and that network or runtime conditions of the device have not been altered).

The authentication server 155 may validate one or more sessions as secure, such as between the client authentication component (e.g., the relying device 140) and the webservice (and between the authentication server and the client authentication component of the relying device). In some examples, the authentication server 155 may verify a session as secure based on a channel binding protocol. Channel binding enables an entity (or application) to establish that the two end-points of a secure connection at one communication layer is the same as at another communication layer by binding authentication of one (e.g., a higher) communication layer to that of another (e.g., a lower) communication layer. Generation of tokens which, for example, match, may ensure that credentials are securely passed between entities. For example, a token contained in client authentication information may be required to match that of a server's (e.g., initial) communication with the client. Thus, for example, authentication server 155 may validate that a domain on which an authentication token (which may be passed over one of the aforementioned channel) is intended to be presented, was presented on that domain (e.g., that of the webservice to which the token corresponds). Accordingly, the relying device 140 may be restricted from presenting the token on a domain other than that verified by and permission by the authentication server. In other words, the token may only be presented on the domain of the webservice to which the user requested access and authenticated to access. Such an authentication token may be obtained, for example, by service login to client (e.g., via authentication component login on the relying device), and that login process obtains an authentication token (e.g., from the authentication server or other service), or, in addition, as noted above after user login, a token may be generated in relation to a user account of an operating system (e.g., which need not be a domain account), such as based on runtime environment information within which the client authentication component is executed. Accordingly, the authentication server 155 may provide 66 credentials, which may include one or more tokens, via the secure session.

In some embodiments, the authentication server 155 may transmit 65 an authentication result to a webservice 175 or relying party 145 indicative of authentication of a user and information corresponding to an access request by which that user will be requesting access (e.g., via the relying device). Thus, for example, a webservice or relying party server may be preemptively notified of an impeding access attempt. In some examples, information by which the access attempt may be verified may be transmitted 65 in association with an authentication result to the relying party server or web service. In some embodiments, the authentication server 155 and web-services (like relying parties 145 and other services 175) may utilize one or more local databases or networked databases, such as one or more repositories (e.g., like an authentication repository 165). In some embodiments, the different entities may each, or individually, utilize a combination of databases. For example, many entities may store some data locally or via networked datastore and some data within a distributed datastore.

In some example embodiments, the authentication server 155 may provide 66 credentials corresponding to an access attempt via the secure session to a relying device 140. In some embodiments, the client authentication component of the relying device 140 may receive the credentials for presentation to the webservice or relying party that was selected by the user via their mobile device in step 63. In some examples, the credentials may include information by which the client authentication component automatically requests and attempts access, such as via a session with the webservice or relying party secured by channel binding. In some embodiments, the credentials may include a deep link, which may cause the authentication component to request access a specific URL, such as via a browser element, such as by deep link directed to the authentication component on the relying device. Example deep links are a type of link that direct to an application (and may also include information upon which the application may act). For example, a deep link may correspond to a specific in-application process or location and include information corresponding to that process or location. In the present example, a deep link may correspond to a URL schema (which may be OS specific) that directs to a login process by which the client authentication component may present 67 credentials to a webservice or relying party. In some examples, a schema may convey the credentials to one or more other applications, such as an application corresponding to that of a relying party or a browser application by which a website or web hosted application is accessed. In either instance, an entity, like a relying party server 145 or a webservice 175 may permit 68 access to resources provided by the relying party or webservice to the relying device 140 based on verification of the credentials. For example, the entity may permit access based on a verification of the presented credentials and information about the relying device 140 matching that expected for the access attempt as indicated by an authentication result 65 received from the authentication server 155. In some examples, the entity may transmit information about the access attempt back to the authentication server 155 to receive a verification of an authentication result 65 corresponding to the access attempt to permit access 68 to the relying device 140.

In some examples, a client authentication component of the relying device 140 obtains a token, like an authentication token, like a credential which the relying device presented to an entity with an access attempt. The authentication server 155 may validate the authentication token returned by a relying party server or webservice that was presented with the token by a relying device. The authentication server 155 may verify secure passage thereof in accordance with the channel binding and may refresh the token for presentation to one or more other webservices. In some cases, deep links may convey token values, or otherwise identify a specific resource, which in some cases may be a token, or the resource identifier may itself be a token value.

In some example contexts, if a user utilized a domain authorized windows machine (e.g., a relying device), a Kerberos session may enable a user to log into a web account, which saves time but is tied to a Kerberos session that may be operating system (e.g., windows) specific. Accordingly, such sessions are not available or applicable on other operating systems or devices (e.g., in domain restricted use cases of windows user accounts on enterprise domains). Installation and execution of the client authentication component, which may be a native application for a given operating system of the relying device, may enable a user to initially authenticate with an authentication server (or service) via their mobile device (e.g., after the authentication updates the availability of the relying device). After authentication of the user on the mobile device, the authentication server or service may generate a URL that includes a token value, which may be transmitted as a credential 66 over a secure session to the relying device 140, such as to the client authentication component. For example, a WebSocket, which may be activated by executing client-side authentication components and reported to the authentication server or server in step 61, may be used by the authentication server to push down the URL including the token value to the authentication component on the relying device. Device information reported for the relying device 140 may include information about a network address, or connection, like a WebSocket tunnel, associated with the relying device by which the authentication server 155 may determine availably of the relying device. In some embodiments, the authentication server 155 may identify a WebSocket tunnel associated with the relying device 140, such as by a network address associated with the relying device. In some cases, the authentication server 155 may determine a status associated with the WebSocket tunnel, such as whether a heartbeat signal has been received from the relying device 140. The heartbeat signal, in some embodiments, may indicate an availability status of the relying device 140. In some examples, a notification service, such as where device information corresponding to the relying device 140 indicates a subscription by the relying device to one or more notification services, may be used to push down the URL and token value to the client authentication component.

In response to receipt of credential information 66, like a URL including a token value, or token value and webservice domain information (e.g., like a URL to which a token value may be appended or at which the token may otherwise be presented), the client authentication component may cause the relying device to launch a browser based on the URL to present the token to the corresponding webservice. In some examples, a URL including the token value may correspond to a schema of the webservice domain by which launch of the URL (e.g., corresponding to the domain of the webservice) via a browsing element or web browser which causes the token value to be presented by the relying device for the web-service login that the user, as indicated by the user's selection of the webservice via the mobile device, wants to log into.

Requesting access, by the relying device, to the URL (e.g., on a domain of the web-service) with inclusion of the token value may cause the webservice to obtain that authentication token. The token obtained by the webservice in association with the request may be verified against authentication token values considered valid (e.g., by the authentication server or by the webservice based on indications of valid tokens received from the authentication server). Once the webservice or relying party verifies that the authentication token is valid for the user of the relying device having requested the access, the relying device (e.g., by virtue of authentication of the user) is permitted to access the requested resource the user wanted to access.

In some embodiments, after the client authentication component obtains a token and the relying device is authenticated with a webservice by presenting a valid token, the client authentication component may persist the token on the relying device for a user session. For example, the token or an updated token persisted on the relying device may be used for subsequent authentications to the webservice or other webservices or relying party servers that are configured to rely on the authentication server for authentication services. In other words, in some examples, a token may be used by a relying device for a given user access session (e.g., to mitigate repetitious logins). Security may be maintained through channel binding. For example, binding tokens may be generated by the authentication server 155 for secure sessions to different relying parties or webservices to verify presentation of the token to other websites/services was performed without compromise of the authentication token. For example, after client authentication component obtains the authentication token, when the relying device to launch a website configured to rely on the authentication server, the relying device may receive a redirect requesting presentation of the token, and then webservice or authentication server can verify that authentication token is presented in relation to the user having access to the relying device to which the authentication was issued. In some examples, a browser element or web browser application may check to determine whether a client authentication component is installed (e.g., by plugin/script) on the relying device. Detection of the client authentication component may cause the browser to request presentation of a token, like a JavaScript or deep link into client component for obtaining and presenting the token to the webservice (or the client component may presented the token). In either case, an exchange may be secured by channel binding—when the browser requests a token, the browser may provide the domain associated with the request and the client authentication component may verify, such as via a secure session to the authentication server, that the channel is trusted and presentation of the token is authorized on the domain. In such examples, the authentication server may transmit an indication of the attempt to the webservice corresponding to the domain or return an authentication result to the domain based on information received from the webservice or relying party server for the access attempt by the relying device.

In some embodiments, the functionality described in the Figures (e.g., 2-8) and elsewhere herein may be implemented with machine-readable instructions stored on a tangible, non-transitory, machine-readable medium, such that when the instructions are executed, the described functionality may be implemented. In some embodiments, notwithstanding use of the singular term "medium," these instructions may be stored on a plurality of different memory devices (which may include dynamic and persistent storage), and different processors may execute different subsets of the instructions, an arrangement consistent with use of the singular term "medium." In some embodiments, the described operations may be executed in a different order from that displayed, operations may be omitted, additional operations may be inserted, some operations may be executed concurrently, some operations may be executed serially, and some operations may be replicated, none of which is to suggest that any other description is limiting.

Figure 9:
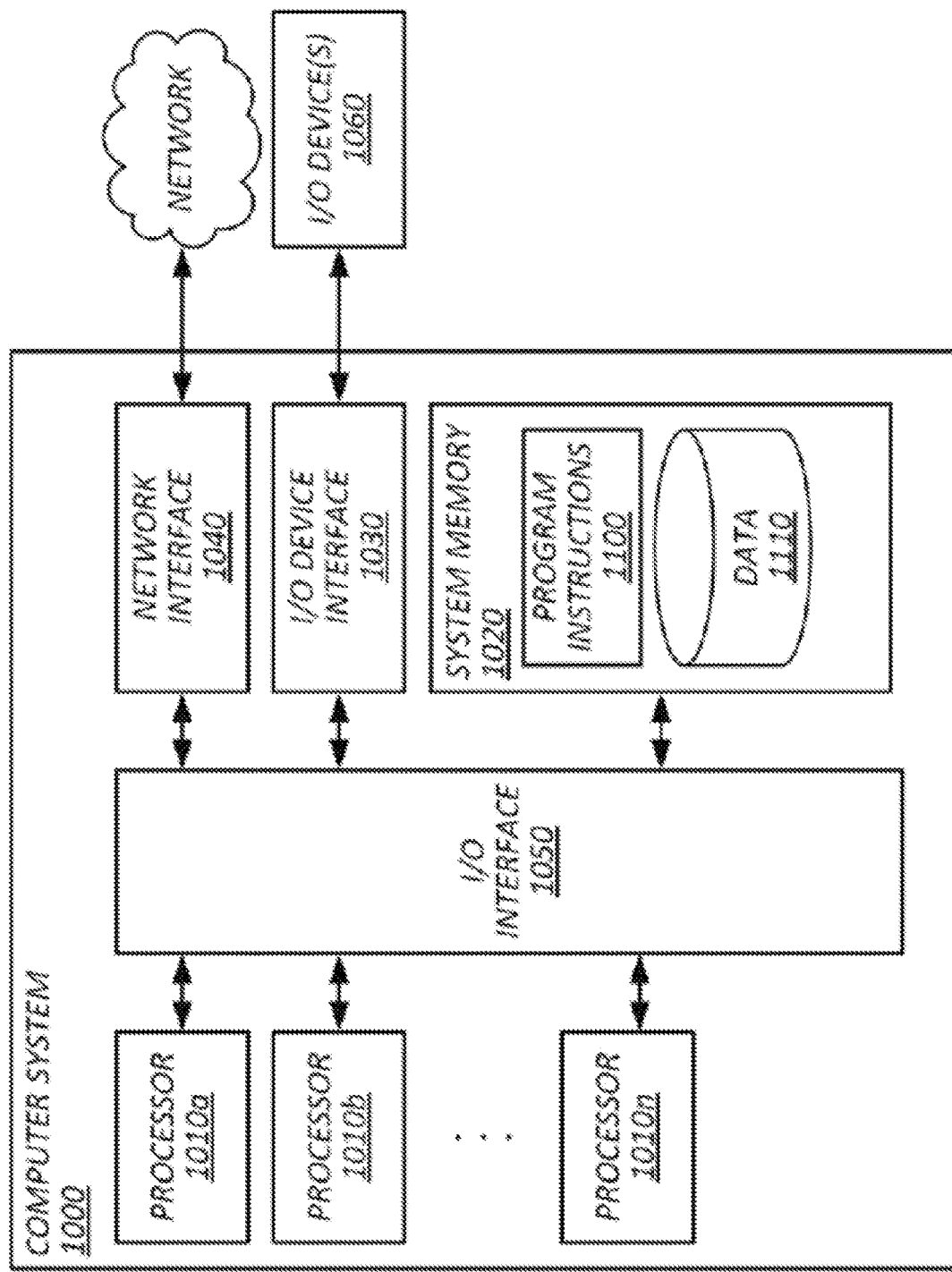
FIG. 9 is a block diagram showing an example of a computing device by which the present techniques may be implemented.

FIG. 9 is a diagram that illustrates an example computing system 1000 in accordance with embodiments of the present techniques. The various servers (e.g., 145, 155) or services (e.g., 175, which may include one or more servers, like an auth server 155, providing such services), client devices (e.g., mobile devices 101, relying devices 140), or repositories (e.g., 160, 165) described herein may include one or more components like those of the example computing system 1000. Various portions of systems and methods described herein, may include or be executed on one or more computer systems similar to computing system 1000. Further, functions, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be used independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Example embodiments may include, but are not limited to:

1. An embodiment comprising a tangible, non-transitory, machine-readable medium storing instructions that when executed by one or more processors of a computer system effectuate operations comprising: storing a user account record indicative of a first computing device and first credentials by which a user authenticates on the first computing device; receiving an indication of a user selection on the first computing device to register the first computing device to authenticate access to a webservice from other computing devices; associating, with the record, second credentials by which the user authenticates with the webservice; identifying, based on user account or device identifying information received from a second computing device different from the first computing device, the record; updating an indication of availability of the second computing device in association with the record; receiving, from the first computing device, an authentication request to access the webservice from a selected available computing device and, in association with the authentication request, authentication data; verifying the authentication data based on the first credentials to determine the user authenticated on the first computing device; and transmitting, to the selected available computing device, based on the verifying, second authentication data by which the second computing device is permissioned to access the webservice.

2. The medium of embodiment 1, wherein storing a user account record comprises: establishing a user identifier associated with the user; establishing device information corresponding to the first computing device; and establishing a set of credentials corresponding to representations of credential values maintained on the first computing device by which the user authenticates on the first computing device.

3. The medium of embodiment 1, wherein updating an indication of availability of the second computing device in association with the record comprises: transmitting, to first computing device, identifiers of available computing devices having reported user account or identifying information associated with the record.

4. The medium of embodiment 1, wherein updating an indication of availability of the second computing device in association with the record comprises: verifying an active user session of the user on the second computing device.

5. The medium of embodiment 1, wherein transmitting, to the selected available computing device, based on the verifying, second authentication data by which the second computing device is permissioned to access the webservice comprises: generating an authentication token value; and transmitting, to the selected available computing device, a uniform resource locator comprising the authentication token value.

6. The medium of embodiment 5, wherein: the authentication token value is specific to the selected available computing device; and presentation of the authentication token value is permissioned for a domain associated with the selected webservice.

7. The medium of embodiment 1, wherein verifying the authentication data based on the first credentials to determine the user authenticated on the first computing device comprises: verifying the authentication data complies with a policy associated with the selected webservice; and verifying the authentication data was generated by a trusted execution environment of the first computing device.

8. The medium of embodiment 1, wherein: the authentication data includes signed data; access to a private key by which data is signed is governed by authentication of the user on the first computing device upon credentials processed within the trusted execution environment.

9. The medium of embodiment 1, wherein: the second authentication data is accepted by the webservice to permit the selected available computing device to access the webservice under an account corresponding to the second credentials by which the user authenticates with the webservice on a first domain.

10. The medium of embodiment 9, wherein: the webservice is registered with an authentication service; and the user is authenticated by the authentication service to access the webservice from the selected available computing device based on the first credentials and not the second credentials.

11. The medium of embodiment 9, further comprising: receiving a login result indicative of the selected available computing device obtaining access to the web-service; and transmitting an indication of permission to present the second authentication data on a different domain associated with a different webservice.

12. The medium of embodiment 11, wherein: the second authentication data is accepted by the different webservice to permit the selected available computing device to access the different webservice under a different account corresponding to third credentials by which the user authenticates with the different webservice on the different domain without the user providing the third credentials 13. The medium of embodiment 1, further comprising: issuing a channel binding token to the selected available computing device, the channel binding token restricting presentation of the second authentication data without domain specific permissions; and permissioning the selected available computing device to present the second authentication data on a domain corresponding to the webservice.

14. The medium of embodiment 1, further comprising: maintaining a WebSocket tunnel with the second computing device in response to receiving the user account or the device identifying information from the second computing device, wherein the second computing device is the selected available computing device; transmitting the second authentication data and first instructions over the WebSocket tunnel to cause the second computing device to transmit the second authentication data to the webservice; and transmitting second instructions over the WebSocket tunnel to cause the second computing device to transmit the second authentication data to another, different webservice based on an indication of a selection by the user of the different webservice on the first computing device.

15. The medium of embodiment 1, wherein associating, with the record, second credentials by which the user authenticates with the web-service comprises: obtaining an authentication result indicative of authentication of the user to the webservice, the authentication result associated with an identifier of an account of the user with the webservice; and storing the identifier as the second credentials.

16. The medium of embodiment 1, further comprising: receiving a public key of a key pair corresponding to the webservice, the authentication result comprising the public key, wherein the private key of the key pair is maintained on the first computing device and operable to sign authentication data after authentication of the user on the first computing device.

17. An embodiment comprising: a tangible, non-transitory, machine-readable medium storing instructions that when executed by one or more processors of a computer system effectuate operations comprising: receiving, from a mobile device executing a user authentication component, a request to establish a user account record, the user account record indicative of the mobile device and credentials by which a user authenticates on the mobile device; receiving, from the mobile device executing the user authentication component, an indication of a user selection to register the mobile device to authenticate access to a webservice from other computing devices; associating, with the record, an identifier corresponding to an account of the user on the webservice; receiving, from a computing device executing a client authentication component, user account or device identifying information; identifying, based on the received user account or device identifying information, the record and the mobile device; transmitting, to the mobile device, an indication of availability of the computing device; receiving, from the mobile device, an authentication request to access the webservice from the computing device and, in association with the authentication request, authentication data; verifying the authentication data based on the credentials to determine whether the user authenticated on the first computing device; and transmitting, to the computing device, based on the verifying, an authentication token indicative the computing device being permissioned to access the webservice under the account of the user on the webservice.

18. The medium of embodiment 17, the operations further comprising: steps for logging-in the user to the webservice without entering a password on the computing device.

19. The medium of embodiment 17, the operations further comprising: steps for mobile initiated authentication to webservices on domains different than a domain of the computing device.

20. The medium of embodiment 17, wherein: the computing device is associated with a first domain; the webservice is associated with a second domain; the mobile device is registered to one or more other webservices on their respective domains; and the client authentication component logs the user into each different domain based on authentication of the user on the mobile device.

21. An embodiment of a computer-implemented method corresponding to any of the preceding embodiments.

22. An embodiment of a system by which any of the preceding embodiments are implemented.

What is claimed is:

1. A tangible, non-transitory, machine-readable medium storing instructions that when executed by one or more processors of a computer system effectuate operations comprising:

storing a user account record indicative of a first computing device and first credentials by which a user authenticates on the first computing device;

receiving an indication of a user selection on the first computing device to register the first computing device to authenticate access to a webservice from other computing devices;

associating, with the record, second credentials by which the user authenticates with the webservice;

identifying, based on user account or device identifying information received from a second computing device different from the first computing device, the record;

updating an indication of availability of the second computing device in association with the record;

receiving, from the first computing device, an authentication request to access the webservice from a selected available computing device and, in association with the authentication request, authentication data;

verifying the authentication data based on the first credentials to determine the user authenticated on the first computing device; and transmitting, to the selected available computing device, based on the verifying, second authentication data by which the second computing device is permissioned to access the webservice.

2. The medium of claim 1, wherein storing the user account record comprises:

establishing a user identifier associated with the user;

establishing device information corresponding to the first computing device; and establishing a set of credentials corresponding to representations of credential values maintained on the first computing device by which the user authenticates on the first computing device.

3. The medium of claim 1, wherein updating an indication of availability of the second computing device in association with the record comprises:

transmitting, to first computing device, identifiers of available computing devices having reported user account or identifying information associated with the record.

4. The medium of claim 1, wherein updating an indication of availability of the second computing device in association with the record comprises:

verifying an active user session of the user on the second computing device.

5. The medium of claim 1, wherein transmitting, to the selected available computing device, based on the verifying, second authentication data by which the second computing device is permissioned to access the webservice comprises:

generating an authentication token value; and transmitting, to the selected available computing device, a uniform resource locator comprising the authentication token value.

6. The medium of claim 5, wherein:

the authentication token value is specific to the selected available computing device; and presentation of the authentication token value is permissioned for a domain associated with the selected webservice.

7. The medium of claim 1, wherein verifying the authentication data based on the first credentials to determine the user authenticated on the first computing device comprises:

verifying the authentication data complies with a policy associated with the selected webservice; and verifying the authentication data was generated by a trusted execution environment of the first computing device.

8. The medium of claim 1, wherein:
the authentication data includes signed data; and
access to a private key by which data is signed is governed by authentication of the user on the first computing device upon credentials processed within a trusted execution environment.

9. The medium of claim 1, wherein:
the second authentication data is accepted by the webservice to permit the selected available computing device to access the webservice under an account corresponding to the second credentials by which the user authenticates with the webservice on a first domain.

10. The medium of claim 9, wherein:
the webservice is registered with an authentication service; and
the user is authenticated by the authentication service to access the webservice from the selected available computing device based on the first credentials and not the second credentials.

11. The medium of claim 9, further comprising:
receiving a login result indicative of the selected available computing device obtaining access to the webservice; and
transmitting an indication of permission to present the second authentication data on a different domain associated with a different webservice.

12. The medium of claim 11, wherein:
the second authentication data is accepted by the different webservice to permit the selected available computing device to access the different webservice under a different account corresponding to third credentials by which the user authenticates with the different webservice on the different domain without the user providing the third credentials.

13. The medium of claim 1, further comprising:
issuing a channel binding token to the selected available computing device, the channel binding token restricting presentation of the second authentication data without domain specific permissions; and
permissioning the selected available computing device to present the second authentication data on a domain corresponding to the webservice.

14. The medium of claim 1, further comprising:
maintaining a WebSocket tunnel with the second computing device in response to receiving the user account or the device identifying information from the second computing device, wherein the second computing device is the selected available computing device;
transmitting the second authentication data and first instructions over the WebSocket tunnel to cause the second computing device to transmit the second authentication data to the webservice; and
transmitting second instructions over the WebSocket tunnel to cause the second computing device to transmit the second authentication data to another, different webservice based on an indication of a selection by the user of the different webservice on the first computing device.

15. The medium of claim 1, wherein associating, with the record, second credentials by which the user authenticates with the webservice comprises:

obtaining an authentication result indicative of authentication of the user to the webservice, the authentication result associated with an identifier of an account of the user with the webservice; and
storing the identifier as the second credentials.

16. The medium of claim 15, further comprising:
receiving a public key of a key pair corresponding to the webservice, the authentication result comprising the public key, wherein the private key of the key pair is maintained on the first computing device and operable to sign authentication data after authentication of the user on the first computing device.

17. A tangible, non-transitory, machine-readable medium storing instructions that when executed by one or more processors of a computer system effectuate operations comprising:
receiving, from a mobile device executing a user authentication component, a request to establish a user account record, the user account record indicative of the mobile device and credentials by which a user authenticates on the mobile device;
receiving, from the mobile device executing the user authentication component, an indication of a user selection to register the mobile device to authenticate access to a webservice from other computing devices;
associating, with the record, an identifier corresponding to an account of the user on the webservice;
receiving, from a computing device executing a client authentication component, user account or device identifying information;
identifying, based on the received user account or device identifying information, the record and the mobile device;
transmitting, to the mobile device, an indication of availability of the computing device;
receiving, from the mobile device, an authentication request to access the webservice from the computing device and, in association with the authentication request, authentication data;
verifying the authentication data based on the credentials to determine whether the user authenticated on the computing device; and
transmitting, to the computing device, based on the verifying, an authentication token indicative the computing device being permissioned to access the webservice under the account of the user on the webservice.

18. The medium of claim 17, the operations further comprising:
steps for logging-in the user to the webservice without entering a password on the computing device.

19. The medium of claim 17, the operations further comprising:
steps for mobile initiated authentication to webservices on domains different than a domain of the computing device.

20. The medium of claim 17, wherein:
the computing device is associated with a first domain;
the webservice is associated with a second domain;
the mobile device is registered to one or more other webservices on their respective domains; and
the client authentication component logs the user into each different domain based on authentication of the user on the mobile device.

* * * * *